(12) United States Patent
Merlin et al.

(10) Patent No.: US 9,560,632 B2
(45) Date of Patent: Jan. 31, 2017

(54) DEVICES FOR TITLE OF INVENTION REDUCED OVERHEAD PAGING

(71) Applicant: QUALCOMM Incorporated, San Diego, CA (US)

(72) Inventors: Simone Merlin, Solana Beach, CA (US); Hemanth Sampath, San Diego, CA (US); Santosh Paul Abraham, San Diego, CA (US); Maarten Menzo Wentink, San Diego, CA (US); Zhi Quan, San Diego, CA (US); Alfred Asterjadhi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 32 days.

(21) Appl. No.: 14/169,715

(22) Filed: Jan. 31, 2014

(65) Prior Publication Data
US 2014/0146678 A1    May 29, 2014

Related U.S. Application Data

(63) Continuation-in-part of application No. 13/572,427, filed on Aug. 10, 2012.
(Continued)

(51) Int. Cl.
*H04L 12/801* (2013.01)
*H04W 68/02* (2009.01)

(52) U.S. Cl.
CPC ............ *H04W 68/025* (2013.01); *H04L 47/12* (2013.01)

(58) Field of Classification Search
CPC ...... H04L 47/10; H04L 47/2441; H04L 47/30; H04L 47/32; H04L 12/5693
(Continued)

(56) References Cited

U.S. PATENT DOCUMENTS

| 5,396,228 A | 3/1995 | Garahi |
| 6,100,824 A | 8/2000 | MacLeod et al. |

(Continued)

FOREIGN PATENT DOCUMENTS

| EP | 1892903 A1 | 2/2008 |
| EP | 1968226 A1 | 9/2008 |

(Continued)

OTHER PUBLICATIONS

International Search Report and Written Opinion—PCT/US2014/014351—ISA/EPO—Aug. 1, 2014.
(Continued)

*Primary Examiner* — Mark Rinehart
*Assistant Examiner* — Sanjay K Dewan
(74) *Attorney, Agent, or Firm* — Kevin T. Cheatham

(57) ABSTRACT

Methods and systems for reducing overhead paging are described. One example of such a method includes generating a compressed traffic indication map (TIM) element, the compressed TIM element comprising a partial virtual bitmap field constructed from at least one encoded block field that includes an encoded block information field identifying at least one encoding mode for encoded block information, and sending the compressed TIM element to an at least one station (STA) associated with the access point that supports at least one multiple basic service set identifier (BSSID). The method may also include, in response to the at least one encoding mode comprising an offset, length, bitmap (OLB) mode, encoding the encoded block information field to include a length subfield followed by contiguous subblock subfields, each subblock subfield including a corresponding subblock of a partial virtual map.

41 Claims, 31 Drawing Sheets

Related U.S. Application Data

(60) Provisional application No. 61/523,033, filed on Aug. 12, 2011, provisional application No. 61/552,444, filed on Oct. 27, 2011, provisional application No. 61/552,661, filed on Oct. 28, 2011, provisional application No. 61/591,493, filed on Jan. 27, 2012, provisional application No. 61/598,200, filed on Feb. 13, 2012, provisional application No. 61/759,904, filed on Feb. 1, 2013.

(58) Field of Classification Search
USPC ........................................................ 370/235
See application file for complete search history.

(56) References Cited

U.S. PATENT DOCUMENTS

| | | | |
|---|---|---|---|
| 6,125,143 A * | 9/2000 | Suzuki | H04N 19/139 348/398.1 |
| 6,154,648 A | 11/2000 | Comer | |
| 6,400,289 B1 | 6/2002 | Banerji | |
| 6,674,738 B1 * | 1/2004 | Yildiz | H04L 1/0045 370/338 |
| 7,457,973 B2 * | 11/2008 | Liu | 713/310 |
| 7,480,510 B1 * | 1/2009 | Woleben | H04L 1/1887 370/230 |
| 7,565,109 B2 * | 7/2009 | Morioka et al. | 455/63.1 |
| 7,583,644 B2 | 9/2009 | Morioka et al. | |
| 7,715,855 B2 * | 5/2010 | Subrahmanya | 455/458 |
| 7,907,518 B2 * | 3/2011 | Kuhl et al. | 370/229 |
| 7,916,687 B2 | 3/2011 | Deshpande et al. | |
| 8,180,381 B1 | 5/2012 | Shetty et al. | |
| 8,213,965 B2 | 7/2012 | Park et al. | |
| 8,219,118 B2 * | 7/2012 | Kim et al. | 455/458 |
| 8,914,048 B2 | 12/2014 | Montojo et al. | |
| 2001/0031092 A1 | 10/2001 | Zeck et al. | |
| 2002/0025811 A1 | 2/2002 | Willey | |
| 2002/0057213 A1 | 5/2002 | Heath | |
| 2003/0212876 A1 | 11/2003 | Chung et al. | |
| 2005/0232200 A1 | 10/2005 | Jeong et al. | |
| 2005/0286635 A1 * | 12/2005 | Kumar | H04N 19/00151 375/240.16 |
| 2006/0234676 A1 | 10/2006 | Harris et al. | |
| 2007/0015523 A1 | 1/2007 | Prakash et al. | |
| 2007/0036097 A1 | 2/2007 | Costa et al. | |
| 2007/0171819 A1 | 7/2007 | Julian et al. | |
| 2008/0014882 A1 | 1/2008 | Tsai et al. | |
| 2008/0057984 A1 | 3/2008 | Willey | |
| 2008/0081613 A1 | 4/2008 | Yang et al. | |
| 2008/0146253 A1 | 6/2008 | Wentink | |
| 2008/0182596 A1 | 7/2008 | Wang et al. | |
| 2008/0220769 A1 | 9/2008 | Qi et al. | |
| 2008/0220770 A1 | 9/2008 | Qi et al. | |
| 2008/0311933 A1 | 12/2008 | Lim et al. | |
| 2009/0016306 A1 * | 1/2009 | Wang | H04W 74/006 370/338 |
| 2009/0046637 A1 | 2/2009 | Kim et al. | |
| 2009/0080351 A1 | 3/2009 | Ryu et al. | |
| 2009/0196249 A1 * | 8/2009 | Kawamura et al. | 370/330 |
| 2009/0219861 A1 * | 9/2009 | Higuchi et al. | 370/328 |
| 2009/0225709 A1 * | 9/2009 | Wager et al. | 370/329 |
| 2010/0046482 A1 | 2/2010 | Sridhara et al. | |
| 2010/0054154 A1 | 3/2010 | Lambert et al. | |
| 2010/0081454 A1 | 4/2010 | Wang et al. | |
| 2010/0093378 A1 | 4/2010 | Chin et al. | |
| 2010/0214942 A1 | 8/2010 | Du et al. | |
| 2010/0215030 A1 | 8/2010 | Agrawal et al. | |
| 2010/0261487 A1 | 10/2010 | Razdan | |
| 2011/0013554 A1 | 1/2011 | Koskinen | |
| 2011/0039553 A1 | 2/2011 | Willey | |
| 2011/0065467 A1 | 3/2011 | Park et al. | |
| 2011/0076960 A1 | 3/2011 | Yun et al. | |
| 2011/0105154 A1 | 5/2011 | Kim | |
| 2011/0117852 A1 | 5/2011 | Copeland et al. | |
| 2011/0128911 A1 | 6/2011 | Shaheen | |
| 2011/0199967 A1 | 8/2011 | Yang et al. | |
| 2011/0249605 A1 | 10/2011 | Kwon et al. | |
| 2012/0127920 A1 * | 5/2012 | Kobayashi | H04W 4/001 370/315 |
| 2012/0157145 A1 | 6/2012 | Lee et al. | |
| 2012/0270574 A1 | 10/2012 | Nishida et al. | |
| 2012/0300655 A1 | 11/2012 | Lee et al. | |
| 2013/0122922 A1 | 5/2013 | Cho et al. | |
| 2013/0136072 A1 | 5/2013 | Bachmann et al. | |
| 2013/0141215 A1 | 6/2013 | Merlin et al. | |
| 2013/0143606 A1 | 6/2013 | Merlin et al. | |
| 2013/0170351 A1 * | 7/2013 | Reznik et al. | 370/235 |
| 2013/0208667 A1 | 8/2013 | Merlin et al. | |
| 2014/0314144 A1 * | 10/2014 | Henry | H04N 19/176 375/240.02 |
| 2015/0036497 A1 * | 2/2015 | Park | 370/235 |
| 2015/0296532 A1 * | 10/2015 | Zhou | H04W 72/1263 370/329 |

FOREIGN PATENT DOCUMENTS

| | | |
|---|---|---|
| GB | 2415573 A | 12/2005 |
| JP | 2005124159 A | 5/2005 |
| JP | 2006501721 A | 1/2006 |
| JP | 2007043601 A | 2/2007 |
| JP | 2007053740 A | 3/2007 |
| JP | 2009535887 A | 10/2009 |
| JP | 2009273177 A | 11/2009 |
| JP | 2010109676 A | 5/2010 |
| JP | 2010517478 A | 5/2010 |
| JP | 2010520653 A | 6/2010 |
| JP | 2013509800 A | 3/2013 |
| WO | 2004029770 A2 | 4/2004 |
| WO | WO-2005072001 A2 | 8/2005 |
| WO | WO-2006011775 A2 | 2/2006 |
| WO | WO-2007086705 A1 | 8/2007 |
| WO | 2007123360 A1 | 11/2007 |
| WO | WO-2007127945 A2 | 11/2007 |
| WO | WO-2008056239 A2 | 5/2008 |
| WO | WO-2008084949 A1 | 7/2008 |
| WO | 2008109403 A1 | 9/2008 |
| WO | WO-2008153343 A1 | 12/2008 |
| WO | WO-2009008456 A1 | 1/2009 |
| WO | WO-2010025678 A1 | 3/2010 |
| WO | WO-2011053219 A1 | 5/2011 |
| WO | WO-2012077952 A2 | 6/2012 |

OTHER PUBLICATIONS

Park M. (Intel): "TGah SFD D12.X; 11-13-0130-00-00ah-tgah-sfd-d12-x", IEEE SA Mentor; 11-13-01300-00-00AH-TGAH-SFD-D12-X, IEEE-SA Mentor, Piscataway, NJ USA, vol. 802.11ah, Jan. 16, 2013, pp. 1-58, XP068040532.
International Search Report and Written Opinion—PCT/US2012/050639_ISA/EPO_Feb. 25, 2013.
International Search Report and Written Opinion—PCT/US2012/068004_ISA/EPO_Mar. 22, 2013
International Search Report and Written Opinion—PCT/US2012/068009_ISA/EPO_Mar. 22, 2013
IEEE Standerd: "Part 11: Wireless LAN Medium Access Control(MAC) and Physical.Layer(PHY) Specifications," IEEE Std 802.11 TM-2007, Jun. 12, 2007, pp. 73,74,79-82,425-432, 15 pages.
"Station Group Management for 802.11ah," IEEE 802.11-11/0762r0, IEEE Mentor, May 10, 2011, 9 pages.
"Supporting Large Number of STAs in 802.11ah," IEEE 802.11-11/0725r1, IEEE mentor, May 9, 2011, 7 pages.

* cited by examiner

DEVICES FOR TITLE OF INVENTION REDUCED OVERHEAD PAGING

RELATED APPLICATIONS

This application is a continuation-in-part (CIP) of U.S. patent application Ser. No. 13/572,427 filed Aug. 10, 2012, for "DEVICES FOR REDUCED OVERHEAD PAGING." U.S. patent application Ser. No. 13/572,427 claims the benefit of, and priority from, U.S. Provisional Patent Application Ser. No. 61/523,033 filed Aug. 12, 2011, for "SYSTEMS AND METHODS FOR LOW OVERHEAD PAGING," U.S. Provisional Patent Application Ser. No. 61/552,444, filed Oct. 27, 2011, for "Systems and methods for low overhead paging," U.S. Provisional Patent Application Ser. No. 61/552,661 filed Oct. 28, 2011, for "SYSTEMS AND METHODS FOR LOW OVERHEAD PAGING," U.S. Provisional Patent Application Ser. No. 61/591,493, filed Jan. 27, 2012, for "SYSTEMS AND METHODS FOR LOW OVERHEAD PAGING," U.S. Provisional Patent Application Ser. No. 61/598,200, filed Feb. 13, 2012, for "SYSTEMS AND METHODS FOR LOW OVERHEAD PAGING," and U.S. Provisional Patent Application Ser. No. 61/759,904 filed Feb. 1, 2013, for "DEVICES FOR REDUCED OVERHEAD PAGING." The contents of each of the above-referenced applications are incorporated by reference herein in its entirety.

TECHNICAL FIELD

The present disclosure relates generally to electronic devices. More specifically, the present disclosure relates to devices for reduced overhead paging.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform functions faster, more efficiently or with higher quality are often sought after.

Some electronic devices (e.g., cellular phones, smart phones, computers, etc.) communicate with other electronic devices. These electronic devices may be referred to as communication devices. These electronic devices may generate and transmit data to other electronic devices. For example, a laptop computer may format data into packets and wirelessly transmit the packets to an access point.

In many telecommunication systems, communications networks are used to exchange messages among several interacting spatially separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc., frequency bands. Wireless networks advantageously facilitate user mobility and rapid field deployment when compared to fixed wired networks.

Some aspects of network control may require overhead signaling. However, known approaches to network control may be inefficient, often requiring excess amounts of bandwidth, time and/or power to operate. As can be observed from this discussion, systems and methods that improve network control efficiency may be beneficial.

SUMMARY

Examples and implementations of methods and systems for reducing overhead relating to paging are described herein. For example, a method for reduced overhead paging by an access point is described. The method includes assigning at least one paging identifier to at least one station. The method also includes partitioning a paging identifier space into paging identifier sets. The method further includes generating a paging message based on at least one of the paging identifier sets and the at least one paging identifier. The method additionally includes sending the paging message.

At least one of the paging identifier sets may include a continuous interval of multiple paging identifiers. The paging message may include an explicit identifier that identifies at least one of the paging identifier sets. At least one paging identifier set may be implicitly identified by a sequence number associated with the paging message.

At least one paging identifier set may be implicitly identified by a time at which the paging message is sent. The at least one paging identifier may be addressed relative to at least one of the paging identifier sets. A relative position of the at least one paging identifier may be assigned through a specific management message. A relative position in the at least one paging identifier set may represent an offset corresponding to the at least one paging identifier.

Absolute addressing may be utilized to identify the at least one paging identifier in at least one paging identifier set. Absolute addressing may include a local address, a global address or a paging identifier.

No explicit indication may be used to address the at least one paging identifier in at least one paging identifier set. All stations corresponding to the at least one paging identifier set may be implicitly paged when the paging message indicates the at least one paging identifier set. One bit may indicate whether all stations corresponding to the at least one paging identifier set are paged. All stations corresponding to a given range of paging identifiers may be paged.

The access point may be an access point in accordance with Institute of Electrical and Electronics Engineers (IEEE) 802.11 specifications.

The method may include compressing the paging message to obtain a compressed paging message. Sending the paging message may include transmitting the compressed paging message to the at least one station.

The method may include scheduling a transmission by one or more stations of the at least one station. The method may include generating the at least one paging message based on the scheduling of the one or more stations of the at least one station.

The paging message may include a bitmap element. The method may include defining at least one sub-bitmap element. The method may also include including a variable length bitmap into the at least one sub-bitmap element.

The method may include compressing the bitmap to obtain running length sequences based at least in part on the bitmap. The method may include assigning a different association identifier. The method may include assigning an association identifier to the at least one station.

The paging message may include one or more of the group consisting of an equipment identifier field, a length field, a control field, an offset field and a bitmap. The paging message may include an offset, a length and/or a bitmap.

A method for reduced overhead paging by a station is also described. The method includes determining at least one paging identifier assigned to the station. The method also includes determining at least one paging identifier set corresponding to the at least one paging identifier. The method further includes determining whether a paging message corresponds to the station based on the at least one paging identifier set. The method additionally includes determining whether the station is paged if the paging message corresponds to the station.

The method may include setting the station to an awake state if the station is paged. Determining whether the paging message corresponds to the station may be based on whether an explicit identifier identifies the at least one paging identifier set corresponding to the at least one paging identifier. Determining whether the paging message corresponds to the station may be based on whether the at least one paging identifier set is implicitly identified by a sequence number associated with the paging message. Determining whether the paging message corresponds to the station may be based on whether the at least one paging identifier set is implicitly identified by a time at which the paging message is sent.

The station may be paged if the at least one paging identifier is addressed relative to at least one paging identifier set. A relative position of the at least one paging identifier may be assigned through a specific management message. A relative position in the at least one paging identifier set may represent an offset corresponding to the at least one paging identifier. The station may be paged if absolute addressing identifies the at least one paging identifier in the at least one paging identifier set.

Absolute addressing may include a local address, a global address or a paging identifier. No explicit indication may be used to address the at least one paging identifier in at least one paging identifier set. The station may be paged implicitly if the at least one paging identifier set corresponds to the station. The paging message may include one bit that indicates whether the station corresponding to the at least one paging identifier set is paged.

The station may be paged if the at least one paging identifier is within a given range of paging identifiers. The station may be a station in accordance with Institute of Electrical and Electronics Engineers (IEEE) 802.11 specifications.

The method may include receiving at least one compressed paging message from an access point. The method may also include reconstructing the paging message from the compressed paging message.

The paging message may be associated with the at least one paging identifier of the at least one paging identifier set. Each of the at least one paging identifier may be associated with at least one station of a set of stations.

The method may include selecting a first paging identifier from a plurality of paging identifiers that are included in the paging message. The method may also include transmitting a request to an access point indicating selection of the first paging identifier.

A method for wireless communication by a station is also described. The method includes preparing a polling message comprising a token number. The token number corresponds to the token number in one or more paging messages and is configured to indicate a correspondence between the polling message and the one or more paging messages. The method also includes transmitting the polling message to an access point.

The paging message may include an equipment identifier field, a length field, a control field, an offset field and/or a bitmap. The station may have an association identifier. The paging message may include offset, a length or a bitmap.

A method for wireless communication by an access point is also described. The method includes determining a transmission schedule for a first plurality of stations. The first plurality of stations may be selected from a second plurality of stations. The method also includes determining a duration of a reserved time interval that is reserved for transmission.

The paging message may be associated with at least one paging identifier of a plurality of paging identifiers. Each of the plurality of paging identifiers may be associated with at least one station of the first plurality of stations.

The method may include transmitting the paging message to at least one of the second plurality of stations. The method may also include communicating the duration of the reserved time interval to at least one of the second plurality of stations.

Another method for wireless communication by an access point is also described. The method includes determining a reserved time interval. The method also includes setting the reserved time interval for at least one paged station by setting a network allocation vector.

Another method for wireless communication by an access point is also described. The method includes preparing a plurality of paging messages. Each of the plurality of paging messages is associated with at least one paging identifier of a plurality of paging identifiers and comprises a token number. Each of the plurality of paging identifiers is associated with at least one station of a set of stations. The method also includes transmitting at least one paging message to the at least one station. The method further includes receiving a polling message from the at least one station. The polling message includes the token number. The token number corresponds to the token number in one or more paging messages and is configured to indicate a correspondence between the polling message and the one or more paging messages. The method additionally includes associating the one or more paging messages with the polling message.

Another method for wireless communication by a station is also described. The method includes determining a schedule for transmitting a polling message to an access point. The schedule is based on at least one paging identifier.

The schedule may include a time at which the station transmits the polling message. The schedule may include a time at which the station begins contention for a communication channel to transmit the polling message. The schedule may include a counter, which the station may count down before transmission of a transmit polling message while a communication channel is idle. The schedule may be based on a hash function of the station first paging identifier.

The method may include obtaining information relative to a time interval reserved for transmission by a plurality of stations selected from a set of stations. The method may include performing a determination as to whether to send a polling message to the access point. The determination may be based on the first paging identifier and the information relative to the reserved time interval.

Another method for wireless communication by a station is also described. The method includes selecting a first paging identifier from a plurality of paging identifiers based on a schedule by which an access point transmits paging messages comprising the first paging identifier. The method also includes transmitting a request to the access point indicating selection of the first paging identifier.

The schedule may be predefined by the access point. The schedule may be defined by the access point based on the receipt of one or more requests. The request may include a frame comprising the first paging identifier. The frame may further include an equipment identifier, a length field, a control field, and timing information regarding times when receipt of paging messages is requested.

The method may include receiving a response to the request, the response indicating assignment of the first paging identifier. The response may include a frame comprising the first paging identifier. The frame may also include an equipment identifier, a length field, a control field, and timing information regarding times paging messages associated with the first paging identifier are transmitted by the transmitting device.

The method may include receiving at least one compressed paging message from the access point. The method may include reconstructing the paging message based at least in part on the compressed paging message.

Another method for wireless communication by a station is also described. The method includes obtaining information relative to a time interval reserved for transmission by a plurality of stations selected from a second plurality of stations. The method also includes performing a determination as to whether to send a polling message to an access point. The determination is based on the first paging identifier and the information relative to the reserved time interval.

The determination may include determining whether the station is scheduled for transmission to the access point. If the determination is to send a polling message, the method may further include transmitting a message to the access point during the reserved time interval. If the determination is not to send a polling message, the method may further include waiting until expiration of the reserved time interval. Upon expiration of the reserved time interval, the method may further include transmitting a message to the access point.

Transmitting the message may be based on the result of a contention with one or more devices. Transmitting the message may be based on the result of a contention with one or more devices.

A contention may include assigning to a device a time slot to access the medium. A contention may include assigning to a device a value to be used for random back-off. A contention may include assigning to a device a deterministic back-off value.

The schedule may indicate an order. The order may be randomized. The station may be paged if the at least one paging identifier is within a given range of paging identifiers.

An access point for reduced overhead paging is also described. The access point includes a processor and instructions stored in memory that is in electronic communication with the processor. The access point assigns at least one paging identifier to at least one station. The access point also partitions a paging identifier space into paging identifier sets. The access point further generates a paging message based on at least one of the paging identifier sets and the at least one paging identifier. The access point additionally sends the paging message.

A station for reduced overhead paging is also described. The station includes a processor and instructions stored in memory that is in electronic communication with the processor. The station determines at least one paging identifier assigned to the station. The station also determines at least one paging identifier set corresponding to the at least one paging identifier. The station further determines whether a paging message corresponds to the station based on the at least one paging identifier set. The station additionally determines whether the station is paged if the paging message corresponds to the station.

A station configured for wireless communication is described. The station includes a processor and instructions stored in memory that is in electronic communication with the processor. The station prepares a polling message including a token number. The token number corresponds to the token number in one or more paging messages and is configured to indicate a correspondence between the polling message and the one or more paging messages. The station transmits the polling message to an access point.

An access point configured for wireless communication is described. The access point includes a processor and instructions stored in memory that is in electronic communication with the processor. The access point determines a transmission schedule for a first plurality of stations. The first plurality of stations is selected from a second plurality of stations. The access point also determines a duration of a reserved time interval that is reserved for transmission.

Another access point configured for wireless communication is also described. The access point includes a processor and instructions stored in memory that is in electronic communication with the processor. The access point determines a reserved time interval. The access point also sets the reserved time interval for at least one paged station by setting a network allocation vector.

Another access point configured for wireless communication is also described. The access point includes a processor and instructions stored in memory that is in electronic communication with the processor. The access point prepares a plurality of paging messages. Each of the plurality of paging messages is associated with at least one paging identifier of a plurality of paging identifiers and comprises a token number. Each of the plurality of paging identifiers is associated with at least one station of a set of stations. The access point also transmits at least one paging message to the at least one station. The access point further receives a polling message from the at least one station. The polling message includes the token number. The token number corresponds to the token number in one or more paging messages and is configured to indicate a correspondence between the polling message and the one or more paging messages. The access point additionally associates the one or more paging messages with the polling message.

Another station configured for wireless communication is also described. The station includes a processor and instructions stored in memory that is in electronic communication with the processor. The station determines a schedule for transmitting a polling message to an access point. The schedule is based on at least one paging identifier.

Another station configured for wireless communication is also described. The station includes a processor and instructions stored in memory that is in electronic communication with the processor. The station selects a first paging identifier from a plurality of paging identifiers based on a schedule by which an access point transmits paging messages comprising the first paging identifier. The station also transmits a request to the access point indicating selection of the first paging identifier.

Another station configured for wireless communication is also described. The station includes a processor and instructions stored in memory that is in electronic communication with the processor. The station obtains information relative to a time interval reserved for transmission by a plurality of stations selected from a second plurality of stations. The station also performs a determination as to whether to send a polling message to an access point. The determination is based on the first paging identifier and the information relative to the reserved time interval.

An apparatus for reduced overhead paging is also described. The apparatus includes means for assigning at least one paging identifier to at least one station. The apparatus also includes means for partitioning a paging identifier space into paging identifier sets. The apparatus further includes means for generating a paging message based on at least one of the paging identifier sets and the at least one paging identifier. The apparatus additionally includes means for sending the paging message.

Another apparatus for reduced overhead paging is also described. The apparatus includes means for determining at least one paging identifier assigned to the apparatus. The apparatus also includes means for determining at least one paging identifier set corresponding to the at least one paging identifier. The apparatus further includes means for determining whether a paging message corresponds to the apparatus based on the at least one paging identifier set. The apparatus additionally includes means for determining whether the apparatus is paged if the paging message corresponds to the apparatus.

An apparatus configured for wireless communication is also described. The apparatus includes means for preparing a polling message comprising a token number. The token number corresponds to the token number in one or more paging messages and is configured to indicate a correspondence between the polling message and the one or more paging messages. The apparatus also includes means for transmitting the polling message to an access point.

Another apparatus configured for wireless communication is also described. The apparatus includes means for determining a transmission schedule for a first plurality of stations. The first plurality of stations is selected from a second plurality of stations. The apparatus also includes means for determining a duration of a reserved time interval that is reserved for transmission.

Another apparatus configured for wireless communication is also described. The apparatus includes means for determining a reserved time interval. The apparatus also includes means for setting the reserved time interval for at least one paged station by setting a network allocation vector.

Another apparatus configured for wireless communication is also described. The apparatus includes means for preparing a plurality of paging messages. Each of the plurality of paging messages is associated with at least one paging identifier of a plurality of paging identifiers and comprises a token number. Each of the plurality of paging identifiers is associated with at least one station of a set of stations. The apparatus also includes means for transmitting at least one paging message to the at least one station. The apparatus further includes means for receiving a polling message from the at least one station. The polling message comprises the token number. The token number corresponds to the token number in one or more paging messages and is configured to indicate a correspondence between the polling message and the one or more paging messages. The apparatus additionally includes means for associating the one or more paging messages with the polling message.

Another apparatus configured for wireless communication is also described. The apparatus includes means for determining a schedule for transmitting a polling message to an access point. The schedule is based on at least one paging identifier.

Another apparatus configured for wireless communication is also described. The apparatus includes means for selecting a first paging identifier from a plurality of paging identifiers based on a schedule by which an access point transmits paging messages comprising the first paging identifier. The apparatus also includes means for transmitting a request to the access point indicating selection of the first paging identifier.

Another apparatus configured for wireless communication is also described. The apparatus includes means for obtaining information relative to a time interval reserved for transmission by a plurality of apparatuses selected from a second plurality of apparatuses. The apparatus also includes means for performing a determination as to whether to send a polling message to an access point. The determination is based on the first paging identifier and the information relative to the reserved time interval.

A computer-program product for reduced overhead paging is described. The computer-program product includes a non-transitory computer-readable medium with instructions. The instructions include code for causing an access point to assign at least one paging identifier to at least one station. The instructions also include code for causing the access point to partition a paging identifier space into paging identifier sets. The instructions further include code for causing the access point to generate a paging message based on at least one of the paging identifier sets and the at least one paging identifier. The instructions additionally include code for causing the access point to send the paging message.

Another computer-program product for reduced overhead paging is also described. The computer-program product includes a non-transitory computer-readable medium with instructions. The instructions include code for causing a station to determine at least one paging identifier assigned to a station. The instructions also include code for causing the station to determine at least one paging identifier set corresponding to the at least one paging identifier. The instructions further include code for causing the station to determine whether a paging message corresponds to the station based on the at least one paging identifier set. The instructions additionally include code for causing the station to determine whether the station is paged if the paging message corresponds to the station.

A computer-program product for wireless communication is described. The computer-program product includes a non-transitory computer-readable medium with instructions. The instructions include code for causing a station to prepare a polling message comprising a token number. The token number corresponds to the token number in one or more paging messages and is configured to indicate a correspondence between the polling message and the one or more paging messages. The instructions also include code for causing the station to transmit the polling message to an access point.

Another computer-program product for wireless communication is also described. The computer-program product includes a non-transitory computer-readable medium with instructions. The instructions include code for causing an access point to determine a transmission schedule for a first plurality of stations. The first plurality of stations is selected from a second plurality of stations. The instructions also include code for causing the access point to determine a duration of a reserved time interval that is reserved for transmission.

Another computer-program product for wireless communication is also described. The computer-program product includes a non-transitory computer-readable medium with instructions. The instructions include code for causing an access point to determine a reserved time interval. The instructions also include code for causing the access point to set the reserved time interval for at least one paged station by setting a network allocation vector.

Another computer-program product for wireless communication is also described. The computer-program product includes a non-transitory computer-readable medium with instructions. The instructions include code for causing an access point to prepare a plurality of paging messages. Each of the plurality of paging messages is associated with at least one paging identifier of a plurality of paging identifiers and comprises a token number. Each of the plurality of paging identifiers is associated with at least one station of a set of stations. The instructions also include code for causing the access point to transmit at least one paging message to the at least one station. The instructions further include code for causing the access point to receive a polling message from the at least one station. The polling message includes the token number. The token number corresponds to the token number in one or more paging messages and is configured to indicate a correspondence between the polling message and the one or more paging messages. The instructions additionally include code for causing the access point to associate the one or more paging messages with the polling message.

Another computer-program product for wireless communication is also described. The computer-program product includes a non-transitory computer-readable medium with instructions. The instructions include code for causing a station to determine a schedule for transmitting a polling message to an access point. The schedule is based on at least one paging identifier.

Another computer-program product for wireless communication is also described. The computer-program product includes a non-transitory computer-readable medium with instructions. The instructions include code for causing a station to select a first paging identifier from a plurality of paging identifiers based on a schedule by which an access point transmits paging messages comprising the first paging identifier. The instructions also include code for causing the station to transmit a request to the access point indicating selection of the first paging identifier.

Another computer-program product for wireless communication is also described. The computer-program product includes a non-transitory computer-readable medium with instructions. The instructions include code for causing a station to obtain information relative to a time interval reserved for transmission by a plurality of stations selected from a second plurality of stations. The instructions also include code for causing the station to perform a determination as to whether to send a polling message to an access point. The determination is based on the first paging identifier and the information relative to the reserved time interval.

Another access point product for reducing overhead relating to paging is also described. The access point includes a processor, a memory component in electronic communication with the processor, and instructions stored in the memory. The instructions are executable on the processor to generate a compressed traffic indication map (TIM) element, the compressed TIM element comprising a partial virtual bitmap field constructed from at least one encoded block field that includes an encoded block information field identifying at least one encoding mode for encoded block information, and send the compressed TIM element to an at least one station (STA) associated with the access point that supports at least one multiple basic service set identifier (BSSID. Implementations for the access point product, and other implementations described herein, may include one or more of other features described herein, for example, including features described below.

The instructions may be further executable to determine whether the at least one STA is associated with the access point. The instructions are further executable to, in response to the at least one encoding mode comprising an offset, length, bitmap (OLB) mode, encode the encoded block information field to include a length subfield followed by a plurality of contiguous subblock subfields, each subblock subfield including a corresponding subblock of a partial virtual map. In some implementations of the access point the OLB mode is used jointly with at least one other encoding mode to further compress the TIM element.

In some implementations of the access point product, the length subfield equal to n indicates that the encoded block information field contains n contiguous subblocks in ascending order from multiple blocks starting from a first subblock in position block offset. A subblock m of the encoded block information field is located in block k where k is obtained as block offset+m/8. In some implementations, a bit in position q of the subblock m which is located in block k indicates that there is traffic buffered for the STA whose association identifier (AID) is N, and N is constructed by concatenating a page index field (N[12:11]), k (N[10:6]), mod(m, 8) (N[5:3]), q (N[2:0]) and in sequence from least significant bit to most significant bit. In some implementations, a bit in position q of the subblock m which is located in block k indicates that there is traffic buffered for the STA whose association identifier (AID) is N, and N is constructed by concatenating a page index field (N[12:11]), k (N[10:6]), mod(m, 8) (N[5:3]), q (N[2:0]) and in sequence from most significant bit to least significant bit.

In some implementations, the TIM element further comprises a delivery traffic information map (DTIM) Count field, a DTIM period field, and a bitmap control field, the DTIM count field indicates how many beacon frames, including a current frame, appear before a next DTIM, the DTIM period field indicates a number of beacon intervals between successive DTIMs, and the bitmap control field contains a group addressed traffic indicator bit associated with association identifier zero (0). In some implementations, the at least one encoded block field comprises a block offset field that indicates an index of a block that is encoded in the at least one encoded block field.

Another innovation includes a station for reduced overhead paging, including a processor, memory in electronic communication with the processor, and instructions stored in the memory, the instructions being executable to receive the paging from an access point (AP), the paging comprising a compressed traffic indication map (TIM) element, and determine from the compressed TIM element, a partial virtual bitmap field constructed from at least one encoded block field that includes an encoded block Information field regarding at least one encoding mode for encoded block information. The instructions may be further executable to, in response to the at least one encoding mode comprising an offset, length, bitmap (OLB) mode, decode the encoded block information field to generate a length subfield followed by contiguous subblock subfields, each subblock subfield including a corresponding subblock of a partial virtual map. In some implementations, the OLB mode is used jointly with at least one other encoding mode to further compress the TIM element.

Another innovation includes a method for reduced overhead paging by an access point, including generating a compressed traffic indication map (TIM) element, the compressed TIM element comprising a partial virtual bitmap field constructed from at least one encoded block field that includes an encoded block information field identifying at least one encoding mode for encoded block information, and sending the compressed TIM element to an at least one station (STA) associated with the access point that supports at least one multiple basic service set identifier (BSSID). In some implementations, the method further includes in response to the at least one encoding mode comprising an offset, length, bitmap (OLB) mode, encoding the encoded block information field to include a length subfield followed by contiguous subblock subfields, each subblock subfield including a corresponding subblock of a partial virtual map. In some implementations, the OLB mode is used jointly with at least one other encoding mode to further compress the TIM element.

Another innovation includes a method operable by a station for reduced overhead paging, the method including receiving the paging from an access point (AP), the paging comprising a compressed traffic indication map (TIM) element, and determining from the compressed TIM element, a partial virtual bitmap field constructed from at least one encoded block field that includes an encoded block information field regarding at least one encoding mode for encoded block information. In some implementations, the method further includes, in response to the at least one encoding mode comprising an offset, length, bitmap (OLB) mode, decoding the encoded block information field to generate a length subfield followed by contiguous subblock subfields, each subblock subfield including a corresponding subblock of a partial virtual map. In some implementations, the OLB mode is used jointly with at least one other encoding mode to further compress the TIM element.

Another innovation includes an apparatus configured for wireless communication, including means for generating a compressed traffic indication map (TIM) element, the compressed TIM element comprising a partial virtual bitmap field constructed from at least one encoded block field that includes an encoded block information field identifying at least one encoding mode for encoded block information, and means for sending the compressed TIM element to an at least one station (STA) associated with the access point that supports at least one multiple basic service set identifier (BSSID). In some implementations, the apparatus further includes in response to the at least one encoding mode comprising an offset, length, bitmap (OLB) mode, means for encoding the encoded block information field to include a length subfield followed by contiguous subblock subfields, each subblock subfield including a corresponding subblock of a partial virtual map. In some implementations, the OLB mode is used jointly with at least one other encoding mode to further compress the TIM element.

Another innovation includes an apparatus configured for wireless communication, including means for receiving the paging from an access point (AP), the paging comprising a compressed traffic indication map (TIM) element, and means for determining from the compressed TIM element, a partial virtual bitmap field constructed from at least one encoded block field that includes an encoded block information field regarding at least one encoding mode for encoded block information. In some implementation, the apparatus further includes in response to the at least one encoding mode comprising an offset, length, bitmap (OLB) mode, means for decoding the encoded block information field to generate a length subfield followed by contiguous subblock subfields, each subblock subfield including a corresponding subblock of a partial virtual map. In some implementations, the OLB mode is used jointly with at least one other encoding mode to further compress the TIM element.

Another innovation includes a computer-program product for reduced overhead paging, the computer-program product including a non-transitory computer-readable medium having instructions thereon, the instructions including code for causing an access point (AP) to generate a compressed traffic indication map (TIM) element, the compressed TIM element comprising a partial virtual bitmap field constructed from at least one encoded block field that includes an encoded block information field identifying at least one encoding mode for encoded block information, and code for causing the AP to send the compressed TIM element to an at least one station (STA) associated with the access point that supports at least one multiple basic service set identifier (BSSID). In some implementations, the computer-program product further includes, in response to the at least one encoding mode comprising an offset, length, bitmap (OLB) mode, code for causing the AP to encode the encoded block information field to include a length subfield followed by contiguous subblock subfields, each subblock subfield including a corresponding subblock of a partial virtual map. In some implementations, the OLB mode is used jointly with at least one other encoding mode to further compress the TIM element.

Another innovation includes a computer-program product for reduced overhead paging, the computer-program product including a non-transitory computer-readable medium having instructions thereon, the instructions including code for causing a station to receive a paging from an access point (AP), the paging comprising a compressed traffic indication map (TIM) element, and code for causing the station to construct from the compressed TIM element, a partial virtual bitmap field constructed from at least one encoded block field that includes an encoded block information field regarding at least one encoding mode for encoded block information. In some implementations, the computer-program product further includes in response to the at least one encoding mode comprising an offset, length, bitmap (OLB) mode, code for causing the station to decode the encoded block information field to generate a length subfield followed by contiguous subblock subfields, each subblock subfield including a corresponding subblock of a partial virtual map. In some implementation, the OLB mode is used jointly with at least one other encoding mode to further compress the TIM element.

DETAILED DESCRIPTION

Figure 1:
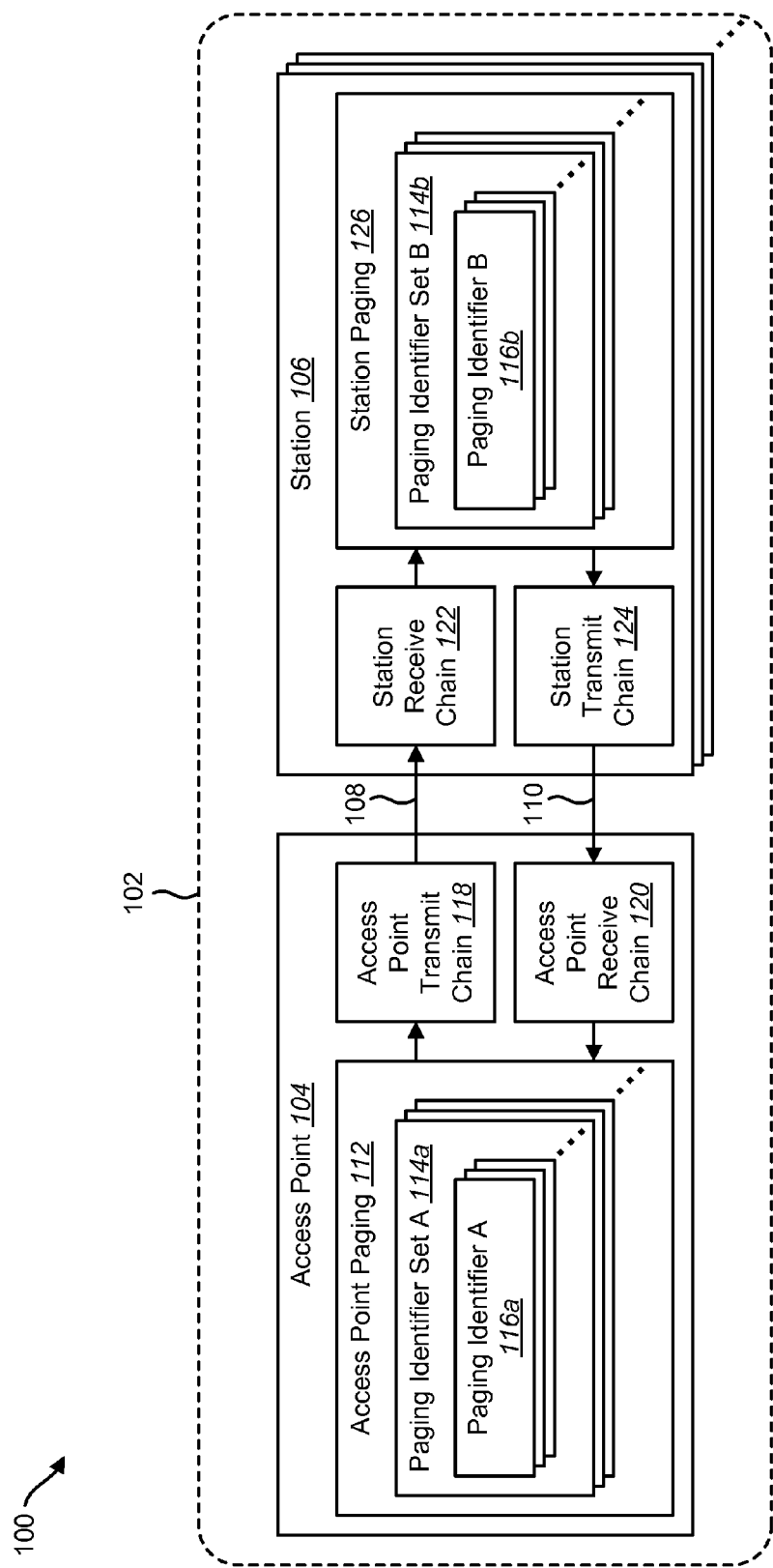
FIG. 1 shows one example of an access point and one or more stations in which systems and methods for reduced overhead paging may be implemented.

The systems and methods disclosed herein may be applied to a variety of electronic devices. Examples of electronic devices include voice recorders, video cameras, audio players (e.g., Moving Picture Experts Group-1 (MPEG-1) or MPEG-2 Audio Layer 3 (MP3) players), video players, audio recorders, desktop computers, laptop computers, personal digital assistants (PDAs), gaming systems, etc. One kind of electronic device is a communication device, which may communicate with another device. Examples of communication devices include telephones, laptop computers, desktop computers, cellular phones, smartphones, wireless or wired modems, e-readers, tablet devices, gaming systems, cellular telephone base stations or nodes, access points, wireless gateways and wireless routers, etc.

An electronic device or communication device may operate in accordance with certain industry standards, such as International Telecommunication Union (ITU) standards and/or Institute of Electrical and Electronics Engineers (IEEE) standards (e.g., Wireless Fidelity or "Wi-Fi" standards such as 802.11a, 802.11b, 802.11g, 802.11n and/or 802.11ac). Other examples of standards that a communication device may comply with include IEEE 802.16 (e.g., Worldwide Interoperability for Microwave Access or "WiMAX"), Third Generation Partnership Project (3GPP), 3GPP Long Term Evolution (LTE), Global System for Mobile Telecommunications (GSM) and others (where a communication device may be referred to as a User Equipment (UE), Node B, evolved Node B (eNB), mobile device, mobile station, subscriber station, remote station, access point, station, access terminal, mobile terminal, terminal, user terminal, subscriber unit, etc., for example). While some of the systems and methods disclosed herein may be described in terms of one or more standards, this should not limit the scope of the disclosure, as the systems and methods may be applicable to many systems and/or standards.

It should be noted that some communication devices may communicate wirelessly and/or may communicate using a wired connection or link. For example, some communication devices may communicate with other devices using an Ethernet protocol. The systems and methods disclosed herein may be applied to communication devices that communicate wirelessly and/or that communicate using a wired connection or link. In some configurations, the systems and methods disclosed herein may be applied to a communication device that communicates with another device using a satellite.

Devices in a wireless network may transmit/receive information between each other. Further, devices that are not actively transmitting/receiving information in the wireless network may enter a doze state to conserve power, where the devices do not actively transmit/receive information in the doze state. These devices may further utilize paging messages to determine when to wake up from a doze state and enter an awake state in order to transmit/receive data. Thus, improved systems, methods, and devices for transmitting and processing paging messages may be beneficial.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some aspects, wireless signals in a sub-gigahertz band may be transmitted according to the 802.11ah protocol using orthogonal frequency-division multiplexing (OFDM), direct-sequence spread spectrum (DSSS) communications, a combination of OFDM and DSSS communications or other schemes. Implementations of the 802.11ah protocol may be used for sensors, metering and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations or "STAB"). In general, an AP may serve as a hub or base station for the WLAN and an STA serves as a user of the WLAN. For example, an STA may be a laptop computer, a personal digital assistant (PDA), a mobile phone, etc. In an example, an STA connects to an AP via a WiFi (e.g., IEEE 802.11 protocol such as 802.11ah) compliant wireless link to obtain general connectivity to the Internet or to other wide area networks. In some implementations, an STA may also be used as an AP.

An access point ("AP") may also comprise, be implemented as or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver or some other terminology.

A station "STA" may also comprise, be implemented as or known as an access terminal ("AT"), a subscriber station, a subscriber unit, a mobile station, a remote station, a remote terminal, a user terminal, a user agent, a user device, user equipment or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device or a satellite radio), a gaming device or system, a global positioning system device or any other suitable device that is configured to communicate via a wireless medium.

As described above, one or more of the devices described herein may implement the 802.11ah standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots) or to implement machine-to-machine communications.

The systems and methods described herein enable low or reduced overhead paging. In some implementations, the systems and methods described herein may be applied to a wireless local area network (WLAN).

IEEE 802.11 specifications define a 'paging' message called a traffic indication map (TIM). The traffic indication message is a bitmap, where each bit corresponds to a station (STA). The traffic indication map is sent in beacons or dedicated traffic indication map frames. Each bit in the bitmap may correspond to a particular station of a plurality of stations, and the value of each bit (e.g., 0 or 1) may indicate the state the corresponding station should be in (e.g., doze state or awake state). Accordingly, the size of the bitmap may be directly proportional to the number of stations in a wireless communications system. Therefore, a large number of stations in the wireless communications system may result in a large bitmap. Therefore, a paging message, and in some cases the beacon or TIM frame including the paging message, may be relatively large, requiring a large amount of bandwidth to transmit. A traffic indication map may thus be relatively large, especially if the number of stations to be supported will increase. Further, each station may need to listen to the entire paging message, and in some cases the beacon or TIM frame including the paging message, in order to determine the state in which it should operate. Accordingly, certain aspects described herein relate to techniques for low overhead paging, whereby the stations selectively decode or listen to only certain paging messages from the access point.

The length of a traffic indication map also depends on how the association identifiers (AIDs) are assigned. For example, initial and final 0 bits are not sent. For instance, if an STA AID 1 and STA AID N have corresponding bits set to 1, then N bits are sent. The order of assigning association identifiers matters.

The systems and methods disclosed herein may provide one or more of the following approaches. An access point (AP) may assign one or more paging identifiers to one or more stations. A paging identifier may also be referred to as a "power save identifier" (PS ID). The access point may partition a paging identifier space into one or more paging identifier sets. A paging identifier set may also be referred to as a "power save identifier set" (PS ID set). As used herein, the "paging identifier space" may include all paging identifiers available to an access point. Each paging identifier set may be a subset of the paging identifier space (e.g., a paging identifier set may be smaller than or include fewer paging identifiers than the paging identifier space). However, a special paging identifier set may include all paging identifiers. The systems and methods disclosed herein may provide approaches to index each paging identifier set and specify which station of the paging identifier set is paged. In some configurations, an access point may send only relevant paging information in a frame. For example, times when paging may be sent may be defined for each station.

Regarding paging identifier assignment, each station may be assigned one or more paging identifiers. Additionally or alternatively, one paging identifier may be assigned to one or more stations. It should be noted that a paging identifier may be the association identifier (AID) in some configurations. For example, an association identifier may be a number (e.g., 16-bit number) that exclusively identifies one station. In other configurations, the association identifier(s) and paging identifier(s) may be distinct pieces of information that are managed separately (by an access point, for example) in some configurations.

Regarding partitioning, paging identifier sets may be disjoint or overlapping. For example, a single paging identifier may belong to one or more paging identifier sets. Additionally or alternatively, paging identifier sets may be of different sizes or of the same size. In some configurations, a paging identifier set may include a continuous interval of paging identifiers. This may provide a structure that is similar to that of a traffic indication map. As described above, special paging identifier sets may include all paging identifiers. For example, a special paging identifier set may indicate broadcast, similar to a delivery traffic indication map (DTIM).

One or more approaches may be implemented to indicate which paging identifier set is being paged in accordance with the systems and methods disclosed herein. In one configuration, each paging identifier set may be identified by an explicit identifier sent in a paging frame. For example, a 2 Byte field may provide indexing for $2^{16}$ paging identifier sets. Additionally or alternatively, a specific indication may be sent in the physical layer (PHY) preamble.

In another configuration, each paging identifier set may be implicitly identified by a sequence number associated with a sent paging frame. For example, a SET ID=mod(Sequence Number, 256), where "SET ID" is a paging identifier set number, "mod( )" is the modulo operator and "Sequence Number" is the paging frame sequence number.

In another configuration, each paging identifier set may be implicitly identified by the time at which the frame is sent, for example, a set of stations for which their associated paging identifier satisfies a given condition with respect to the time at which the frame is sent. Alternatively, one or more stations may agree with an access point on a paging schedule.

One or more approaches may be implemented for addressing individual stations within a paging identifier set. In one configuration, individual stations may be addressed relative to the paging identifier set. For example, a bitmap of N bits may be utilized, where each bit indexes a specific station address relative to the set. The relative position within the set may be assigned a priori through a specific management message. This management message may define the association between each paging identifier and a paging identifier set. Alternatively, the relative position within the paging identifier set may be represented by an offset from a paging identifier set value (assuming the paging identifier set value represents a starting address for the paging identifier set). For example, the bit in position N in the bitmap refers to the station with a paging identifier=N+256*PID_Set_Number, where "PID_Set_Number" denotes a paging identifier set number or value. One benefit of this approach is that it provides simple operation at the receiver (e.g., station). For instance, a receiver (e.g., station) may only need to compare a station index (STA Index) or paging identifier value with N+256*PID_Set_Number.

In another configuration, absolute addressing may be utilized to identify individual stations within a paging identifier set. For example, local or global addresses may identify individual stations. In some implementations, partial addresses may be used. Additionally or alternatively, full paging identifiers may be utilized.

In yet another configuration, no explicit indication may be used to address individual stations within a paging identifier set. For example, whenever a paging identifier set is indexed, all stations corresponding to the paging identifier set are implicitly paged. Alternatively, for example, one bit may be utilized to indicate whether all of or none of the stations corresponding to the paging identifier set are paged. Alternatively, all stations within a given range (e.g., 256* [PID_Set_Number: PID_Set_Number+1], where PID_Set_Number is a paging identifier set number or value) are paged.

At each paging epoch, a frame may be sent by an access point. Each frame may page one or more sets of stations. Each frame may include a list of specific stations being paged within the set. In some configurations, the schedule at which each set is paged may be defined a priori (e.g., the access point and stations may have a defined schedule). A station may wake up at a time specified by the schedule.

Various configurations are now described with reference to the Figures, where like element names may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 shows one example of an access point 104 and one or more stations 106 in which systems and methods for reduced overhead paging may be implemented. The access point 104 and the one or more stations 106 may be included in a communication system 100. In some configurations, the communication system 100 may operate pursuant to a wireless standard (e.g., IEEE 802.11ah). The access point 104 may communicate with the one or more stations 106 and vice versa. For example, the access point 104 and the one or more stations 106 may transmit and receive wireless communication signals.

A variety of procedures may be used for transmissions in the communication system 100 between the access point 104 and the stations 106. For example, signals may be sent and received between the access point 104 and the stations 106 in accordance with orthogonal frequency-division multiplexing/orthogonal frequency-division multiple access (OFDM/OFDMA) techniques. In this case, the communication system 100 may be referred to as an OFDM/OFDMA system. Alternatively, signals may be sent and received between the access point 104 and the stations 106 in accordance with code division multiple access (CDMA) techniques. In this, the communication system 100 may be referred to as a CDMA system.

A communication link that facilitates transmission from the access point 104 to one or more of the stations 106 may be referred to as a downlink (DL) 108, and a communication link that facilitates transmission from one or more of the stations 106 to the access point 104 may be referred to as an uplink (UL) 110. Alternatively, a downlink 108 may be referred to as a forward link or a forward channel and an uplink 110 may be referred to as a reverse link or a reverse channel.

The access point 104 may act as a base station and provide wireless communication coverage in a basic service area (BSA) 102. The access point 104 and the stations 106 associated with the access point 104 (that use the access point 104 for communication) may be referred to as a basic service set (BSS). It should be noted that the communication system 100 may not have a central access point 104, but rather may function as a peer-to-peer network between the stations 106. Accordingly, the functions of the access point 104 described herein may alternatively be performed by one or more of the stations 106. In other words, an access point may be a station in some configurations.

The access point 104 may transmit a beacon signal (or simply a "beacon"), via a communication link such as the downlink 108, to the stations 106 of the system 100, which may help the stations 106 to synchronize their timing with the access point 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information that is common (e.g. shared) among several devices and/or information specific to a given device.

In some aspects, a station 106 may be required to associate with the access point 104 in order to send communications to and/or receive communications from the access point 104. In one aspect, information for associating is included in a beacon broadcast by the access point 104. To receive such a beacon, the station 106 may, for example, perform a broad coverage search over a coverage region. A search may also be performed by the station 106 by sweeping a coverage region in a lighthouse fashion, for example. After receiving the information for associating, the station 106 may transmit a reference signal, such as an association probe or request, to the access point 104. In some aspects, the access point 104 may use backhaul services, for example, to communicate with a larger network, such as the Internet or a public switched telephone network (PSTN).

The access point 104 may include an access point paging block/module 112, an access point transmit chain 118 and an access point receive chain 120. As used herein, the term "block/module" may be used to indicate that an element may be implemented in hardware (e.g., circuitry), software or a combination of both. For example, the access point paging block/module 112 may be implemented in hardware, software or a combination of both.

The access point transmit chain 118 may include one or more blocks/modules for formatting and transmitting information to the station(s) 106. For example, the access point transmit chain 118 may include and/or be coupled to one or more encoders, modulators (e.g., constellation mapper), amplifiers and/or antennas. Additionally or alternatively, the access point transmit chain 118 may perform one or more functions such as scrambling, interleaving, precoding, etc. The access point transmit chain 118 may transmit information and/or data such as overhead data (e.g., paging messages, beacons, control information, etc.) and payload data (e.g., text, audio, voice, image, video, etc.).

In some configurations, the access point transmit chain 118 may be configured to wirelessly transmit messages, which may be referred to as "paging messages" that are configured to indicate to wireless devices whether or not the wireless devices need to wake up from a doze state and enter an awake state as described herein. For example, the access point transmit chain 118 may be configured to transmit paging messages generated by the access point 104.

The access point receive chain 120 may include one or more blocks/modules for receiving and deformatting information received from the station(s) 106. For example, the access point receive chain 120 may include and/or be coupled to one or more decoders, demodulators, amplifiers and/or antennas. Additionally or alternatively, the access point receive chain 120 may perform one or more functions such as descrambling, deinterleaving, etc. The access point receive chain 120 may receive information and/or data such as overhead data (e.g., polling messages, control information, etc.) and payload data (e.g., text, audio, voice, image, video, etc.).

The access point paging block/module 112 may page the one or more stations 106. For example, if a station 106 is in a power save mode (e.g., sleep state) and the access point 104 has data for transmission to that station 106, the paging block/module 112 may generate a paging message directing the station 106 to enter an awake state. As described above, known approaches for paging may require relatively large amounts of overhead.

In accordance with the systems and methods herein, one or more paging identifiers 116 may identify or correspond to one or more stations 106. Paging identifiers 116 may be utilized in paging procedures as described herein. A paging identifier 116 may identify one or more stations 106. Additionally or alternatively, multiple paging identifiers 116 may identify or correspond to the same station 106. Examples of a paging identifier 116 include a number, a string of bits, a code, an alphanumeric string, etc.

The access point paging block/module 112 may assign at least one paging identifier 116 to at least one station 106. For example, the access point paging block/module 112 may associate at least one paging identifier A 116a with a particular station 106.

The access point paging block/module 112 may partition a paging identifier space into paging identifier sets 114 (e.g., paging identifier sets A 114a). A "paging identifier space" may be a set of all allowed paging identifiers 116. For example, a certain number of bits may be allocated for paging identifiers 116. Accordingly, the paging identifier space may include all possible bit combinations or values for that number of bits. Partitioning the paging identifier space may include grouping paging identifiers 116 (e.g., deriving subsets of the paging identifier space). Accordingly, the access point paging block/module 112 may obtain paging identifier sets A 114a, where each paging identifier set A 114a includes one or more paging identifiers A 116a.

The station 106 may include a station paging block/module 126, a station transmit chain 124 and a station receive chain 122. The station paging block/module 126 may be implemented in hardware, software or a combination of both.

The station transmit chain 124 may include one or more blocks/modules for formatting and transmitting information to the access point 104. For example, the station transmit chain 124 may include and/or be coupled to one or more encoders, modulators (e.g., constellation mapper), amplifiers and/or antennas. Additionally or alternatively, the station transmit chain 124 may perform one or more functions such as scrambling, interleaving, precoding, etc. The station transmit chain 124 may transmit information and/or data such as overhead data (e.g., polling messages, control information, etc.) and payload data (e.g., text, audio, voice, image, video, etc.).

The station receive chain 122 may include one or more blocks/modules for receiving and deformatting information received from the access point 104. For example, the station receive chain 122 may include and/or be coupled to one or more decoders, demodulators, amplifiers and/or antennas. Additionally or alternatively, the station receive chain 122 may perform one or more functions such as descrambling, deinterleaving, etc. The station receive chain 122 may receive information and/or data such as overhead data (e.g., paging messages, polling messages, control information, etc.) and payload data (e.g., text, audio, voice, image, video, etc.). In some configurations, station receive chain 122 may be configured to wirelessly receive paging messages.

The station paging block/module 126 may control a station's 106 response (if any) to a paging message from the access point. For example, the station paging block/module 126 may listen for a paging message and/or interpret the paging message. In some configurations, the station paging block/module 126 may only listen for paging messages at particular times. If a station 106 is in a power save mode (e.g., sleep state) and receives a paging message directing the station 106 to enter an awake state, the station paging block/module 126 may set the station 106 into an awake state in order to receive a data transmission from the access point 104.

The station paging block/module 126 may determine at least one paging identifier B 116*b* assigned to the station 106. For example, the station 106 may receive a message from the access point 104 that indicates a paging identifier assignment. The station paging block/module 126 may designate the paging identifier(s) B 116*b* as assigned paging identifier(s).

The station paging block/module 126 may determine at least one paging identifier set B 114*b* corresponding to the at least one paging identifier B 116*b*. For example, the station 106 may receive a message that indicates a correspondence or an association between the at least one paging identifier B 116*b* and a paging identifier set B 114*b*. For instance, the message may indicate which paging identifier B 116*b* is included within which paging identifier set B 114*b*.

Further detail regarding the functionality of the access point 104 and the station(s) 106 is given above and/or below. In other words, the access point 104 and/or the station(s) 106 may function in accordance with the description (e.g., one or more of the procedures, methods, approaches, structures, etc.) given above and/or below.

More detail regarding an example of an implementation of the systems and methods is given as follows. The access point 104 and/or a station 106 may be used to transmit and/or receive communications including paging messages. That is, either an access point 104 or a station 106 may serve as a transmitter or a receiver device of paging messages. Certain implementations contemplate a signal detector being used by software running on memory and a processor to detect the presence of a transmitter or receiver.

The station 106 may have a plurality of operational modes. For example, the station 106 may have a first operational mode referred to as an awake state or active mode. In the awake state, the station 106 may actively transmit and/or receive data with the access point 104. Further, the station 106 may have a second operational mode referred to as a power save mode. In the power save mode, the station 106 may be in the "awake" state or in a "doze" or "sleep" state (where the station 106 does not actively transmit/receive data with the access point 104, for instance). For example, the station receive chain 122 (and possibly a DSP and signal detector of the station 106, for instance) may operate using reduced power consumption in the doze state. Further, in the power save mode, the station 106 may occasionally enter the awake state to listen to messages from the access point 104 (e.g., paging messages) that indicate to the station 106 whether or not the station 106 needs to "wake up" (e.g., enter the awake state) at a certain time so as to be able to transmit/receive data with the access point 104.

Accordingly, in certain wireless communication systems 100, the access point 104 may transmit paging messages to a plurality of stations 106 in a power save mode in the same network as the access point 104, indicating whether or not the stations 106 need to be in an awake state or a doze state. For example, if a station 106 determines it is not being paged, it may remain in a doze state. Alternatively, if the station 106 determines it may be paged, the station 106 may enter an awake state for a certain period of time to receive the page and further determine when to be in an awake state based on the page. Further, the station 106 may stay in the awake state for a certain period of time after receiving the page. In another example, the station 106 may be configured to function in other ways when being paged or not being paged that are consistent with this disclosure. For example, the page may indicate that the station 106 should enter an awake state for a certain period of time because the access point 104 has data to transmit to the station 106. In some configurations, the station 106 may poll the access point 104 for data by sending the access point 104 a polling message when in the awake state for the period of time. In response to the polling message, the access point 104 may transmit the data to the station 106. As another example, a station 106 may enter a doze state after an access point concludes transmission of a paging message or once the station 106 determines that the station has not been paged by the paging message. The station 106 may then awake when the station 106 may start contending for the medium or transmit any message as described in this disclosure.

As described above, each station 106 of the plurality of stations 106 in the wireless communication system 100 may be assigned at least one paging identifier 116 (by an access point 104, for example). Each station 106 may be assigned one or more such paging identifiers 116. Further, a single paging identifier 116 may be assigned to one or more stations 106. Accordingly, one or more stations 106 may be addressed by a given paging identifier 116. Further, a given station 106 may be addressed by one or more paging identifiers 116. In some aspects, the paging identifiers may be assigned to stations 106 during initialization of each station 106 (e.g., at the time of manufacture of the station 106, at the first run time of the station 106, when a station 106 joins a new wireless network such as wireless communication system 100, etc.). In some aspects, the paging identifiers 116 may be assigned and/or additionally revised (e.g., reassigned), such as through communication with other devices in the wireless communication system 100, such as the access point 104. In some aspects, the access point 104 may determine or assign paging identifiers 116 for the stations 106 associated with the access point 104 and transmit messages indicative of the paging identifiers to the stations 106.

All of the paging identifiers 116 available (or alternatively assigned to the stations 106) in the wireless communication system 100 may be referred to as a paging identifier space for the wireless communication system 100 (or alternatively for the access point 104). This paging identifier space may be divided into a plurality of paging identifier sets 114, each set including one or more of the paging identifiers 116 in a paging identifier set 114. As described above, these paging identifier sets 114 may be disjoint or overlapping, meaning that in certain aspects a plurality of the paging identifier sets 114 may include the same paging identifier 116, and in certain aspects one paging identifier set 114 may include a paging identifier 116 that another paging identifier set 114 does not include. Further, the paging identifier sets 114 may be of the same or different sizes, meaning they contain the same or different numbers of paging identifiers. Further, some paging identifier sets 114 may include a continuous interval of paging identifiers (such as a sequential series of paging identifiers 116), while some paging identifier sets 114 may include paging identifiers 116 that do not form a continuous interval. In one aspect, a special paging identifier set may include the entire set of paging identifiers 116. Such a special paging identifier set may be referred to as a broadcast paging identifier subset. In certain aspects, similar to how the station 106 may be assigned a paging identifier so that the station 106 is aware of its paging identifier as described above, the station 106 may be assigned or given information to identify the paging identifier sets 114 that the station 106 is associated with. In some configurations, the access point 104 may utilize the paging identifier 116 and paging identifier sets 114 along with paging messages as described herein to enable the stations 106 to selectively receive only certain paging messages from the access point 104.

In some configurations, a station 106 may have an association identifier (AID). In some configurations, the one or more paging identifiers are one or more AIDs. In other configurations, AID may be distinct from the one or more paging identifiers 116 of the station 106. The AID may identify the station 106 within an area such as a BSA 102 (and/or within the BSS, for example). The AID may be used as an address or a part of an address and may be shorter than other addresses of the station such as an Internet protocol (IP) address or a Media Access Control (MAC) address. The AID may be included in a frame to uniquely identify a sender or receiver of a message. For example, the AID may be included in a MAC header to identify a transmitting station when the AID may be used for addressing a frame. Further, a presentation protocol data unit (PPDU) header may include an AID or a partial AID that may be used as an early indication of an intended receiver of the frame. Advantageously, such a PPDU header may permit early termination of processing a received PPDU that is indicated to be for different receiver. In some aspects, the AID may be assigned (by the access point 104, for example) at initialization of each station 106 (e.g., at manufacture and/or when a station 106 joins a wireless network).

A station 106 may have both an AID and one or more paging identifiers 116 as described herein. For instance, one paging identifier 116 may relate to a power save wake-up schedule or a schedule at which an associated paging message is transmitted by an access point. Further, if the power save wake-up schedule of the station changes, a different paging identifier 116 and/or AID may be assigned to the station 106.

In some configurations, paging messages may include a token number. The token number may serve as an identifier of a paging message. A station 106 paged by a paging message with a token number may respond with a power save poll request message (PS-POLL) that also includes the token number (taken from a beacon, for example). The token number may include one or more of BSS identifier (BSSID), TSF, etc. The token number accordingly may enable an access point 104 to identify the PS-POLL as corresponding to the paging message. Advantageously, the token number may be used as an identifier for the paging message sender and permit the PS-POLL sender to transmit less data in the PS-POLL since the address of the sender or receiver may not be transmitted, for example.

The token number included in paging messages may vary from one paging message to subsequent paging messages. The token number may change, for instance, based on a number of stations in the BSS (and/or the BSA 102, for example), a formula, or a random generation procedure. Advantageously, changing the token number more frequently may prevent issues with overlapping BSSs where each BSS utilizes token numbers or similar approaches.

Figure 2:
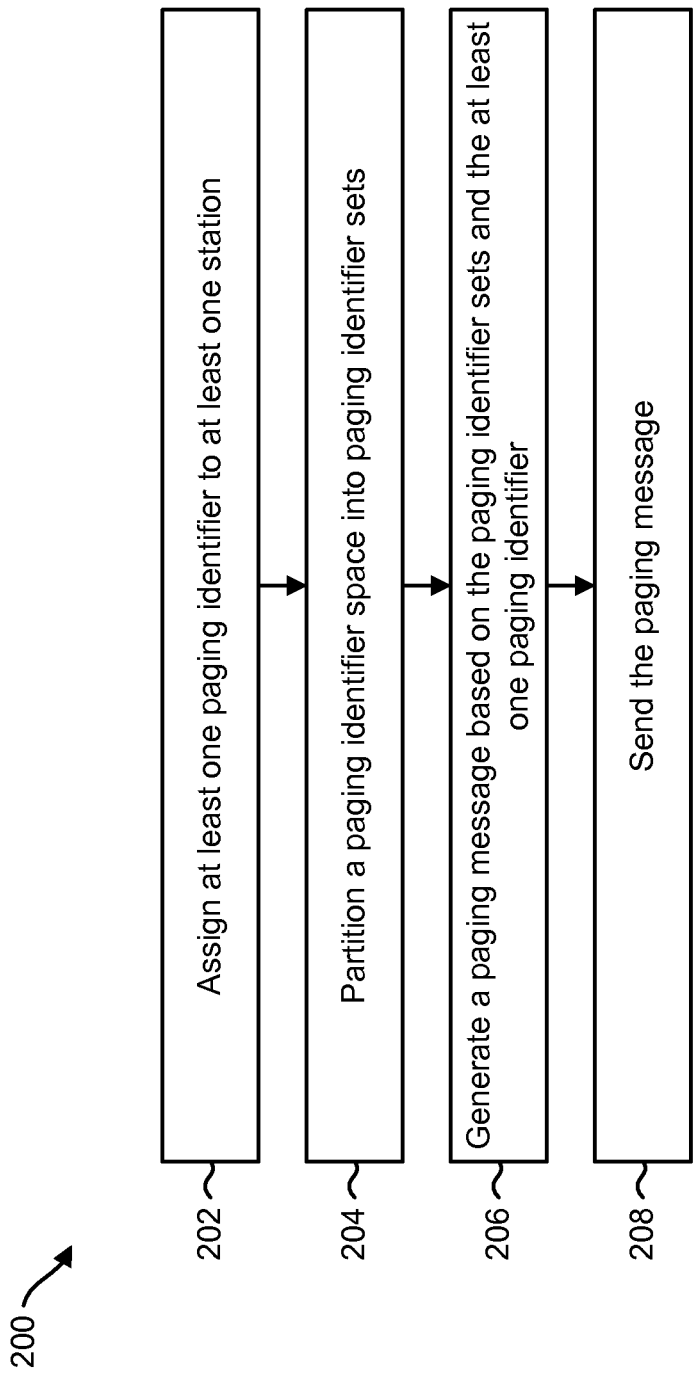
FIG. 2 is a flow diagram illustrating one configuration of a method for reduced overhead paging.

FIG. 2 is a flow diagram illustrating one configuration of a method 200 for reduced overhead paging. An access point 104 may assign 202 at least one paging identifier 116 to at least one station 106. For example, the access point 104 may associate at least one paging identifier 116 with a particular station 106. In some configurations, the access point 104 may send a message to the station 106 indicating the assigned paging identifier 116.

The access point 104 may partition 204 a paging identifier space into paging identifier sets 114. Partitioning the paging identifier space may include grouping paging identifiers 116 (e.g., deriving subsets of the paging identifier space). Accordingly, the access point paging block/module 112 may obtain paging identifier sets A 114a, where each paging identifier set A 114a includes one or more paging identifiers A 116a.

It should be noted that the paging identifier sets 114 may be disjoint or overlapping. For example, a single paging identifier 116 may belong to one or more paging identifier sets 114. Additionally or alternatively, paging identifier sets 114 may be of different sizes or of the same size. In some configurations, a paging identifier set 114 may include a continuous interval of paging identifiers 116. This may provide a structure that is similar to that of a traffic indication map. As described above, special paging identifier sets may include all paging identifiers.

In some configurations, the access point 104 may send a message to the station indicating the paging identifier sets 114 (e.g., the paging identifier set(s) 114 that include one or more paging identifiers 116 corresponding to the station 106). For example, the message may indicate a relationship or association between one or more paging identifier sets 114 and the one or more paging identifiers 116 corresponding to the station 106. Each paging identifier set 114 may be represented by and/or indicated by a paging identifier set value. Examples of a paging identifier set value include a number, a string of bits, a code and/or an alphanumeric string, etc.

The access point 104 may generate 206 a paging message based on the paging identifier sets 114 and the at least one paging identifier 116. For example, each paging message may correspond to (e.g., indicate) one or more paging identifier sets 114. In one configuration, a paging identifier set 114 may be explicitly identified in the paging message. For example, the paging message may include a field (e.g., a two-byte field) that explicitly indicates a paging identifier set 114. Additionally or alternatively, an explicit identifier may be sent in a physical layer preamble. In another configuration, the paging message may implicitly indicate a paging identifier set 114 based on a sequence number of a paging frame. In yet another configuration, the paging message may implicitly indicate a paging identifier set 114 based on the time at which the paging message is sent.

In generating 206 the paging message, the access point 104 may determine whether it has any data pending for transmission to a station 106 and whether the station 106 is in a sleep state. If there is data pending for transmission to the station 106 and the station 106 is in a sleep state, the access point may generate 206 a paging message directing the station 106 to enter an awake state. For example, the access point 104 may indicate that a station 106 is being paged if the individual station 106 is addressed or indicated in the paging message with a corresponding paging identifier set 114.

In one configuration, individual stations 106 may be addressed relative to the paging identifier set 114 indicated by the paging message. For example, a bitmap of N bits may be utilized, where each bit indexes a specific station address relative to the set. The relative position within the set may be assigned a priori through a specific management message (in assigning 202 the at least one paging identifier 116, for example). This management message may define the association between each paging identifier 116 and a paging identifier set 114. Alternatively, the relative position within the paging identifier set 114 may be represented by an offset from a paging identifier set value (assuming the paging identifier set value represents a starting address for the paging identifier set 114, for instance).

In another configuration, absolute addressing may be utilized to identify individual stations 106 within a paging identifier set 114. For example, local or global addresses may identify individual stations 106. In some implementations, partial addresses may be used. Additionally or alternatively, full paging identifiers may be utilized.

In yet another configuration, no explicit indication may be used to address individual stations 106 within a paging identifier set 114. For example, whenever a paging identifier set 114 is indexed, all stations corresponding to the paging identifier set 114 are implicitly paged. Alternatively, for example, one bit may be utilized to indicate whether all of or none of the stations 106 corresponding to the paging identifier set 114 are paged. Alternatively, all stations 106 within a given range are paged.

The access point 104 may send 208 the paging message. For example, at each paging epoch, a frame may be sent by the access point 104. Each frame may page one or more sets of stations. Each frame may include a list of specific stations being paged within the set. In some configurations, the schedule at which each set is paged may be defined a priori (e.g., the access point 104 and stations 106 may have a defined schedule). A station 106 may wake up at a time specified by the schedule.

Figure 3:
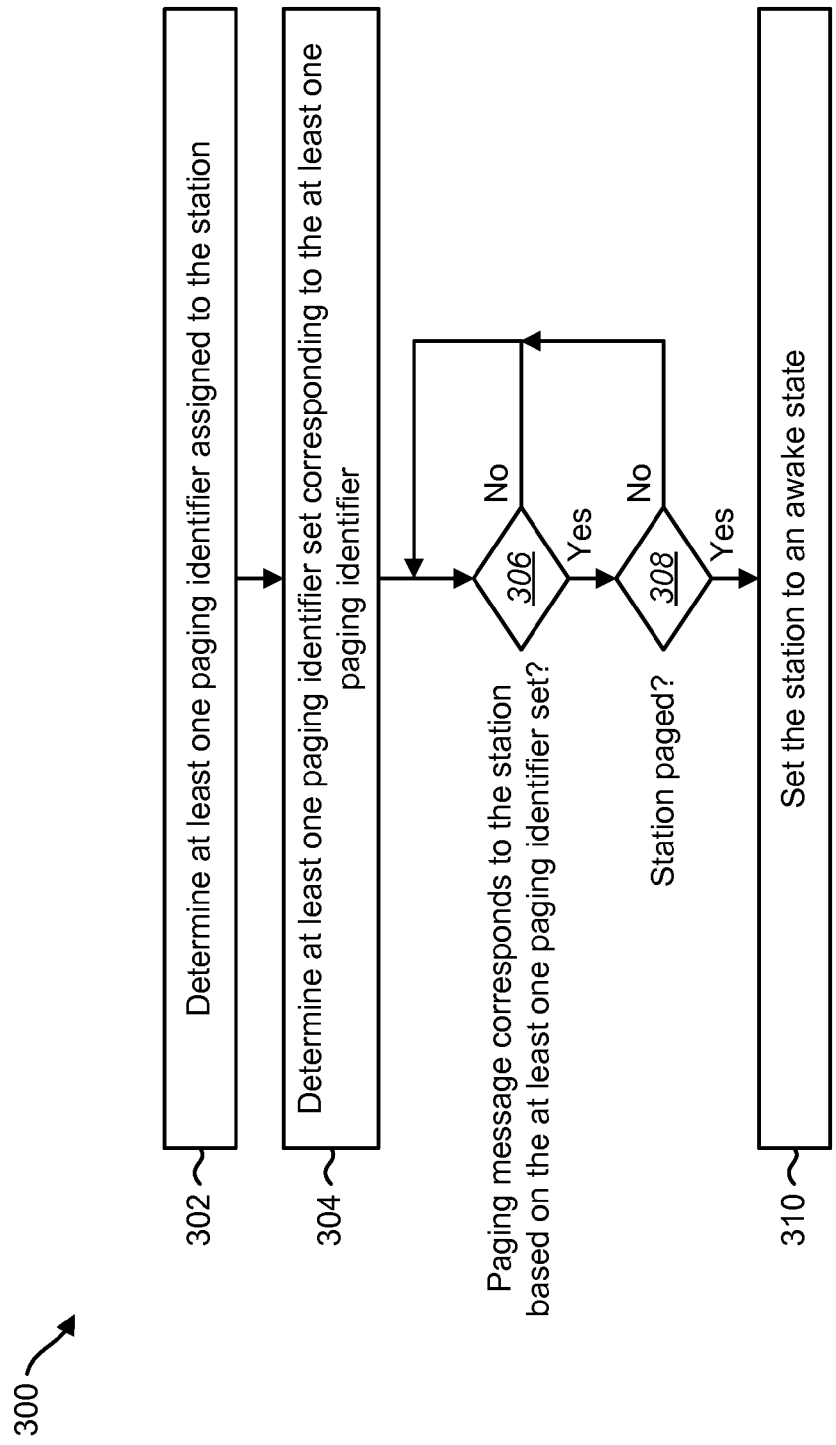
FIG. 3 is a flow diagram illustrating another configuration of a method for reduced overhead paging.

FIG. 3 is a flow diagram illustrating another configuration of a method 300 for reduced overhead paging. A station 106 may determine 302 at least one paging identifier 116 assigned to the station 106. For example, the station 106 may receive a message from an access point 104 that indicates one or more paging identifiers 116 that are assigned to the station 106.

The station 106 may determine 304 at least one paging identifier set 114 corresponding to the at least one paging identifier 116. For example, the station 106 may receive a message from the access point 104 that indicates a relationship or association between the at least one paging identifier 116 (assigned to the station 106) and the at least one paging identifier set 114.

The station 106 may determine 306 whether a paging message corresponds to the station 106 based on the at least one paging identifier set 114. For example, this determination 306 may be based on whether the paging message is associated with a paging identifier set 114 that corresponds to the station 106. A paging identifier set 114 may correspond to the station 106 if it includes a paging identifier 116 that corresponds to or identifies the station.

In making this determination 306, the station 106 may or may not receive a paging message from the access point 104. In some configurations, for example, the station 106 may only receive paging messages according to a predetermined schedule that is based on or associated with a paging identifier set 114 corresponding to the station 106. For instance, the station 106 may disregard, ignore and/or not receive paging messages that are sent at unscheduled times. In other configurations, the station 106 may receive all of the paging messages and disregard or ignore those paging messages that do not correspond to a paging identifier set 114 corresponding to the station 106. Accordingly, if the station 106 determines 306 that a paging message does not correspond to the station 106 based on the at least one paging identifier set 114 (because the paging message is not at a scheduled time for a paging identifier set 114 corresponding to the station 106 and/or because the paging message does not indicate a paging identifier set 114 corresponding to the station 106, for example), then the station 106 may determine 306 if a next paging message corresponds to the station 106 based on the at least one paging identifier set 114.

If the paging message corresponds to the station 106 based on the at least one paging identifier set 114 (e.g., the paging message is at a scheduled time for a paging identifier set 114 corresponding to the station 106 and/or the paging message indicates a paging identifier set 114 corresponding to the station 106), then the station 106 may determine 308 whether the station 106 is paged. For example, the station 106 may determine whether the station 106 is addressed by the paging message. As described above, the station 106 may be addressed relative to the paging identifier set 114. For example, a particular position relative to the paging identifier set 114 may address the station 106. In another example, an offset from a paging identifier set value may address the station 106. In yet another example, absolute addressing (with full and/or partial addresses, for example) may be utilized to address the station 106.

In other configurations, no explicit indication may be used for individual stations 106 within a paging identifier set 114. For example, all stations 106 corresponding to the paging identifier set 114 may be implicitly paged when the paging identifier set 114 is indicated. Alternatively, an indicator (e.g., one bit) may indicate whether all or none of the stations 106 corresponding to the paging identifier set 114 are paged. In another alternative, all stations 106 within a given range are paged.

If the station 106 is not paged, the station 106 may determine 306 whether a next paging message corresponds to the station based on the at least one paging identifier set 114. However, if the station 106 is paged, then the station 106 may set 310 the station 106 to an awake state. While in the awake state, for example, the station 106 may receive data from the access point 104.

Figure 4:
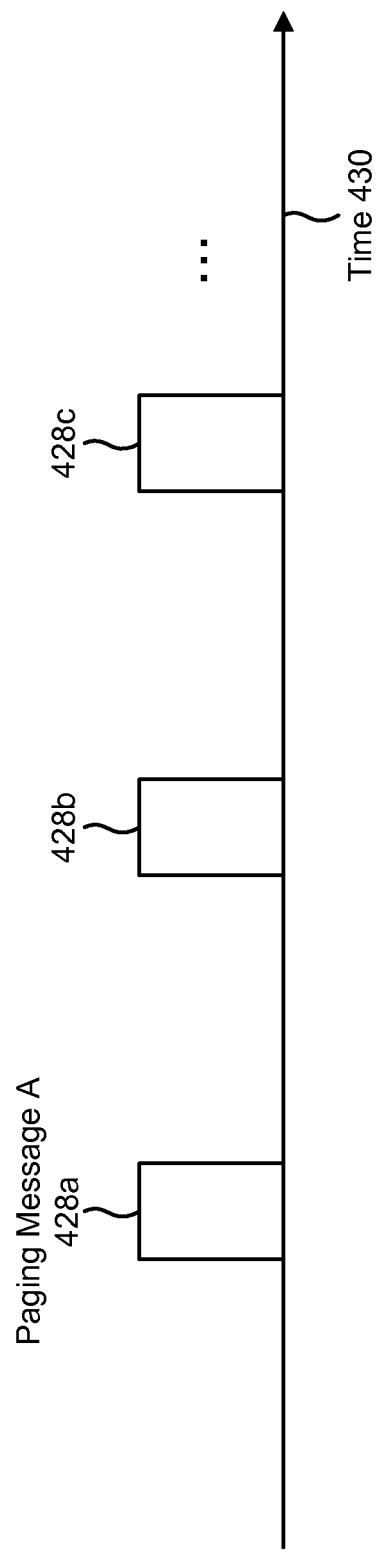
FIG. 4 is a diagram illustrating examples of paging messages over time.

FIG. 4 is a diagram illustrating examples of paging messages 428 over time 430. For instance, the paging messages 428*a-c* may be transmitted by the access point 104 to stations 106 in the wireless communication system 100 described in connection with FIG. 1. As illustrated in FIG. 4, the access point 104 is configured to transmit a plurality of paging messages 428 over time 430. The paging messages 428 may be sent in a TIM frame, a beacon or using some other appropriate signaling. In some implementations, the stations 106 may be configured to listen to one or more of the paging messages 428 as follows.

In some configurations, each paging message 428 may include one or more paging identifier set values that correspond to the paging identifier set(s) 114 for which the paging message 428 is intended. In one example, the paging identifier set value may be a two-byte field capable of indexing $2^{16}$ paging identifier sets 114. In another example, the paging identifier set value may be included in a physical layer (PHY) preamble of the paging message 428. The stations 106 may be assigned or given information about the paging identifier set value(s) that refer to paging identifier sets 114 corresponding to the stations 106. Accordingly, stations 106 may receive the paging message 428. A station 106 may determine whether the paging message 428 corresponds to the station 106 based on the paging identifier set value(s) in the paging message 428. For example, if the paging message 428 includes a paging identifier set value for a paging identifier set 114 corresponding to the station 106, the station 106 determines the paging message 428 corresponds to the station 106. Further, if the paging message 428 does not include a paging identifier set value for a paging identifier set 114 corresponding to the station 106, the station 106 determines that the paging message 428 does not correspond to the station 106.

In another example, the access point 104 may be configured to transmit N paging messages 428 in sequence (where N is any positive integer), in order to page the stations 106 at a given time. Accordingly, each paging message 428 in the sequence may be associated with a sequence number n in the N paging messages (n=1, . . . , N). Each sequence number n may be associated with one or more paging identifier sets 114.

Accordingly, the station 106 may determine the paging message 428 corresponds to the station 106 based on the sequence number n of the paging message 428. For example, if the sequence number n of the paging message 428 is associated with a paging identifier set 114 that includes a paging identifier 116 of the station 106, the station 106 determines the paging message 428 corresponds to the station 106. Further, if the sequence number n of the paging message 428 is not associated with a paging identifier set 114 that includes a paging identifier 116 of the station 106, the station 106 determines that the paging message 428 does not correspond to the station 106.

In some configurations, the station 106 may be assigned or given information regarding the relationship or association between sequence numbers and paging identifier sets 114. This may enable a station 106 to listen for paging messages 428 with paging identifier set(s) 114 that correspond to the station 106. For example, the sequence number(s) n of the paging message(s) for the paging identifier set(s) 114 corresponding to the station 106 may be transmitted by the access point 104. The station 106 may listen for the sequence number(s). In some cases and/or configurations, the access point 104 may associate paging identifier sets 114 with sequence numbers. As described above, a paging identifier set value may correspond to a paging identifier set 114. Further, the station 106 may determine whether a paging identifier set 114 is associated with a sequence number n based on the paging identifier set value. For example, if the paging identifier set value of the paging identifier set 114 equals mod(n, 256), the paging identifier set 114 is associated with the sequence number n. If the value of the paging identifier set value of the paging identifier set 114 does not equal mod(n, 256), the paging identifier set 114 is not associated with the sequence number n.

In some configurations, the access point 104 may be configured to transmit paging messages 428 at certain times (e.g., at specific time intervals, which may repeat periodically). Accordingly, each paging message 428 may be associated with a particular time interval. Each time interval may be associated with one or more paging identifier sets 114. In these configurations, the station 106 may determine whether the paging message 428 corresponds to the station 106 based on the time interval during which the paging message 428 is transmitted. For example, if the time interval of the paging message 428 is associated with a paging identifier set 114 that includes a paging identifier 116 of the station 106, the station 106 determines the paging message 428 corresponds to the station 106. Further, if the time interval of the paging message 428 is not associated with a paging identifier set 114 that includes a paging identifier 116 of the station 106, the station 106 determines the paging message 428 does not correspond to the station 106.

In some configurations, the station 106 may be assigned or given information regarding the relationship or association between time intervals and paging identifier sets 114. This may enable the station(s) 106 to listen for paging messages 428 with paging identifier set(s) 114 that correspond to the station 106. In some cases and/or configurations, the access point 104 may associate paging identifier sets 114 with time intervals. Further, the station 106 may determine whether a given paging message 428 corresponds to the station 106 based on the time interval. If the station 106 determines that the paging message 428 corresponds to the station 106, the station 106 may further determine whether the station 106 is paged. The station 106 may set itself to a particular state (e.g., an awake state) if the station 106 is paged. This may be accomplished based on the content of the paging message 428 as described below.

Figure 5:
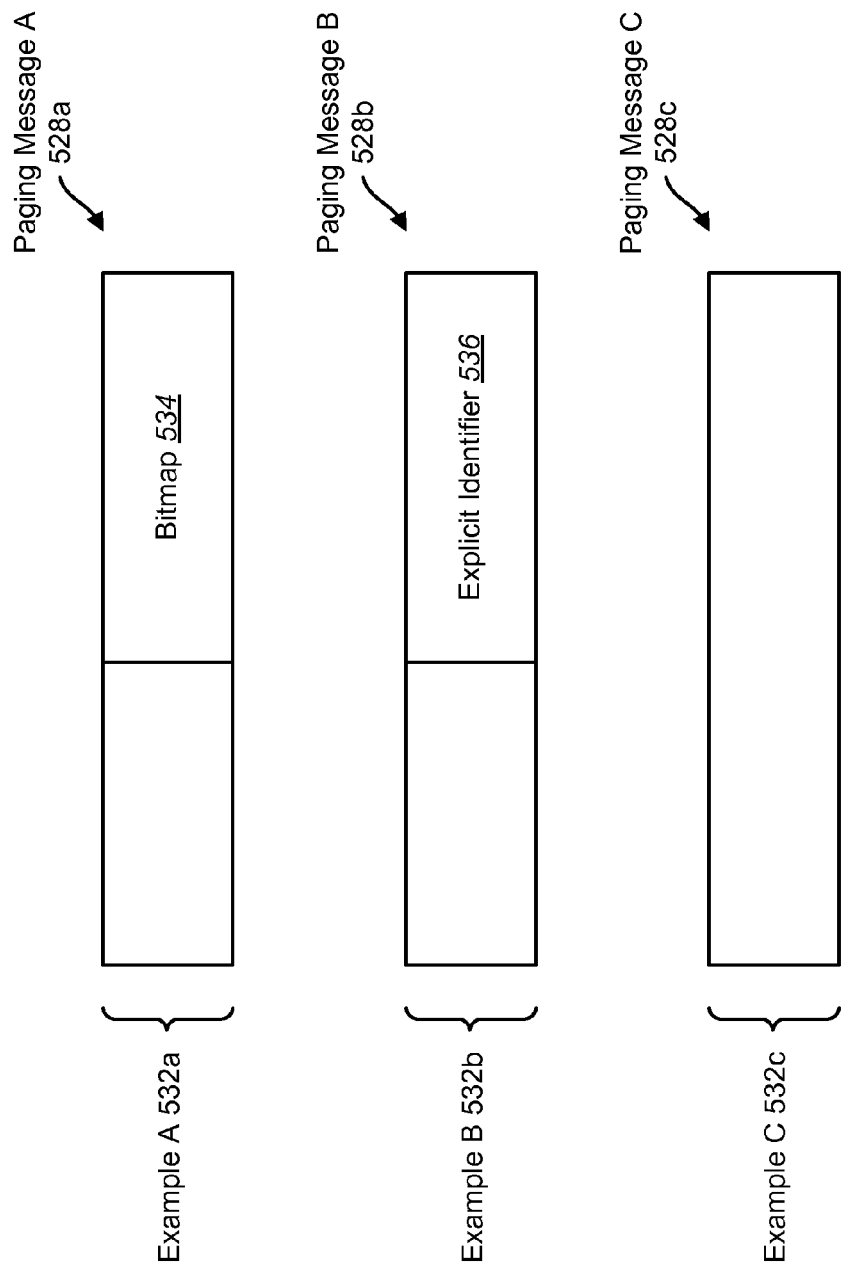
FIG. 5 is a diagram illustrating examples of paging messages in accordance with the systems and methods disclosed herein.

FIG. 5 is a diagram illustrating examples 532a-c of paging messages 528a-c in accordance with the systems and methods disclosed herein. Example A 532a illustrates paging message A 528a. As illustrated, paging message A 528a includes a bitmap 534 of N bits (where N may be any positive integer). Each bit (e.g., bit position) in the bitmap 534 may correspond to a particular paging identifier 116 (e.g., station 106) of the stations 106 that are associated with the paging identifier set(s) 114 associated with the paging message A 528a. Further, the value of each bit (e.g., 0 or 1) may indicate or direct a state (e.g., doze or awake) of the station 106 with the corresponding paging identifier 116. Accordingly, the station 106 may determine its operational state by determining the value of its corresponding bit in the bitmap 534.

In some configurations, the station 106 may be assigned or given information from the access point 104 regarding which bit position(s) in the bitmap 534 is associated with the paging identifier(s) 116 of the station 106. For example, associations between bit positions and paging identifiers 116 may be set by the access point 104 or another device in the wireless communication system 100 and communicated to the station 106 via a message (e.g., a management message).

In other configurations, the paging identifier sets 114 may be associated with paging identifier set values that represent a starting address for each of the paging identifiers 116 in the paging identifier set 114. For example, if the paging identifiers 116 in a paging identifier set 114 are sequential (e.g., 11, 12, 13, 14, etc.), the paging identifier set 114 identifier may be 10. Accordingly, the remaining portion of a paging identifier 116 that is not part of the paging identifier set value may be used as an index to the bitmap 534. Thus, a station 106 may use associated paging identifier(s) 116 and index the bitmap 534 to determine the directed operation state of the station 106. Continuing the above example, if the station 106 is associated with paging identifier value of 11, it may look for the value of the bit at position 1 in the bitmap 534 to determine the directed operation state of the station 106. In some aspects, the bit in position N of the bitmap 534 refers to the stations 106 with a paging identifier value=N+256*paging identifier set value.

Example B 532b illustrates paging message B 528b. As illustrated, paging message B 528b may include an explicit identifier 536 of a paging identifier 116 corresponding to a station 106. Examples of the explicit identifier 536 include a value, string of bits, code, alphanumeric string (e.g., an absolute address such as a local or global internet protocol (IP) address or a local or global media access control (MAC) address of the stations 106). In some configurations, the explicit identifier 536 may be an AID. Based on the explicit identifier, a station 106 corresponding to the paging identifier set(s) 114 associated with the paging message B 528*b* that has determined that the paging message B 528*b* corresponds to the station 106 may further determine if the station 106 is paged. For example, if the paging message B 528*b* includes an explicit identifier 536 of a paging identifier 116 associated with the station 106, the station 106 determines that the station 106 is paged. If the paging message B 528*b* does not include an explicit identifier 536 of a paging identifier 116 associated with the station 106, the station 106 determines that it 106 is not paged.

Example C 532*c* illustrates paging message C 528*c*. As illustrated, paging message C 528*c* may include no explicit indication of the paging identifiers 116 associated with stations 106 to be paged. Rather, the stations 106 that are associated with the paging identifier set(s) 114 associated with the paging message C 528*c* may determine that they stations 106 are paged (implicitly). Accordingly, the paging message C 528*c* implicitly indicates paging for all paging identifiers 116 in the paging identifier set(s) 114 associated with the paging message C 528*c*. In some configurations, a single bit may be included in paging message C 528*c* to indicate or direct the operational state (e.g., awake or doze) of all stations 106 associated with the paging identifier set(s) 114 associated with the paging message C 528*c*. For example, the value of the bit (0 or 1) indicates the state of all stations 106 with paging identifiers 116 included in the paging identifier set(s) 114 corresponding to paging message C 528*c*. In another configuration, presence of the bit in the paging message C 528*c* (e.g., whether the paging message C 528*c* includes the bit or not) may indicate or direct the state of the stations 106. Accordingly, based on the above messaging schemes and techniques, reduced overhead paging may be achieved in the wireless communication network 100.

Figure 6:
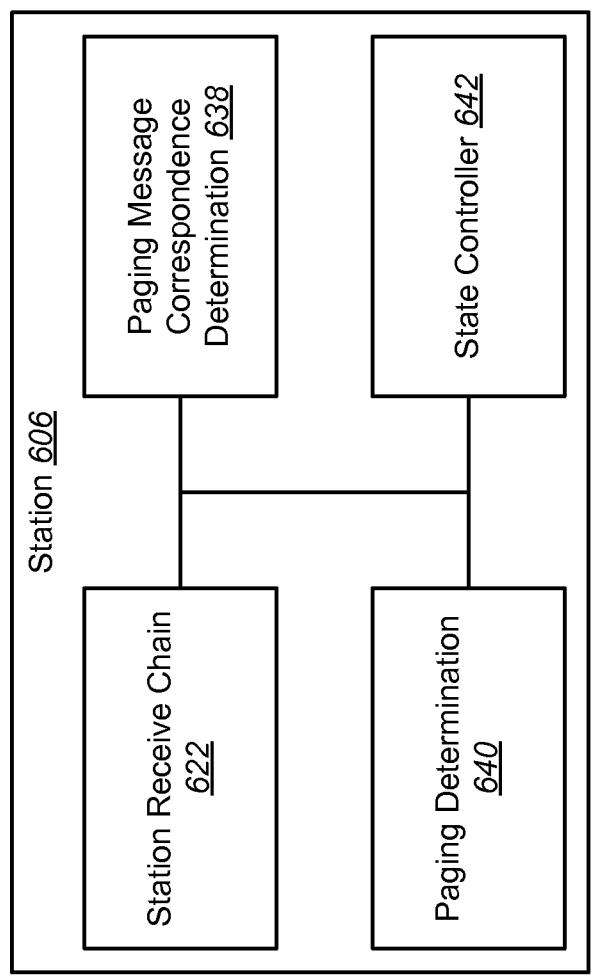
FIG. 6 is a block diagram illustrating one example of station elements that may be implemented for reduced overhead paging.

FIG. 6 is a block diagram illustrating one example of station 606 elements that may be implemented for reduced overhead paging. One or more of the elements 622, 638, 640, 642 may be included within the station 106 described above in connection with FIG. 1. The station 606 includes a receive chain 622 for receiving a plurality of paging messages from another wireless device such as the access point 104. The receive chain 622 may be configured to perform one or more of the functions of the station receive chain 122 described above in connection with FIG. 1.

The station 606 further includes a paging message correspondence determination block/module 638 for determining whether one or more of the paging messages correspond to the station 606 based on at least one paging identifier set 114. For example, the paging message correspondence determination block/module 638 may be configured to perform one or more of the functions described above with respect to step 306 illustrated in FIG. 3. In some configurations, the paging message correspondence determination block/module 638 may be implemented with a processor and instructions stored in memory.

The station 606 further includes a paging determination block/module 640 for determining whether the station 606 is paged. The paging determination block/module 640 may be configured to perform one or more of the functions described above with respect to step 308 illustrated in FIG. 3. In some configurations, the paging determination block/module 640 may be implemented with a processor and instructions stored in memory. The station 606 further includes a state controller 642 for setting the operational state of the station 606. The state controller 642 may be configured to perform one or more of the functions described above with respect to step 310 illustrated in FIG. 3. In some configurations, the state controller 642 may be implemented with a processor and instructions stored in memory. In some configurations, the paging correspondence determination block/module 638, the paging determination block/module 640 and/or the state controller 642 may be included in and/or coupled to the station paging block/module 126 described in connection with FIG. 1.

As described above, paging identifiers 116 and paging identifier sets 114 may be assigned and generated (by partitioning, for example) by the access point 104. In some configurations, the access point 104 may perform these operations based on information from the station 106 about when the station 106 requests such pages. This may lead to significant overhead at the access point 104 for performing such scheduling to accommodate requests of multiple stations 106.

In some configurations, additionally or alternatively, the access point 104 may transmit paging messages for particular paging identifiers 116 at specific time intervals. For example, a paging message comprising a bitmap of particular paging identifiers 116 may be transmitted at specific timer intervals. Other paging messages may include bitmaps for different paging identifiers 116 and may be transmitted at different intervals. For example, a first paging message may include a bitmap for a first paging identifier set 114 (e.g., paging identifiers 1-32). The first paging message may be transmitted once per three beacons (e.g., beacon 1, 4, 7, etc.). Further, a second paging message may include a bitmap for a second paging identifier set 114 (e.g., paging identifiers 33-64). The second paging message may be transmitted once per three beacons following the first paging message (e.g., beacon 2, 5, 8, etc.) Further, a third paging message may include a bitmap for a third paging identifier set 114 (e.g., paging identifiers 65-96). The third paging message may be transmitted once per three beacons following the second paging message (e.g., beacon 3, 6, 9, etc.). A station 106 may be assigned a paging identifier 116 from the access point 104 (e.g., a paging identifier 116 in either the first, second, or third paging identifier set 114) that is transmitted according to a particular schedule (e.g., interval schedule). Accordingly, the station 106 may be assigned a particular paging message transmission schedule from a finite group of schedules. This information can further be used as a timing source for the station 106 and reduces overhead at the access point 104. In some configurations, the station 106 may request a paging message schedule assignment. For example, the access point 104 and the station 106 may agree to a particular paging message schedule.

In some configurations, after receiving a paging message from the access point 104 indicating the access point 104 has data for the station 106, the station 106 may send a polling message to the access point 104 in order to receive the data from the access point 104. In some aspects, multiple stations 106 may be paged by the access point 104 as described above. Accordingly, the multiple stations 106 may contend for one or more communication channels with the access point 104 in order to transmit the polling messages to the access point 104. If several stations 106 attempt to send polling messages to access points such as the access point 104 at the same time, the polling messages may collide. In some configurations, the schedule of when the station 106 transmits a polling message may be based on the paging identifier 116 of the station 106 and/or the paging identifier set 114(*s*) to which the station 106 belongs in order to reduce the likelihood of collisions as described below.

In one configuration, a station 606 may determine when to poll the access point 104 for data based on the paging identifier 116 of the station 106 upon receiving a paging message indicating that the access point 104 has data for the station 106. For example, as described above with respect to example A 532a in FIG. 5, the paging message may include a bitmap of N bits (where N is any positive integer). Each bit in the bitmap may correspond to a particular paging identifier 116 or station 106 of the stations 106 that are associated with the paging identifier set(s) 114 associated with the paging message. Further, the value of each bit (e.g., 0 or 1) may indicate the state the corresponding station 106 with such a paging identifier 116 should be in (e.g., doze or awake). Stations 106 associated with a bit having a value of 1 may determine that the station 606 is paged (e.g., the access point 104 has data to transmit to the station 106) based on the bit value. In some configurations, the station 106 may determine a time to poll the access point 104 based on the position of the bit corresponding to the station 106 in the bitmap. For example, if the bit associated with the station 106 is the $x^{th}$ bit, the station 106 may poll the access point 104 at a time based on a function of x (e.g., x*n microseconds (µs) after receiving the paging message, where n is any positive integer). In another example, the station 106 may determine a time to poll the access point 104 based on a hash function of the paging identifier 116 (e.g., a hash of the paging identifier 116 and the timestamp of the paging message).

In another configuration, the station 106 may determine a time to start contending for a channel to transmit a polling message to the access point 104 based on the paging identifier 116 (instead of determining an exact time to poll the access point 104, for example). For instance, if the bit associated with the station 106 is the $x^{th}$ bit, the station 106 may contend for the channel at a time based on a function of x (e.g., x*n µs after receiving the paging message, where n is any positive integer). In another example, the station 106 may determine a time to contend for the channel based on a hash function of the paging identifier 116 (e.g., a hash of the paging identifier 116 and the timestamp of the paging message).

In yet another configuration, the station 106 may use a backoff counter (similar to the backoff counter of the IEEE 802.11 standard) to determine when to transmit a polling message to the access point 104. For example, the station 106 may countdown a backoff counter from a starting value, and when the counter reaches 0, the station 106 may transmit the polling message. The station 106 may also determine if the channel is active (there is traffic on the channel) or the channel is idle (there is no traffic on the channel) while counting down. If the channel is active, the station 106 may freeze the countdown until the channel is idle again. The station 106 may determine the starting value of the backoff counter based on the paging identifier 116. For example, if the bit associated with the station 106 is the $x^{th}$ bit, the station 106 may set the backoff counter at a value based on a function of x (e.g., x*n µs after receiving the paging message, where n is any positive integer). In another example, the station 106 may set the backoff counter at a value based on a hash function of the paging identifier 116 (e.g., a hash of the paging identifier 116 and the timestamp of the paging message).

The use of paging identifiers 116 and paging identifier sets 114 for transmitting and receiving paging messages as described above may be performed through message exchange between the stations 106 and the access point 104. The messages may take a variety of different formats. Below are described some of the formats that different messages may take and the usage of such messages with respect to the aspects described herein.

Figure 7:
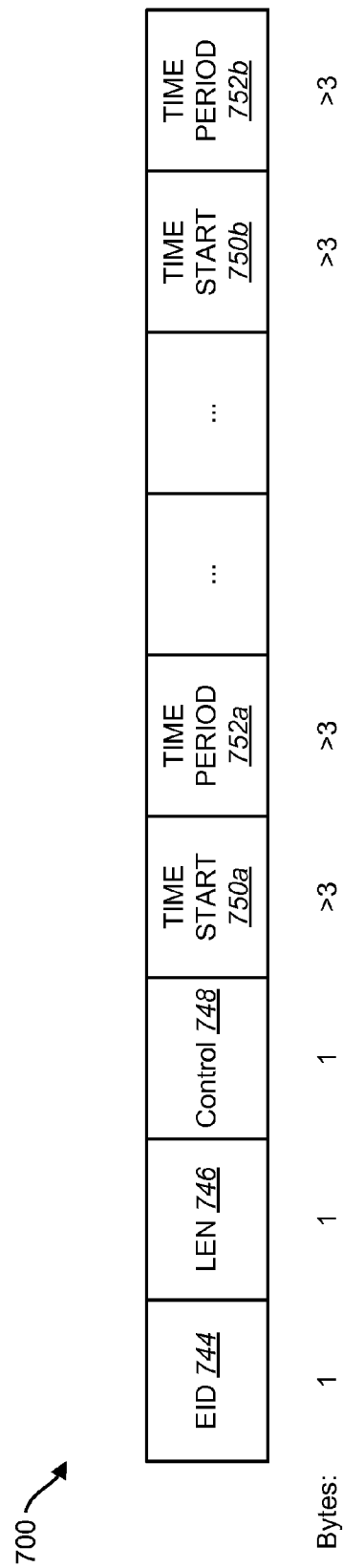
FIG. 7 illustrates one example of a frame format for a message.

FIG. 7 illustrates one example of a frame format for a message 700. The message 700 may be transmitted from the station 106 to the access point 104 to set up paging intervals and/or obtain a paging identifier 116. The message 700 may be referred to as a page setup request message 700. As shown in FIG. 7, the message 700 includes an equipment identifier (EID) field 744 comprising 1 byte, followed by a frame length (LEN) field 746 comprising 1 byte, followed by a control field 748 comprising 1 byte, followed by one or more time start fields 750a-b and time period fields 752a-b, each comprising at least 3 bytes. The time start fields 750a-b indicate a time the station 106 requests a paging interval to start (a time period where the station 106 will wake up) and the time period fields 752a-b indicate a time period for the paging intervals. The times may be indicative of, for example, a number of beacon periods, a number of seconds, a number of microseconds, a multiple of a number of microseconds, or some other unit of measure. The control field 748 may indicate the manner in which the time is indicated. The response from the access point 104 to the message 700 may be a page setup response message or an acknowledgement (ACK) (e.g., an enhanced ACK with a time indication).

Figure 8:
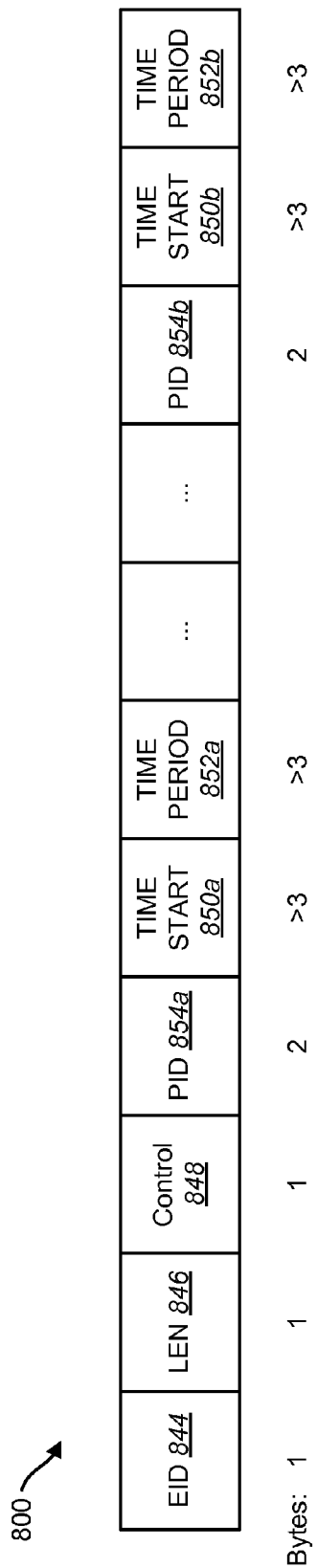
FIG. 8 illustrates another example of a frame format for a message.

FIG. 8 illustrates another example of a frame format for a message 800. The message 800 may be transmitted from the station 106 to the access point 104 to set up paging intervals and/or obtain a paging identifier 116. The message 800 includes the same fields as the message 700 described in connection with FIG. 7 (e.g., an EID field 844, a LEN field 846, a control field 848, one or more time start fields 850a-b and one or more time period fields 852a-b). However, the message 800 further includes one or more paging identifier (PID) (e.g., paging identifier 116) fields 854a-b comprising 2 bytes before each time start field 850a-b and time period field 852a-b. The PID field 854 may indicate a specific paging identifier 116 the station 106 requests for scheduling during the associated time start and time period.

Figure 9:
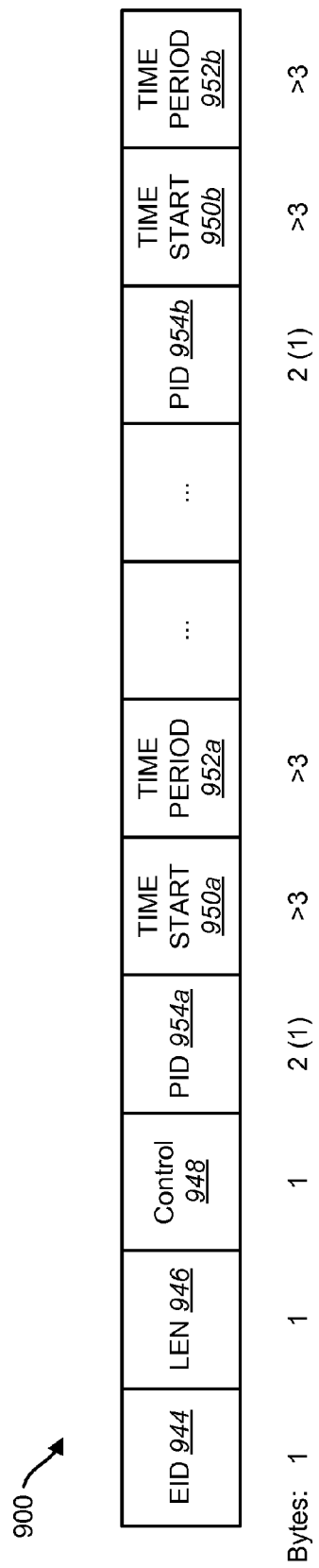
FIG. 9 illustrates another example of a frame format for a message.

FIG. 9 illustrates another example of a frame format for a message 900. The message 900 may be transmitted from the access point 104 to the station 106. The message 900 may be referred to as a page setup response message 900. The message 900 may be sent by the access point 104 in response to receipt of a message (e.g., the message 700 in FIG. 7 or the message 800 in FIG. 8) from the station 106. The message 900 may include similar fields (e.g., an EID field 944, a LEN field 946, a control field 948, one or more time start fields 950a-b, one or more time period fields 952a-b and one or more PID fields 954a-b) to those included in the message 800 described in connection with FIG. 8. The control field 948 may be used to indicate the status (e.g., denied, accepted) of the request for a paging interval and/or paging identifier 116 from the station 106. The time start field 950 may indicate an assigned start time for paging intervals, the time period field 952 may indicate the duration of the interval, and the PID field 954 may indicate the paging identifier 116 assigned for the given start time and interval. The station 106 may respond to receipt of the message 900 with transmission of an ACK.

Figure 10:
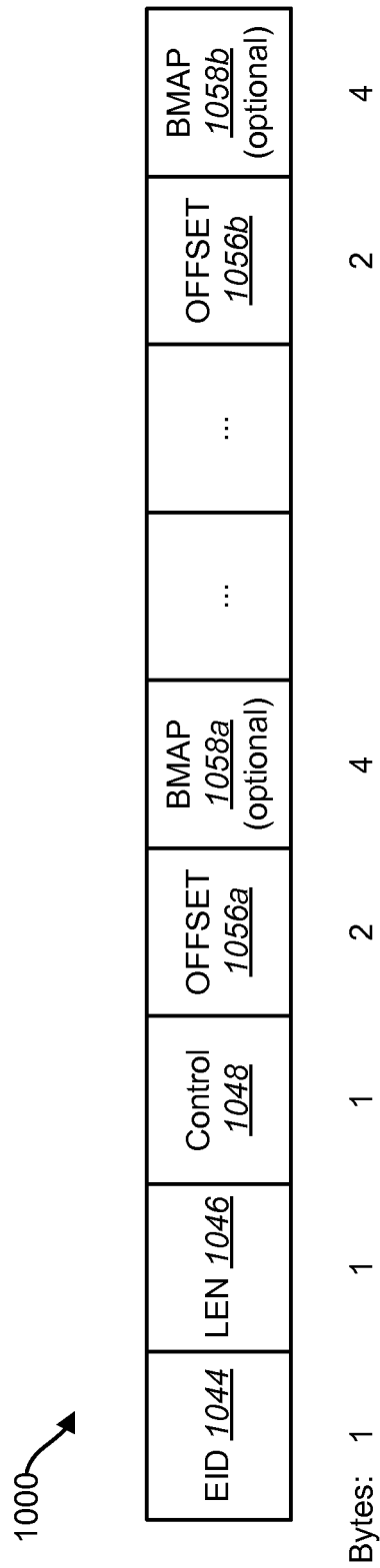
FIG. 10 illustrates another example of a paging message.

FIG. 10 illustrates another example of a paging message 1000. The paging message 1000 may be similar to paging message A 528a described in connection with FIG. 5. As illustrated, the paging message 1000 includes an EID field 1044, a LEN field 1046, a control field 1048, and one or more offset fields 1056a-b and optionally one or more bitmaps (BMAP) 1058a-b. The offset field 1056 may indicate the offset from the paging identifier 116 that the station 106 should use to index the bitmap 1058 as described above with respect to example A 532a described in connection with FIG. 5. For example, an offset of 100 may indicate that the paging identifier 101 is at the 1 position (101-100) of the bitmap. In another aspect, the offset field may indicate the paging identifier set 114 that is paged.

Figure 11:
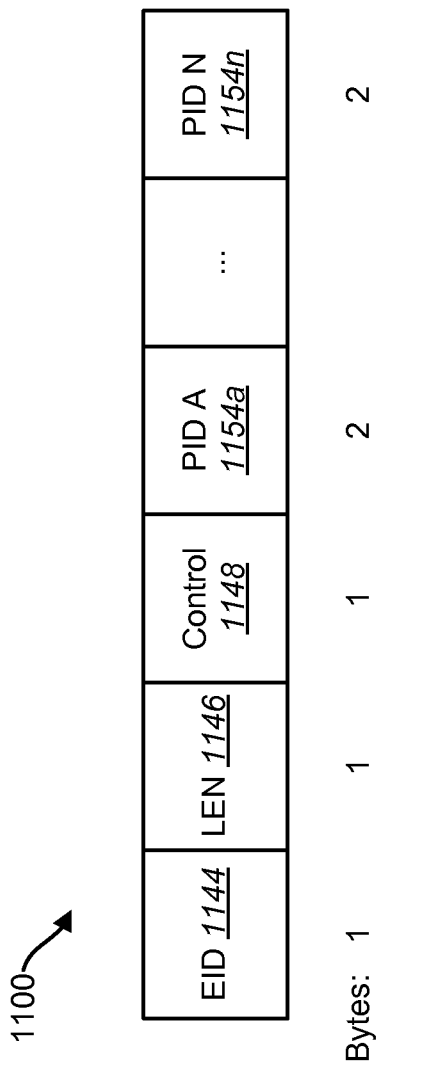
FIG. 11 illustrates another example of a paging message.

FIG. 11 illustrates another example of a paging message 1100. The paging message 1100 may be similar to paging message B 528b described in connection with FIG. 5. As illustrated, the paging message 1100 includes an EID field 1144, a LEN field 1146, a control field 1148, and one or more PID fields 1154a-n comprising a paging identifier list. Each paging identifier field 1154 may include or indicate a particular paging identifier 116, and the station 106 may determine that the station 106 is paged if its paging identifier 116 is listed in one of the PID fields 1154a-n, as described above with example B 532b in connection with FIG. 5.

Figure 12:
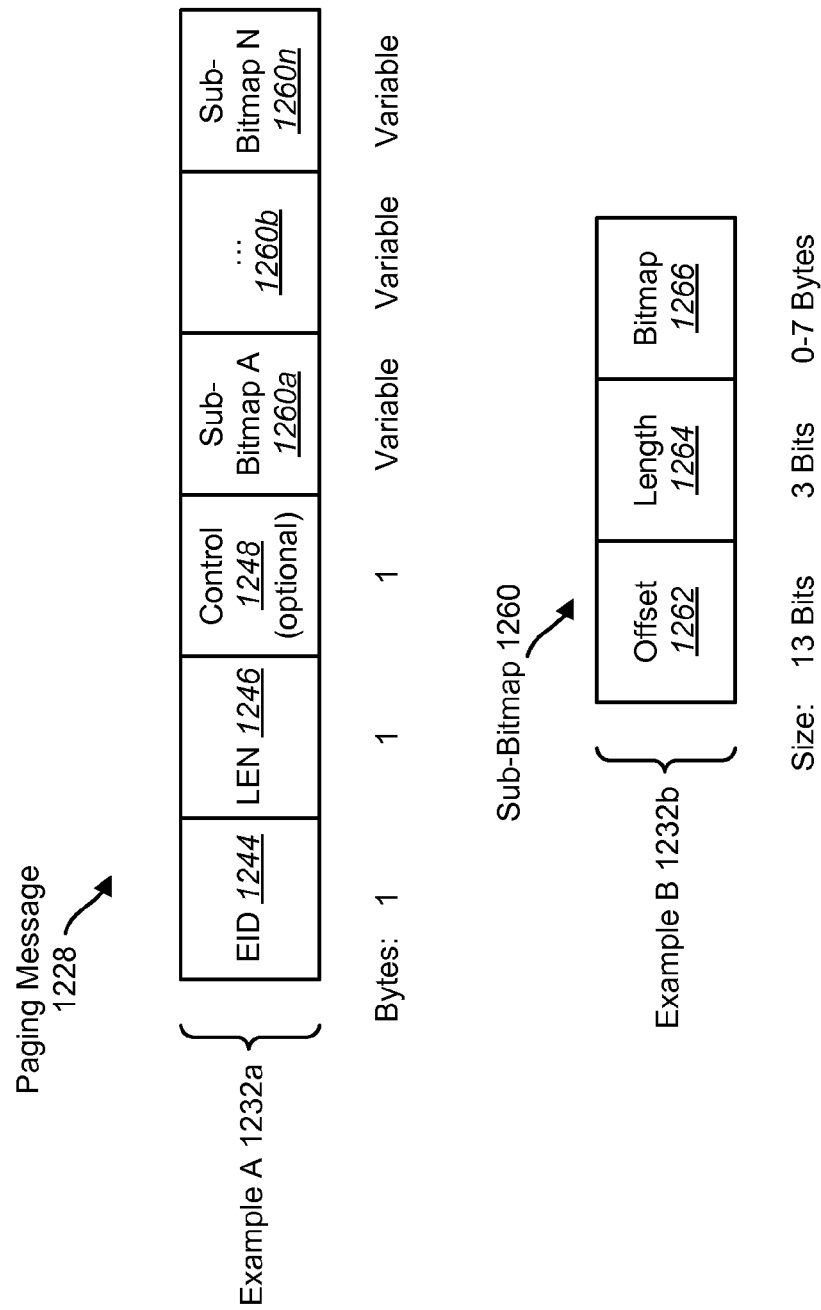
FIG. 12 is a diagram illustrating a more specific example of a paging message.

FIG. 12 is a diagram illustrating a more specific example of a paging message 1228. A full bitmap (in accordance with known approaches, e.g., a full TIM) may include a sequence of 0/1 bits indicating whether there is data for a specific station. The index of the station in that case is the position of the bit in the bitmap (e.g., if the corresponding bit is 1, then there is data for the station and if the corresponding bit is 0, then there is no data for the station). In accordance with the systems and methods disclosed herein, a bitmap may be compressed in order to obtain a compressed paging message (as illustrated in FIG. 12, for example). Example A 1232a illustrates a paging message 1228 with a compressed bitmap, such as a compressed version of a traffic identification map (TIM). The paging message 1228 may be similar to paging message B 528b described in connection with FIG. 5. As illustrated, the paging message 1228 includes an EID field 1244, a LEN field 1246, an optional control field 1248, and one or more sub-bitmap elements 1260a-n. The control field 1248 may indicate the type of compression used. The one or more sub-bitmap elements 1260a-n may be sent in a single paging message (or frame) in order to cover multiple stations 106.

Example B 1232b illustrates the structure of one of the sub-bitmap elements 1260. In particular, a first field indicates an offset value 1262 that is used to identify the index of a paged station 106. In one configuration, the first field comprises 13 bits. A sub-bitmap element 1260 may identify a particular station. For example, a station (e.g., paged station) index may be computed as a sum of the offset value and the bit position in a variable-length bitmap 1266. A second field identifies the length 1264 of the variable-length bitmap 1266. The length 1264 may be indicated in byte units. In one configuration, the second field comprises 3 bits. If the value of the length 1264 is equal to zero, then the only station 106 that is paged is the station 106 with index equal to the offset value 1262 contained in the first field. If the value of the length 1264 is greater than zero, then the value of the length 1264 indicates the number of bytes in the variable-length bitmap 1266. A third field identifies the variable-length bitmap 1266. The variable-length bitmap 1266 is of variable length because trailing zeros can be omitted and assumed to be implicitly zeros (unless another sub-bitmap element 1260 indicates otherwise). In one configuration, the length of the variable-length bitmap may be from 0 bytes to 7 bytes. In another configuration, the value indicated by the length field may be mapped to different lengths of the variable length bitmap 1266. For example, 0 may indicate that the variable length bitmap 1266 is not present, 1 may indicate that the variable length bitmap 1266 is 1 byte, 2 may indicate that the variable length bitmap 1266 is 4 bytes, 3 may indicate that the variable length is 8 bytes, etc. It should be noted that the compression described in connection with FIG. 12 may be applied in conjunction with one or more of the methods, procedures, approaches and/or structures described herein. Additionally, all or part of the compression as described in connection with FIG. 12 may be combined with one or more of the methods, procedures, approaches and/or structures described herein.

Figure 13:
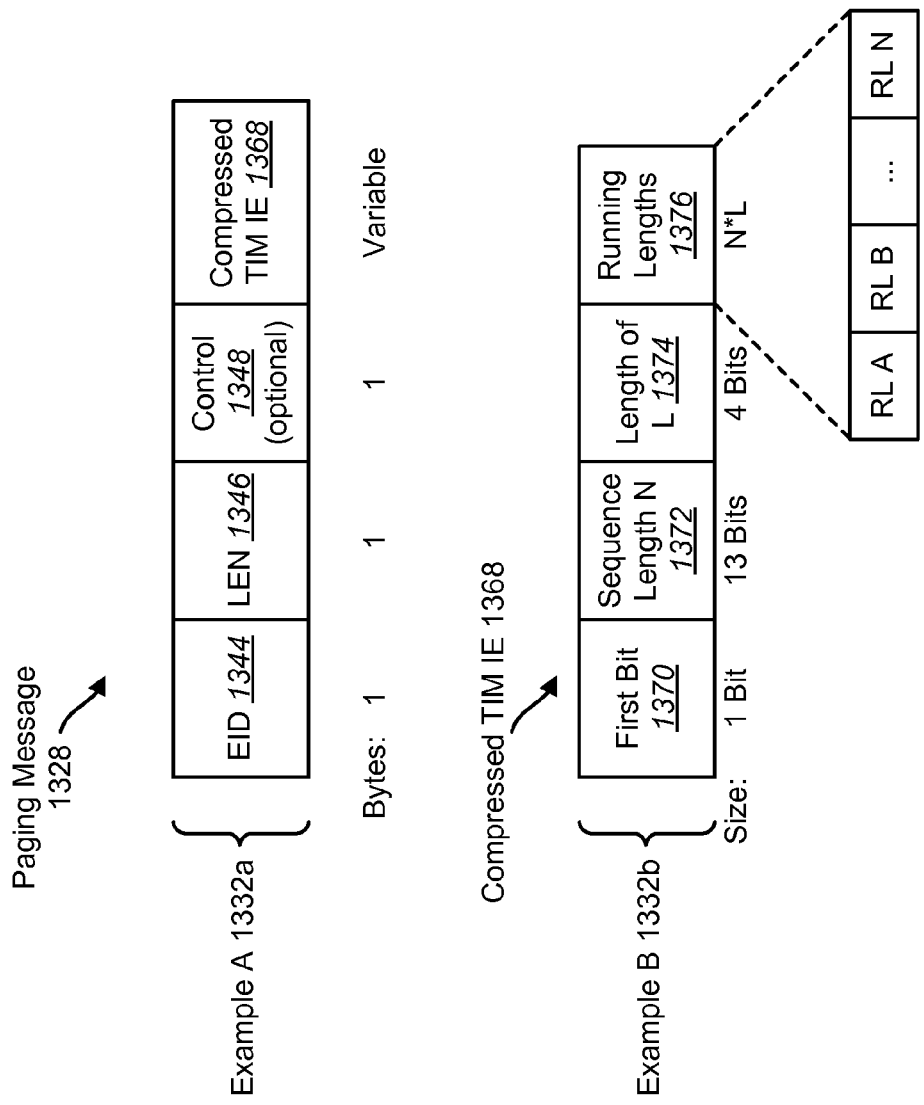
FIG. 13 illustrates another more specific example of a paging message.

FIG. 13 illustrates another more specific example of a paging message 1328. In particular, example A 1332a illustrates a paging message 1328 including a compressed bitmap, such as a compressed version of a traffic identification map (TIM) as described above. By way of example, and not limitation, compression applied in this paging message 1328 may be used with a low-density bitmap (e.g., a bitmap in which the number of ones is much less than the number of zeros). The paging message 1328 may be similar to paging message B 528b described in connection with FIG. 5 above. As illustrated, the paging message 1328 includes an EID field 1344, a LEN field 1346, a control field 1348 and a compressed TIM Information Element (TIM IE) 1368. The control field 1348 may indicate the type of compression used.

Example B 1332b illustrates the structure of the compressed TIM IE 1368. The structure employs running length sequences 1376 obtained by use of a running-length encoding (RLE) method to process the original bitmap. In particular, a first field 1370 indicates the value of the first bit in the sequence of a bitmap to be compressed. This value may be either "1" or "0". A second field 1372 indicates a number N of running length sequences (e.g., $N=2^n$, where n is the number of bits included in the second field 1372). In one aspect, the second field 1372 is formed of n=13 bits (in this way, N can cover at least up to 6000, for example). A third field 1374 indicates the number of bits L of each running length sequence (e.g., $L=2^l$, where l is the number of bits forming the third field 1374). In one aspect, the third field 1374 is formed of l=4 bits. A fourth field 1376 includes the running lengths sequences 1376. The total number of bits forming fourth field 1376 is N*L. In one aspect, the number of bits L may be selected as $L=\text{ceil}(\log_2 R)$, where R=max ([r1, r2, . . . , rN]), with [r1, r2, . . . , rN] corresponding to the sequence of the N running length sequences. From this compressed TIM IE 1368, the stations can losslessly reconstruct the original bitmap. The approach described in connection with FIG. 13 may operate in conjunction with one or more of the methods, procedures, approaches and/or structures described herein. Additionally, all or part of the approach as described in connection with FIG. 13 may be combined with one or more of the methods, procedures, approaches and/or structures described herein.

Figure 14:
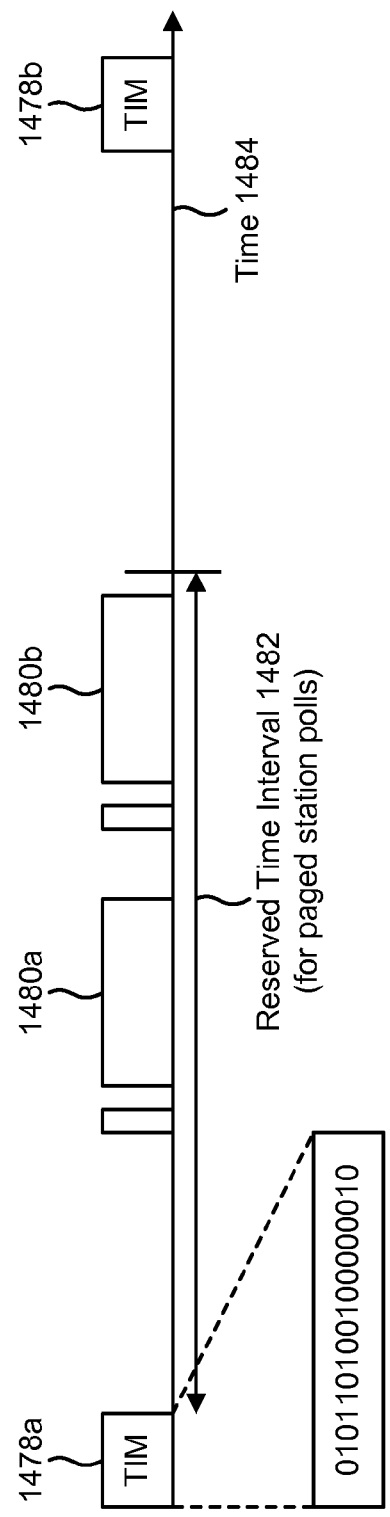
FIG. 14 is a diagram illustrating one example of a paging mechanism.

FIG. 14 is a diagram illustrating one example of a paging mechanism. The paging mechanism shown may be used by the access point 104 and stations 106 in the wireless communication system 100 described in connection with FIG. 1. As illustrated, time increases from left to right over the time axis 1484. The access point 104 may be configured to transmit a plurality of paging messages 1478a-b. By way of example and not limitation, a paging message 1478a may comprise a sequence of bits as illustrated. The paging message 1478 may be generated as described above.

After transmission of a paging message 1478, a time interval 1482 may be reserved for the paged stations 106. The reservation may be achieved by transmitting a message (e.g., a paging message, other message) to cause non-paged stations to defer access to the medium for the duration of the reserved period. In some implementations, the deferred access can be achieved by setting a duration field value of a reserving frame so that non-paged stations can set their network allocation vector (NAV). In other words, an access point 104 may determine a reserved time interval and may set the reserved time interval for at least one paged station 106 by setting a NAV.

During the reserved time interval 1482, the paged stations 106 can send requests 1480a-b to the access point 104 (e.g., Power Saving polls (PS-POLL) requests) and receive a response from the access point 104. Multiple paged stations 106 can contend during time interval 1482 in accordance with various methods, as described herein. Stations 106 that have not been paged may not contend during time interval 1482. Once the time interval 1482 is over, stations 106 may start contending to send requests to the access point 104. The access point 104 determines the duration of the time interval 1482. The time interval 1482 may be sufficient for all the paged stations 106 to send requests to the access point 104 and receive a response from the access point 104. By way of example, and not limitation, the duration of time interval 1482 may be a function of the number of paged stations 106.

Figure 15:
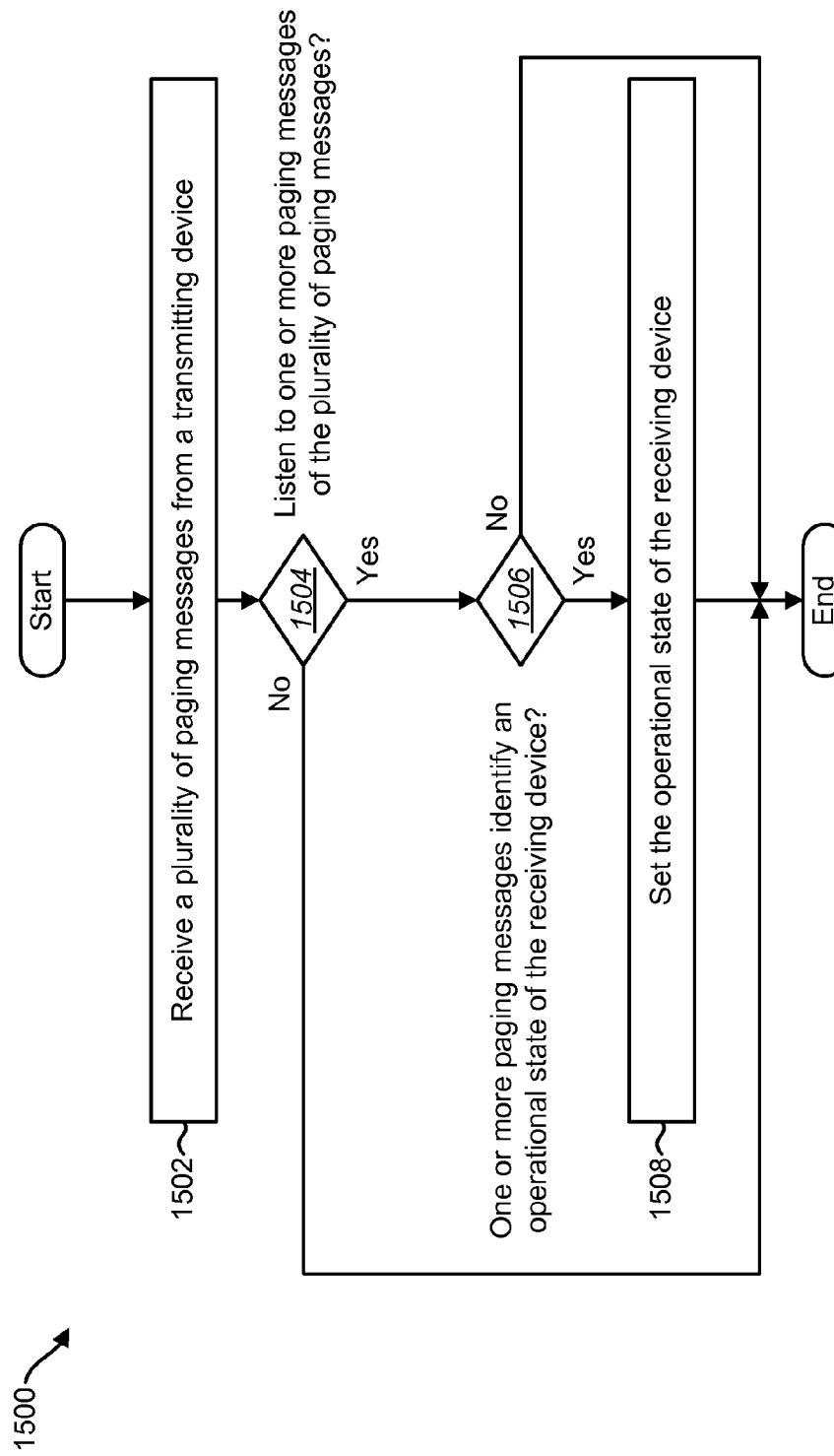
FIG. 15 is a flow diagram illustrating one configuration of a method for determining an operational state.

FIG. 15 is a flow diagram illustrating one configuration of a method 1500 for determining an operational state. In some configurations, a station 106 described in connection with FIG. 1 may perform the method 1500. The station 106 may receive 1502 a plurality of paging messages from the access point 104.

The station 106 may determine 1504 whether to listen to one or more paging messages of the plurality of paging messages based on the techniques described herein (e.g., based on a paging identifier set). Determining 1504 whether to listen to one or more paging messages may be one example of determining 306 whether a paging message corresponds to the station 106 based on the at least one paging identifier set as described above in connection with FIG. 3. For instance, the station 106 may make the determination 1504 based on a paging identifier set 114 included in the paging message, a sequence number n of the paging message or a time interval in which the paging message was transmitted.

If the station 106 determines not to listen to one or more paging messages, operation ends for those one or more paging messages. However, if the station 106 determines to listen to one or more paging messages, operation continues for those one or more paging messages.

If the station 106 determines 1504 to listen to one or more paging messages, the station 106 may determine 1506 whether the one or more paging messages identifies an operational state of the station 106 in accordance with the techniques described herein. Determining 1506 whether the one or more paging messages identify an operational state of the receiving device may be one example of determining 308 whether the station 106 is paged as described in connection with FIG. 3 above. For instance, the station 106 may make the determination 1506 based on a bitmap included in the paging message, a station identifier (e.g., a paging identifier or some indication corresponding to the station 106) included in the paging message or based on the paging message including no explicit indicator. If the station 106 determines 1506 that the one or more paging messages do not identify an operational state of the station 106, operation may end (but may recur for one or more additional paging messages, for example).

If the station 106 determines 1506 that the one or more paging messages identify an operational state of the station 106, the station 106 may set 1508 its operational state based on the one or more paging messages as described herein. For example, if the one or more paging messages direct the station 106 to enter an awake state, the station 106 may enter an awake state.

Figure 16:
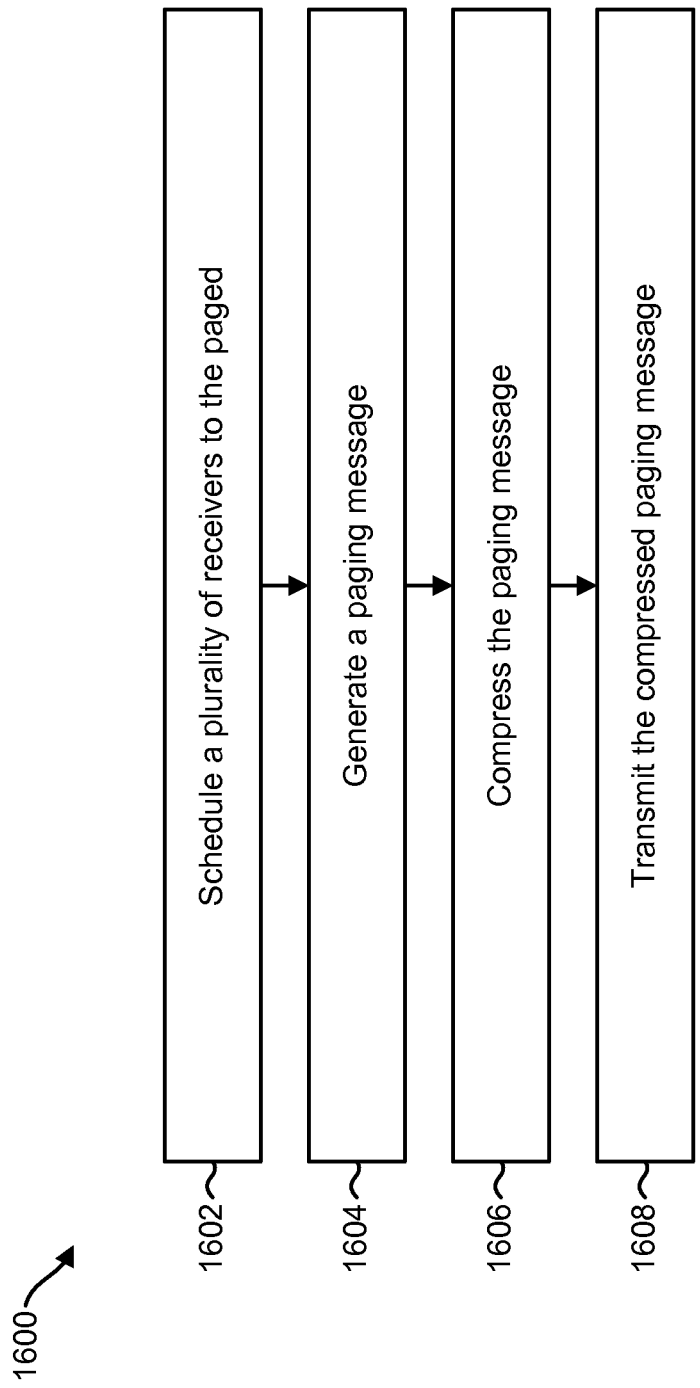
FIG. 16 is a flow diagram illustrating one configuration of a method for compressing a paging message.

FIG. 16 is a flow diagram illustrating one configuration of a method 1600 for compressing a paging message. By way of example and not limitation, examples of possible compressed paging messages that may be obtained in accordance with this method 1600 are paging messages 1228 and 1328 as described above in connection with FIGS. 12 and 13. A transmitting device (e.g., the access point 104 or an apparatus associated with the access point 104) may schedule 1602 a plurality of receivers (e.g., stations 106) to be paged. The transmitting device may generate 1604 a paging message. The paging message may identify one or more of the plurality of scheduled receivers.

The transmitting device may compress 1606 the paging message. Various approaches may be employed for performing the compression as described herein (through the use of paging identifiers 116 and paging identifier sets 114, for example).

The transmitting device may transmit 1608 the compressed paging message to the one or more of the plurality of scheduled receivers. In certain cases (e.g., with high-density bitmap or a bitmap in which the number of zeros is much less than the number of ones), the transmitting device may choose a fraction (e.g., subgroup or subset) of the plurality of receivers to be paged for inclusion in the paging message. In some configurations, scheduling the plurality of devices may be done, for example, in a round robin manner. The method 1600 described in connection with FIG. 16 may operate in conjunction with one or more of the methods, procedures, approaches and/or structures described herein. Additionally, all or part of the method 1600 as described in connection with FIG. 16 may be combined with one or more of the methods, procedures, approaches and/or structures described herein.

Figure 17:
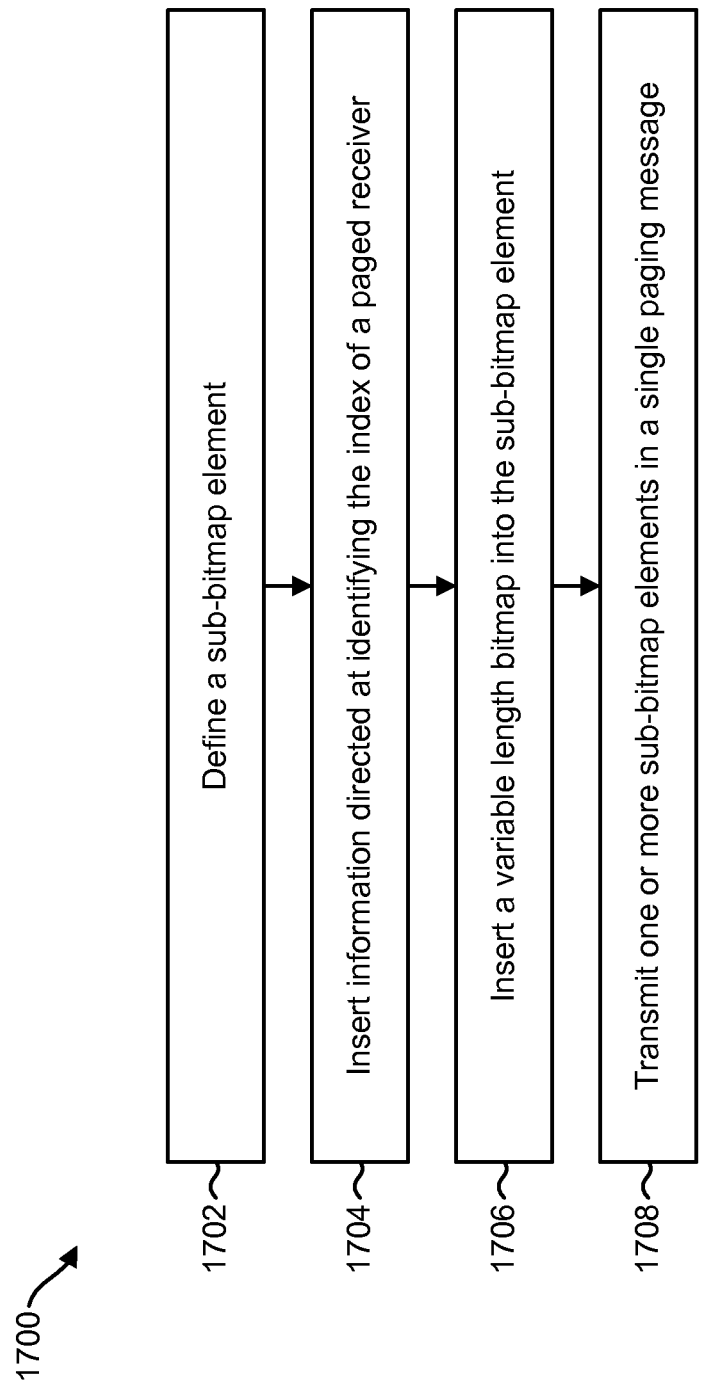
FIG. 17 is a flow diagram illustrating another configuration of a method for compressing a paging message.

FIG. 17 is a flow diagram illustrating another configuration of a method 1700 for compressing a paging message. For example, the method 1700 may be performed by an access point 104 in order to generate the paging message 1228 described in connection with FIG. 12. The transmitting device (e.g., the access point 104 or an apparatus associated with the access point 104) may define 1702 a sub-bitmap element 1260.

The transmitting device may insert 1704 information directed at identifying the index of a paged receiver (e.g., station 106) into the sub-bitmap element 1260. The information may be, for example, in the form of an offset field 1262 and a length field 1264 as described above in connection with FIG. 12.

The transmitting device may insert 1706 a variable-length bitmap 1266 into the sub-bitmap element 1260. The transmitting device may transmit 1708 one or more sub-bitmap elements 1260 in a single paging message (within a single TIM frame, for example). This may be done in order to cover multiple stations within a single frame. The method 1700 described in connection with FIG. 17 may operate in conjunction with one or more of the methods, procedures, approaches and/or structures described herein. Additionally, all or part of the method 1700 as described in connection with FIG. 17 may be combined with one or more of the methods, procedures, approaches and/or structures described herein.

Figure 18:
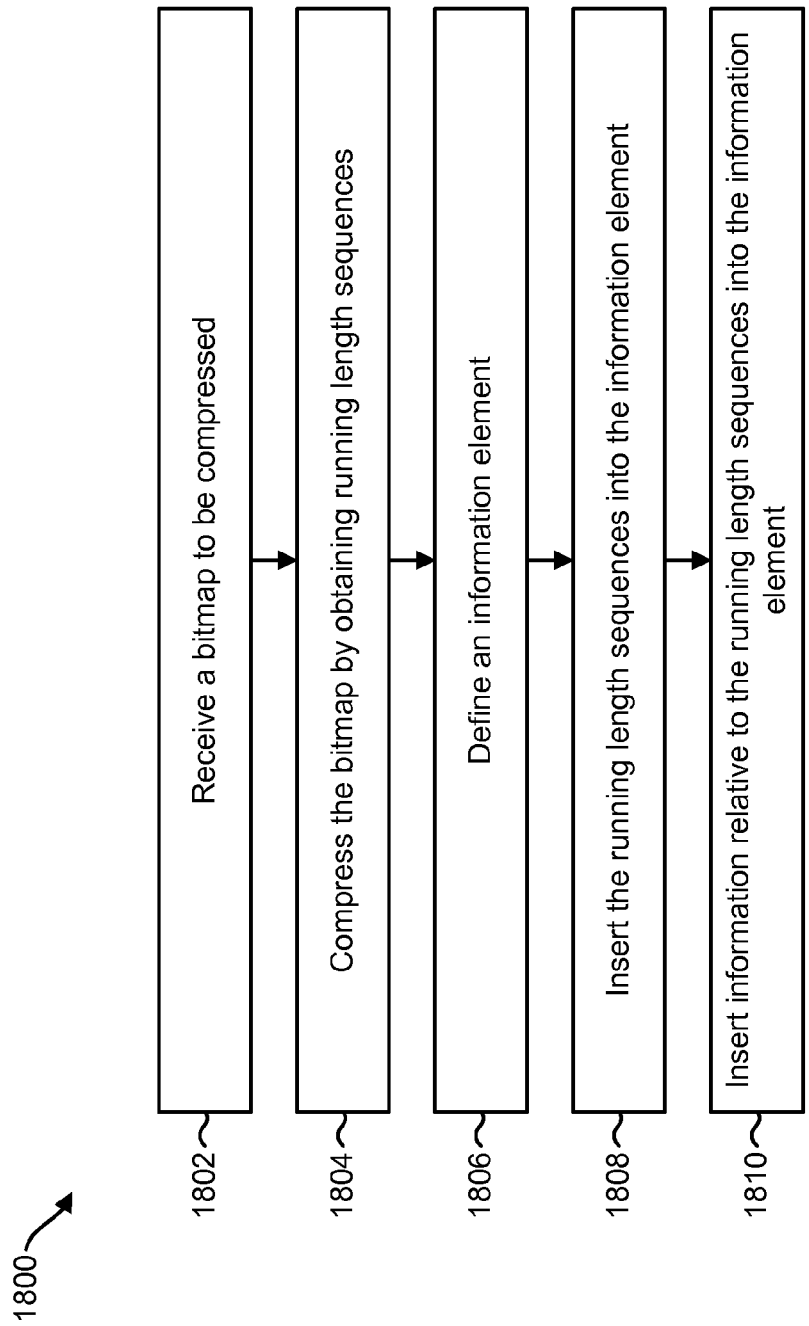
FIG. 18 is a flow diagram illustrating another configuration of a method for compressing a paging message.

FIG. 18 is a flow diagram illustrating another configuration of a method 1800 for compressing a paging message.

For example, the method 1800 may be performed by an access point 104 in order to generate the paging message 1328 described in connection with FIG. 13. The transmitting device (e.g., the access point 104 or an apparatus associated with the access point 104) may receive 1802 a bitmap to be compressed. The bitmap may be similar to the bitmap as described above.

The transmitting device may compress 1804 the bitmap by obtaining running-length sequences. The sequences may be obtained by using a running-length encoding (RLE) technique.

The transmitting device may define 1806 an information element (e.g., a compressed TIM IE 1368). The transmitting device may insert 1808 the running length sequences into the information element.

The transmitting device may insert 1810 information relative to the running length sequences into the information element. For example, the information may comprise the information contained in the first bit field 1370, sequence length N field 1372 and length of L field 1374 as described above in connection with FIG. 13. The method 1800 described in connection with FIG. 18 may be used, for example, with a low-density bitmap (e.g., a bitmap in which the number of ones is much less than the number of zeros). However, it should be noted that the method 1800 may be applied in other cases or scenarios.

Figure 19:
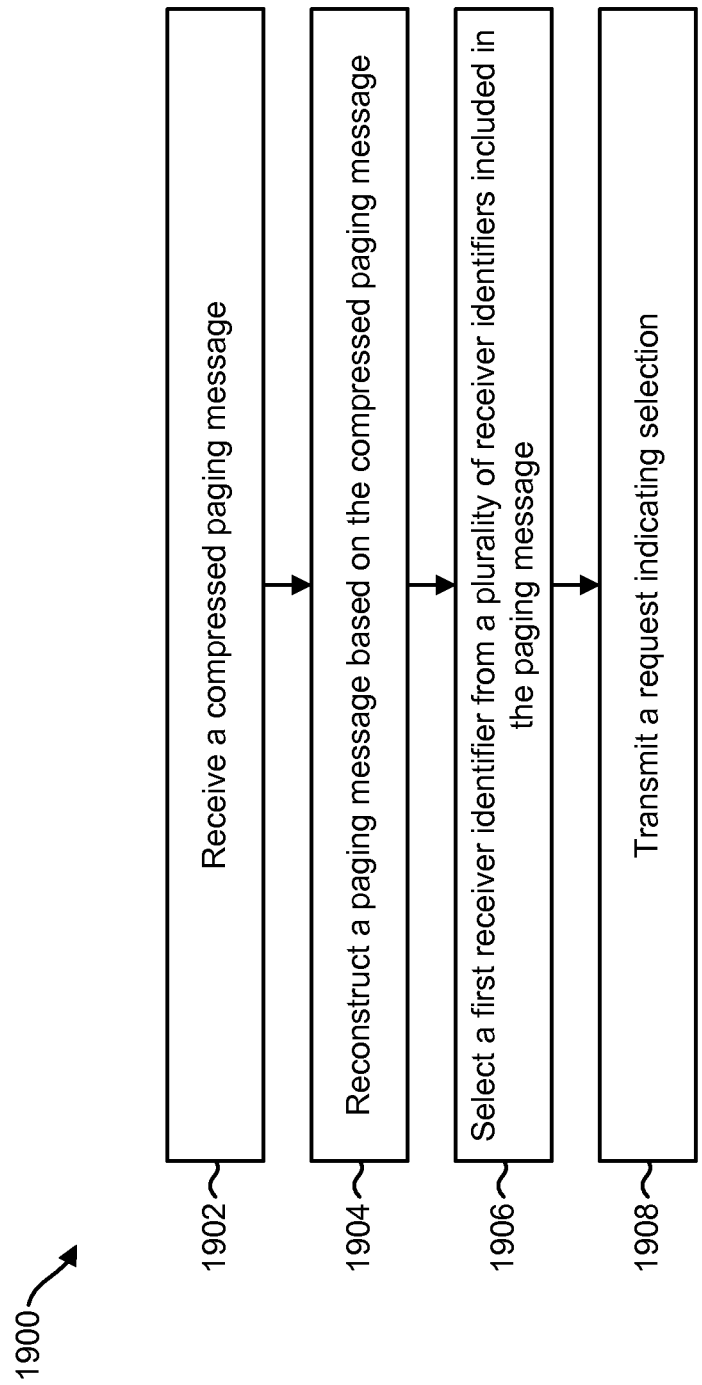
FIG. 19 is a flow diagram illustrating one configuration of a method for receiving a compressed paging message.

FIG. 19 is a flow diagram illustrating one configuration of a method 1900 for receiving a compressed paging message. For example, this method 1900 may be applicable to receive one or more of the paging messages 1228 and 1328 described above in connection with FIGS. 12 and 13. A receiver (e.g., a station 106) may receive 1902 a compressed paging message from a transmitting device (e.g., the access point 104 or an apparatus associated with the access point 104).

The receiver may reconstruct 1904 a paging message based on the compressed paging message. The approach for reconstructing the paging message may depend on the approach used for compressing the original paging message.

The receiver may select 1906 a first receiver identifier from a plurality of receiver identifiers that are included in the paging message. The receiver may transmit 1908 a request to the transmitting device indicating the selection of the first receiver identifier. The method 1900 described in connection with FIG. 19 may operate in conjunction with one or more of the methods, procedures, approaches and/or structures described herein. Additionally, all or part of the method 1900 as described in connection with FIG. 19 may be combined with one or more of the methods, procedures, approaches and/or structures described herein.

During a TIM interval, contention may be performed by a set of paged stations 106 that are scheduled for uplink transmission to the access point 104, and a set of stations 106 that are non-paged (which may still have packets to transmit to the access point 104). The stations 106 may receive a paging indication that data is pending at the access point for that station 106. Once the station 106 knows this, the station 106 may be configured to send a signal to request the pending data. For example, the signal may include an uplink frame called PS-POLL and/or other frame(s) to request that pending data. As described above, if several stations 106 attempt to send messages (e.g., polling messages) to an access point (e.g., access point 104) at the same time, the messages may collide. Moreover, it may be desirable in some implementations to guarantee access to the paged stations 106. Accordingly, in some aspects, a schedule for station transmissions may be based on a paging mechanism as described herein, in order to reduce the likelihood of collision and guarantee access to the paged stations 106.

Figure 20:
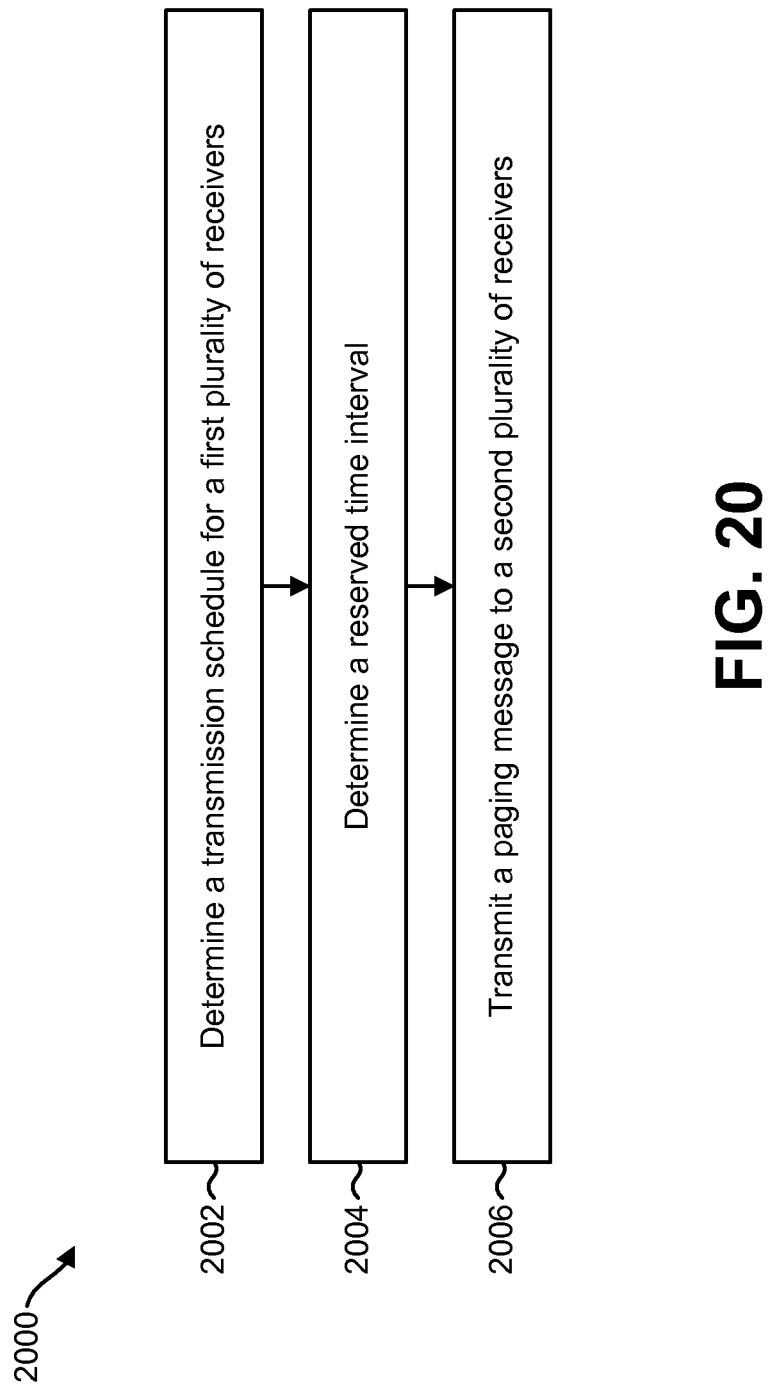
FIG. 20 is a flow diagram illustrating one configuration of a method for paging receivers.

FIG. 20 is a flow diagram illustrating one configuration of a method 2000 for paging receivers. A transmitting device (e.g., the access point 104 or an apparatus associated with the access point 104) may determine 2002 a transmission schedule for a first plurality of receivers (e.g., stations 106). The first plurality of receivers may have data pending for transmission at the transmitting device. The first plurality of receivers may be selected from a second plurality of receivers. The signal may also include scheduling information that may identify a transmission schedule for the first plurality of receivers (e.g., the stations 106).

The transmitting device may determine 2004 a reserved time interval. The reserved time interval may be reserved for the scheduled first plurality of receivers. The transmitting device may transmit 2006 a paging message to the second plurality of receivers. For example, the paging message may include information relative to the duration of the reserved time interval. The method 2000 described in connection with FIG. 20 may operate in conjunction with one or more of the methods, procedures, approaches and/or structures described herein. Additionally, all or part of the method 2000 as described in connection with FIG. 20 may be combined with one or more of the methods, procedures, approaches and/or structures described herein.

Figure 21:
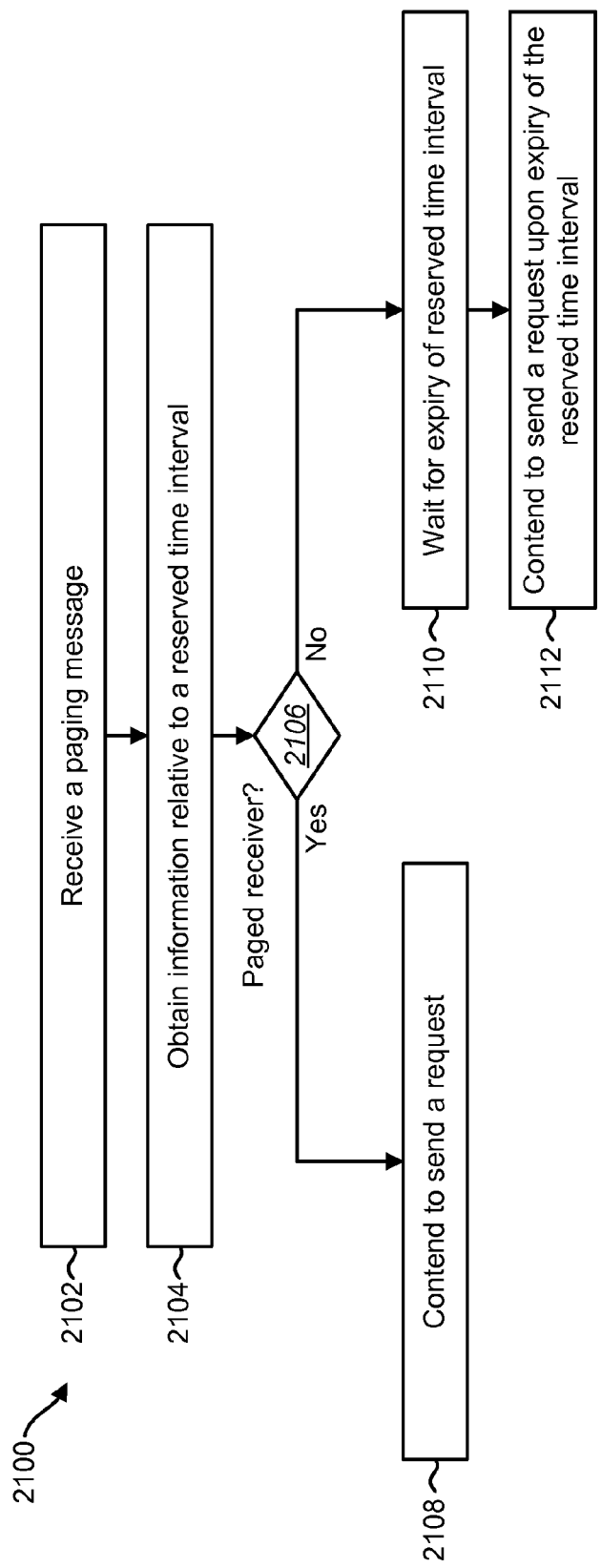
FIG. 21 is a flow diagram illustrating one configuration of a method for contention among receivers.

FIG. 21 is a flow diagram illustrating one configuration of a method 2100 for contention among receivers. Receivers (e.g., stations 106) may receive 2102 a paging message from a transmitting device (e.g., the access point 104 or an apparatus associated with the access point 104).

Each receiver may obtain 2104 information relative to a reserved time interval (e.g., to the duration of the reserved time interval). For example, each receiver may obtain 2104 this information in a management frame, paging frame or other signaling. As described above, in some implementations, the reservation may be achieved by having the paging message (or an additional message sent after the initial paging message, for example) to cause non-paged stations to defer access to the medium for the duration of the reserved period. The deferred access can be achieved, for example, by setting a duration field of the paging message or reserving frame so that non-paged stations may set their NAV for the appropriate time.

Each receiver may determine 2106 whether it is a paged receiver based on the content of the paging message. For example, during the reserved time interval, only paged receivers may contend to send requests (e.g. PS-POLL requests) to the transmitting device. Paged receivers may contend 2108 to send a request (to the transmitting device, for example).

Non-paged receivers may wait 2110 for expiry of the reserved time interval. The receiver(s) may contend 2112 to send a frame upon expiry of the reserved time interval. The method 2100 described in connection with FIG. 21 may operate in conjunction with one or more of the methods, procedures, approaches and/or structures described herein. Additionally, all or part of the method 2100 as described in connection with FIG. 21 may be combined with one or more of the methods, procedures, approaches and/or structures described herein.

Various approaches for medium contention may be envisaged to be used by the receivers in any of the methods and processes described above. By way of example and not limitation, contention may be employed in conjunction with the method 2100 described in connection with FIG. 21.

A paging message (as described in connection with any of the methods above, for example) may implicitly or explicitly define an ordering for the stations 106. For example, if the TIM bitmap indicates that both station 1 and station 2 are paged, then the TIM bitmap may also implicitly or explicitly indicate whether station 1 is before or after station 2. For instance, the order may be determined by the order in which the paged stations appear in the bitmap representation. Consider a bitmap $\{0, 1, 0, 0, 1, 1\}$, where the station 106 associated with the bit in position 2 is assumed to be before the station associated with the bit in position 5. Thus, a schedule indicated by the access point 104 and/or determined by a station 106 may indicate an order. In some configurations, the ordering for the stations may be randomized (based on a TSF or other indications, for example).

In some implementations, the compressed bitmap may be expressed as a list of station identifiers. In this case, the sequence in which the station identifiers appear in the list may determine the order. Consider the list $\{13, 25, 5, 22\}$, where the station associated with identifier "13" is assumed to come before station identified by "5." In another configuration, the order may be derived from the value of the station identifier irrespective of the message representation.

In some implementations, the position of the station within the TIM bitmap sequence may be a function of the position of the station 106 as described above. The order may further be dependent on other indications, the indications being either included in the paging message or assumed to be known at the stations 106. For example, the indication may include the Timing Synchronization Function (TSF) within the paging message. In such an implementation, the first station 106 may be the one whose identifier is set to "1" and has a position within the TIM bitmap sequence that is first in the order after the position associated with the 12 least significant bits (LSBs) of the TSF. Many other functions incorporating various indications may be included to achieve a similar result as that based on the TSF. One beneficial result of including the TSF in the computation of the order is that the order may be changed at each transmission, provided that the portion of the used TSF is different at each transmission.

In some implementations, the sender of the paging message may determine the order of the paged stations according to any criteria including the usage of the ordering information. For example, the sender may order the stations based on their Quality of Service (QoS) requirements, power saving requirements or other performance parameters. It may be desirable, in some implementations, for the sender of the paging message to include in the message an explicit indication of the order. This explicit indication of the order may not be based on the TIM bitmap but rather other factors as described above.

A further approach includes assigning to a station 106 a deterministic back-off value. The station may be configured to use the backoff value to initialize a backoff counter for the distributed coordination function/enhanced distributed channel access (DCF/EDCA) access procedure. The initial value of the backoff counter may be based on the order of the paged station. The order of the paged station may be obtained using one or more of the approaches and/or methods described above.

A further approach includes assigning to each paged station 106 a time at which to start the contention procedure for sending the PS-POLL. In one configuration, the contention procedure may start for all stations 106 at a defined time, for instance, immediately after the end of the paging message or after an additional message sent after the paging message (e.g., the message reserving the medium described above). In some implementations, the start of the contention may be set to a different time per each station 106. For instance, the time a station is allowed to start the contention to send the PS-POLL may be determined based on the order of the stations defined by the paging message as described above. In one implementation, a time slot may be defined and a station 106 may be allowed to start the contention after a time that is a multiple of time slots times the position of the station 106. The time slot may be, for instance, known by all the stations 106 a priori or communicated by the sender of the paging message. The interval between subsequent devices in the order may correspond to the beacon interval or the number of TIM bitmap sequence bits that are set to "1." Alternatively, the interval may be a fixed time during which a typical PS-POLL or Data or ACK exchange could take place. In further aspects, after entering an awake state, stations 106 may sense or listen to the medium for an additional time prior to contending for the medium.

In some implementations, the system may be configured to assign to a station 106 a precise time slot to access the medium. In this aspect, the station may be configured to send the PS-POLL at the designated time. The assignment of the time slot may be based on the position of the station identifier within the paging message.

Another approach includes assigning to one or all the stations 106 a Contention Window (CW) value. The station 106 may be configured to use the CW value as described by the DCF/EDCA medium access procedure. In one implementation, all the paged stations 106 may be configured to use the same CW value when contending for sending the PS-POLL after the paging message. The CW value may be a function of the number of stations paged by the paging message. For instance, the CW may be larger if the number of paged stations is large and may be smaller if the number of paged stations is small. In another aspect, different stations may be assigned different CW values, for instance, depending on the order indicated in the paging message.

In some configurations, a station 106 may initialize a backoff value based on the CW to determine when to contend for the medium. For a first transmission, the initialized backoff value may be a random number in an interval $[0, CW]$. However, if the station 106 is unable to successfully transmit the first transmission, an $N^{th}$ transmission attempt may be initialized with a backoff value having a random value within an interval of $[0, N*CW]$ or $[0, N+CW]$. Advantageously, the use of such backoff value intervals for the $N^{th}$ transmission attempts may prevent use of a random value within an exponentially based backoff value interval such as $[0, (2^N)*CW]$. Accordingly, the time until the station 106 successfully transmits a message may be shortened, and the station 106 may enter a doze state sooner and consume less power.

In some configurations, if a station 106 does not receive a response to a PS-POLL, the station 106 may again transmit the PS POLL in a current paging interval (e.g., one interval for transmitting PS-POLLs). When the station 106 transmits the PS-POLL again in the current paging interval, the station 106 may, for example, send the PS-POLL a point coordination function (PCF) interframe space (PIFS) time after the previous PS-POLL or the station 106 may use a back-off procedure as described herein. On the other hand, in some configurations, if the station 106 does not receive a response to a PS-POLL, the station 106 may defer transmission of the PS-POLL until a next paging interval (e.g., another interval for transmitting PS-POLLs different from the current paging interval). It should be noted that two or more of the access approaches described above (e.g., assignment of the contention window, assignment of the initial backoff value and/or assignment of the time for the contention start) may be used concurrently.

Figure 22:
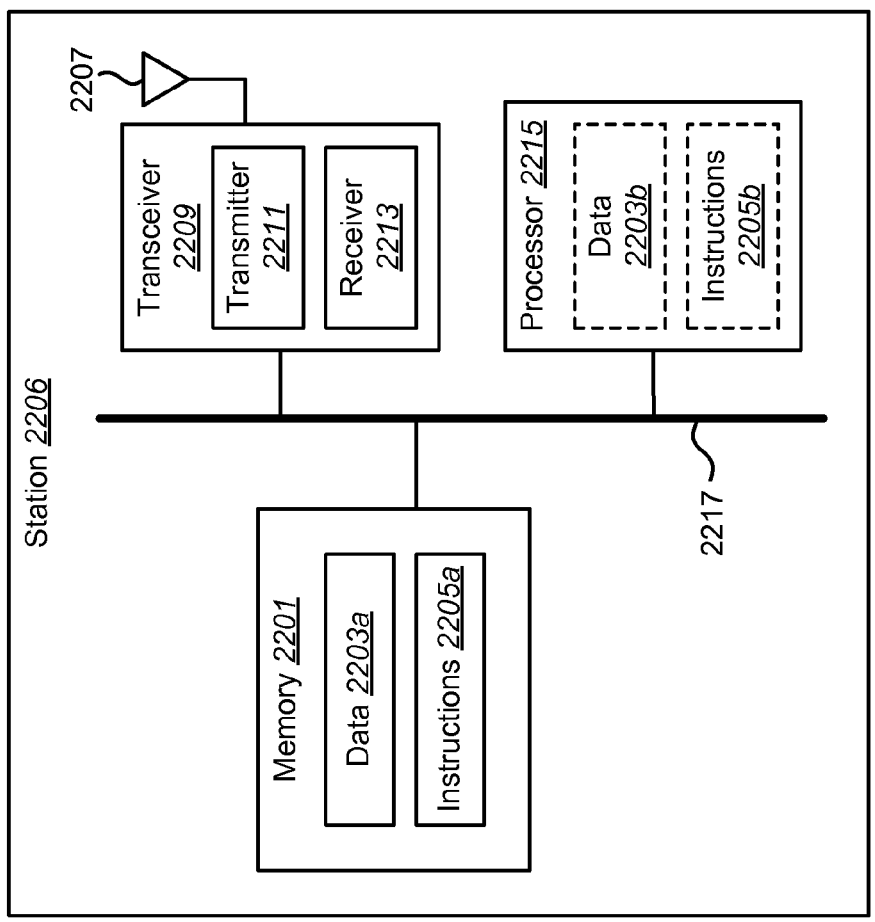
FIG. 22 illustrates certain components that may be included within a station.

FIG. 22 illustrates certain components that may be included within a station 2206. One or more of the stations 106, 606 described above may be implemented in accordance with the station 2206 described in connection with FIG. 22. The station 2206 includes a processor 2215. The processor 2215 may be a general purpose single- or multi-chip microprocessor (e.g., an ARM), a special purpose microprocessor (e.g., a digital signal processor (DSP)), a microcontroller, a programmable gate array, etc. The processor 2215 may be referred to as a central processing unit (CPU). Although just a single processor 2215 is shown in the station 2206 of FIG. 22, in an alternative configuration, a combination of processors (e.g., an ARM and DSP) could be used.

The station 2206 also includes memory 2201 in electronic communication with the processor 2215 (i.e., the processor 2215 can read information from and/or write information to the memory 2201). The memory 2201 may be any electronic component capable of storing electronic information. The memory 2201 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 2203a and instructions 2205a may be stored in the memory 2201. The instructions 2205a may include one or more programs, routines, sub-routines, functions, procedures, etc. The instructions 2205a may include a single computer-readable statement or many computer-readable statements. The instructions 2205a may be executable by the processor 2215 to implement one or more of the methods 200, 300, 1500, 1600, 1700, 1800, 1900, 2000, 2100 that were described above. Executing the instructions 2205a may involve the use of the data 2203a that is stored in the memory 2201. FIG. 22 shows some instructions 2205b and data 2203b being loaded into the processor 2215.

The station 2206 may also include a transmitter 2211 and a receiver 2213 to allow transmission and reception of signals between the station 2206 and a remote location (e.g., an access point, base station or other wireless communication device). The transmitter 2211 and receiver 2213 may be collectively referred to as a transceiver 2209. An antenna 2207 may be electrically coupled to the transceiver 2209. The station 2206 may also include (not shown) multiple transmitters, multiple receivers, multiple transceivers and/or multiple antenna.

The various components of the station 2206 may be coupled together by one or more buses, which may include a power bus, a control signal bus, a status signal bus, a data bus, etc. For simplicity, the various buses are illustrated in FIG. 22 as a bus system 2217.

In some configurations, the station 2206 may further comprise a user interface. The user interface may comprise a keypad, a microphone, a speaker, and/or a display. The user interface may include any element or component that conveys information to a user of the station 2206 and/or receives input from the user.

Figure 23:
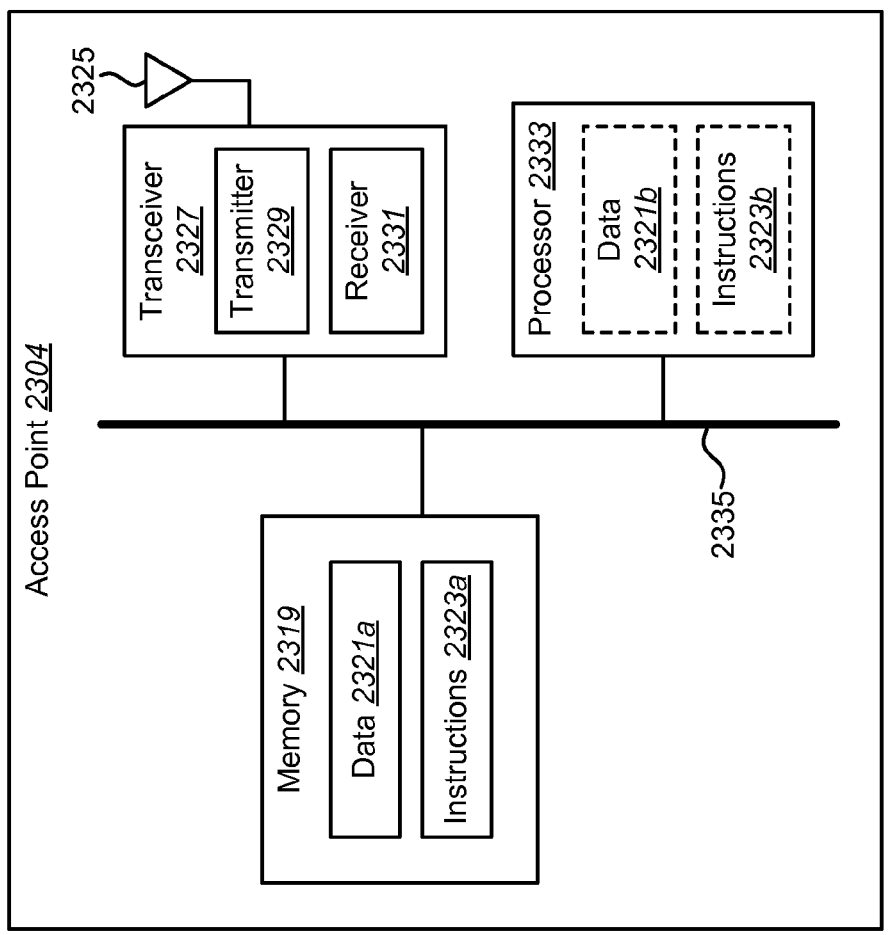
FIG. 23 illustrates certain components that may be included within an access point.

FIG. 23 illustrates certain components that may be included within an access point 2304. The access point 104 described above may be implemented in accordance with the access point 2304 described in connection with FIG. 23. The access point 2304 includes a processor 2333. The processor 2333 may be a general purpose single- or multi-chip microprocessor (e.g., an ARM), a special purpose microprocessor (e.g., a digital signal processor (DSP)), a programmable logic device (PLD), a controller, state machine, gated logic, discrete hardware components, dedicated hardware finite state machines, a microcontroller, a programmable gate array, etc. The processor 2333 may be referred to as a central processing unit (CPU). Although just a single processor 2333 is shown in the access point 2304 of FIG. 23, in an alternative configuration, a combination of processors (e.g., an ARM and DSP) could be used.

The access point 2304 also includes memory 2319 in electronic communication with the processor 2333 (i.e., the processor 2333 can read information from and/or write information to the memory 2319). The memory 2319 may be any electronic component capable of storing electronic information. The memory 2319 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 2321a and instructions 2323a may be stored in the memory 2319. The instructions 2323a may include one or more programs, routines, sub-routines, functions, procedures, etc. The instructions 2323a may include a single computer-readable statement or many computer-readable statements. The instructions 2323a may be executable by the processor 2333 to implement one or more of the methods 200, 1600, 1700, 1800, 2000 described above. Executing the instructions 2323a may involve the use of the data 2321a that is stored in the memory 2319. FIG. 23 shows some instructions 2323b and data 2321b being loaded into the processor 2333.

The access point 2304 may also include a transmitter 2329 and a receiver 2331 to allow transmission and reception of signals between the access point 2304 and a remote location (e.g., a wireless communication device, a station, etc.). The transmitter 2329 and receiver 2331 may be collectively referred to as a transceiver 2327. An antenna 2325 may be electrically coupled to the transceiver 2327. The access point 2304 may also include (not shown) multiple transmitters, multiple receivers, multiple transceivers and/or multiple antenna.

The various components of the access point 2304 may be coupled together by one or more buses, which may include a power bus, a control signal bus, a status signal bus, a data bus, etc. For simplicity, the various buses are illustrated in FIG. 23 as a bus system 2335.

As indicated above, the systems and methods disclosed herein provide approaches for limiting overhead related to paging. These may include modifying a known paging concept by compressing the traffic indication map (TIM) bitmap representation. Additionally or alternatively, they may apply a hierarchical paging mechanism, where each station only listens to selected pages. Such systems and may enable use of smaller frames and enhanced power savings at stations, for example, as discussed further below.

As stated above, according to various implementations, the TIM element contains four fields: delivery traffic information map (DTIM) Count, DTIM Period, Bitmap Control, and Partial Virtual Bitmap. The Length field for this element indicates the length of the Information field. The DTIM Count field indicates how many Beacon frames (including the current frame) appear before the next DTIM. A DTIM Count of 0 indicates that the current TIM is a DTIM. The DTIM count field is a single octet. The DTIM Period field indicates the number of beacon intervals between successive DTIMs. If all TIMs are DTIMs, the DTIM Period field has the value 1. The DTIM Period value 0 is reserved. The DTIM period field is a single octet.

Figure 24:
FIG. 24 illustrates an example of a Bitmap Control field, according to some implementations.

FIG. 24 illustrates an example of a Bitmap Control field, according to some implementations. In this example, the Bitmap Control field is a single octet. Bit 0 of the field 2405 contains the Group Addressed Traffic Indicator bit associated with AID 0. This bit is set to 1 in TIM elements with a value of 0 in the DTIM Count field when one or more group addressed MSDUs/MMPDUs are buffered at the AP or the mesh STA. For some implementations the remaining 7 bits of the field form the Bitmap Offset. For some implementations, bit 1 to bit 5 of the field 2410 form the TIM Segment Number subfield and bit 6 and bit 7 of the field 2415 form the Page Index subfield as shown in FIG. 24.

The TIM Segment Number subfield 2410 indicates the segment number of the Page segment encoded in the Partial Virtual Bitmap field. The Page Index subfield 2415 indicates the index of the Page encoded in the Partial Virtual Bitmap field.

Figure 25:
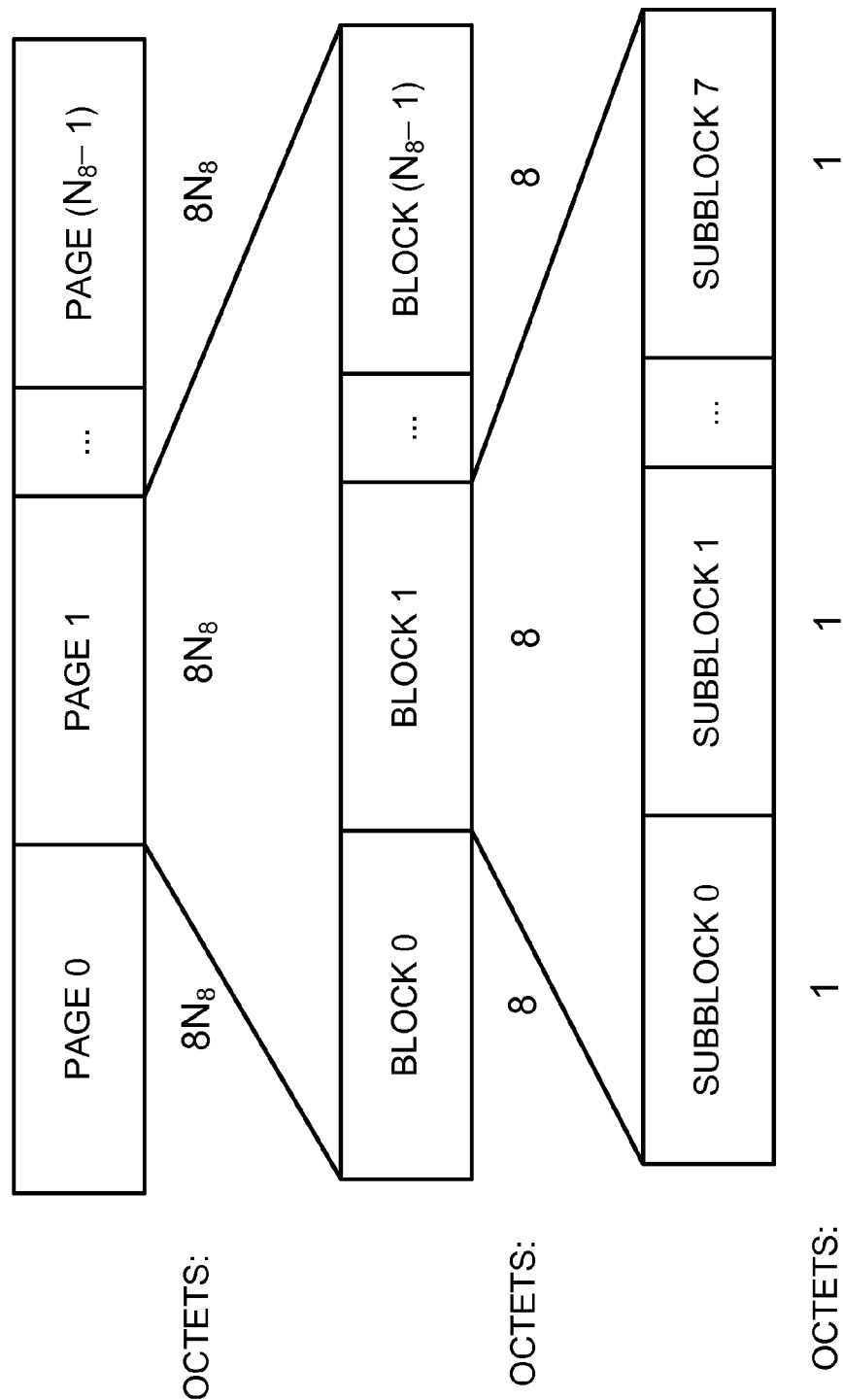
FIG. 25 illustrates an example of the hierarchical structure of a traffic indication virtual bitmap.

For some implementations, the traffic-indication virtual bitmap, maintained by the AP or the mesh STA that generates a TIM, consists of 2008 bits, and is organized into 251 octets such that bit number N ($0 \leq N \leq 2007$) in the bitmap corresponds to bit number (N mod 8) in octet number [N/8] where the low-order bit of each octet is bit number 0, and the high order bit is bit number 7. For some implementations, the traffic indication the traffic-indication virtual bitmap consists of 64NPNB bits and is organized into NP Pages where each Page consists of NB Blocks, each Block consists of eight Subblocks, and each Subblock consists of 8 bits. Bit number N in the bitmap corresponds to bit number N[0:2] in Subblock number N[3:5] in Block number N[6:5+n1] in Page number N[6+n1:12], where n1 is log 2NB and NB is power of 2. An example of the hierarchical structure of the traffic indication virtual bitmap is illustrated in FIG. 25.

Each bit in the traffic-indication virtual bitmap corresponds to traffic buffered for a specific neighbor peer mesh STA within the MBSS that the mesh STA is prepared to deliver or STA within the BSS that the AP is prepared to deliver at the time the Beacon frame is transmitted. Bit number N is 0 if there are no individually addressed MSDUs/MMPDUs buffered for the STA whose AID is N. If any individually addressed MSDUs/MMPDUs for that STA are buffered and the AP or the mesh STA is prepared to deliver them, bit number N in the traffic-indication virtual bitmap is 1. A PC might decline to set bits in the TIM for CF-Pollable STAs it does not intend to poll.

For some implementations, the Partial Virtual Bitmap field consists of octets numbered N1 to N2 of the traffic indication virtual bitmap, where N1 is the largest even number such that bits numbered 1 to (N1×8)−1 in the bitmap are all 0 and N2 is the smallest number such that bits numbered (N2+1)×8 to 2007 in the bitmap are all 0. In this case, the Bitmap Offset subfield value contains the number N1/2, and the Length field is set to (N2−N1)+4. In the event that all bits other than bit 0 in the virtual bitmap are 0, the Partial Virtual Bitmap field is encoded as a single octet equal to 0, the Bitmap Offset subfield is 0, and the Length field is 4.

For some implementations, the Partial Virtual Bitmap field of the TIM element is constructed as follows, where the maximum possible number of BSSIDs is an integer power of 2, n=log 2 (maximum possible number of BSSIDs), k is the number of actually supported nontransmitted BSSIDs, and k≤(2n−1).

The bits 1 to k of the bitmap are used to indicate that one or more group addressed frames are buffered for each AP corresponding to a nontransmitted BSSID. The AIDs from 1 to k are not allocated to a STA. The AIDs from (k+1) to (2n−1) are reserved and set to 0. The remaining AIDs are shared by the BSSs corresponding to the transmitted BSSID and all nontransmitted BSSIDs.

When the DTIM Count field is 0 for a BSS that has a nontransmitted BSSID, and one or more group addressed frames are buffered at the AP for this BSS, the corresponding bits from bit 1 to bit k is set to 1.

Each bit starting from bit 2n in the traffic-indication virtual bitmap corresponds to individually addressed traffic buffered for a specific STA within any BSS corresponding to a transmitted or nontransmitted BSSID at the time the Beacon frame is transmitted. The correspondence is based on the AID of the STA.

Based upon its knowledge of the capability of associated stations to support the multiple BSSID capability, as indicated by the corresponding field in the Extended Capabilities element and the content of the traffic indication virtual bitmap, an AP shall encode the Partial Virtual Bitmap and the Bitmap Control field of the TIM element using one of the two following methods. Specifically, an AP uses Method B when it determines that the bit for each associated non-AP STA in the virtual bitmap that is reconstructed by each non-AP STA from the received TIM element encoded using Method B is set correctly. Otherwise, an AP uses Method A.

In Method A, the Partial Virtual Bitmap field consists of octets numbered 0 to N2 of the traffic indication virtual bitmap, where N2 is the smallest number such that bits numbered (N2+1)×8 to 2007 in the bitmap are all 0. If such a value N2 does not exist, that is, when not all bits in the last octet of the traffic indication virtual bitmap are equal to 0, N2=250. When using this method, the Bitmap Offset subfield value always contains the number 0, and the Length field is N2+4.

In Method B, the Partial Virtual Bitmap field consists of a concatenation of octets numbered 0 to N0−1 and octets numbered N1 to N2 if the traffic indication virtual bitmap, where N0 is the smallest positive integer such that N0×8−2n<8. If N0 is an odd number, then N1 is the largest odd number such that N0<N1 and each of the bits N0×8 to (N1×8−1) is equal to 0. When N0 is an even number, N1 is the largest even number such that N0<N1 and each of the bits N0×8 to (N1×8−1) is equal to 0. If such a value N1>N0 does not exist, N1=N0. Additionally, N2 is the smallest integer value for which the values for bit (N2+1)×8 to 2007 in the bitmap are all 0. If such a value N2 does not exist, that is, when not all bits in the last octet of the traffic indication virtual bitmap are equal to 0, N2=250. When using this method, the Bitmap Offset subfield contains the value of (N1−N0)/2, and the Length field is N0+N2−N1+4.

When N1=N0, Method B reduces to Method A. For both Method A and Method B, when there are no frames buffered for any BSS corresponding to a transmitted or nontransmitted BSSID supported, the Partial Virtual Bitmap field is encoded as a single octet equal to 0, the Bitmap Offset subfield is 0, and the Length field is 4. When there are no buffered individually addressed frames for any BSS corresponding to a transmitted or nontransmitted BSSID, but there are buffered group addressed frames for one or more of the BSSs, the Partial Virtual Bitmap field consists of the octets number 0 to N0−1 where N0 is the smallest positive integer such that (N0×8−2n<8). In this case, the Bitmap Offset subfield value contains the number 0, and the Length field is N0+3.

Figure 26:
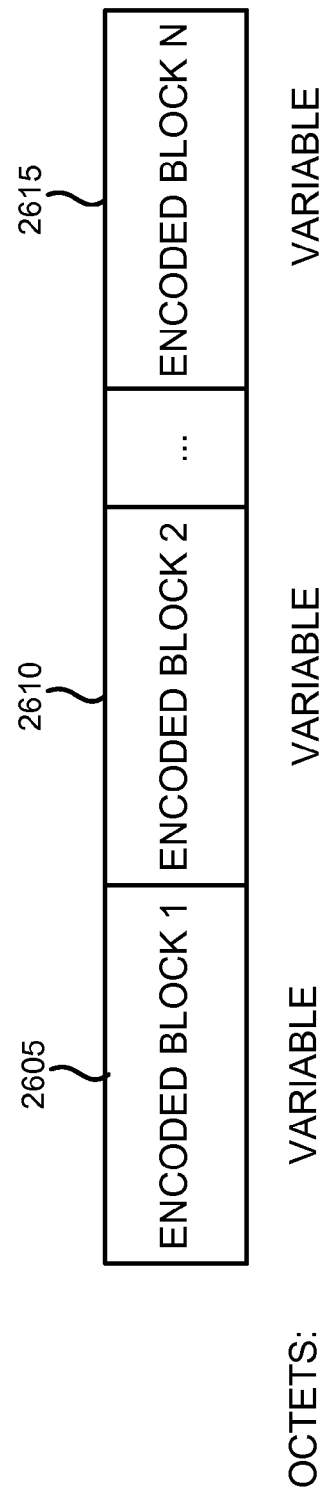
FIG. 26 illustrates an example of a Partial Virtual Bitmap field.
Figure 27:
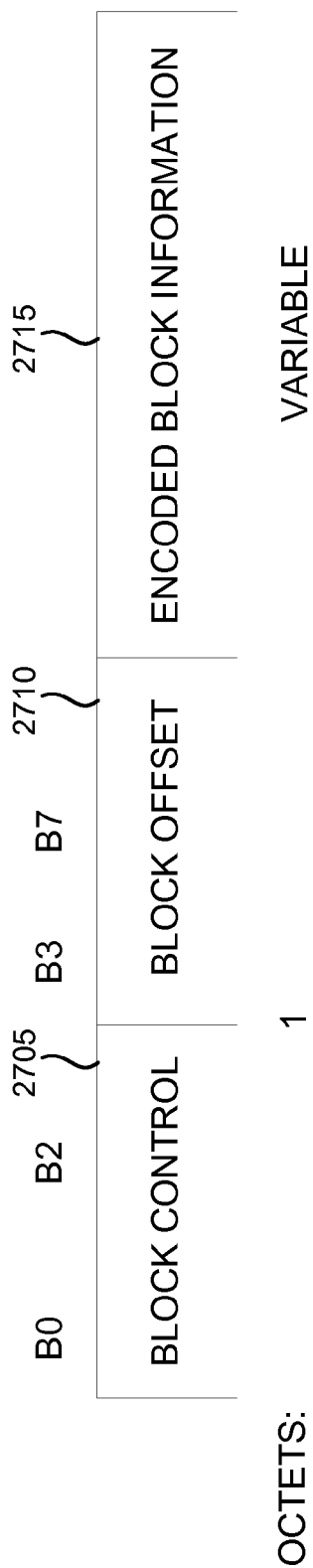
FIG. 27 illustrates an example of an Encoded Block Field that may be used in some implementations.

FIG. 26 illustrates an example of a Partial Virtual Bitmap field, according to some implementations. For some implementations, the Partial Virtual Bitmap field is constructed with one or more Encoded Block fields 2605, 2610 and 2615 of variable length. FIG. 27 illustrates an example of an Encoded Block Field that may be used in some implementations. As illustrated in FIG. 27, the Encoded Block field may include a Block Control field 2705, a Block Offset field 2710, and an Encoded Block Information field 2715. In some implementations, the Block Offset field 2710 may be 5 bits in length and indicates the index of the Block that is encoded in the Encoded Block field. The meaning of the Encoded Block Information field depends on the Encoding Mode subfield.

Figure 28:
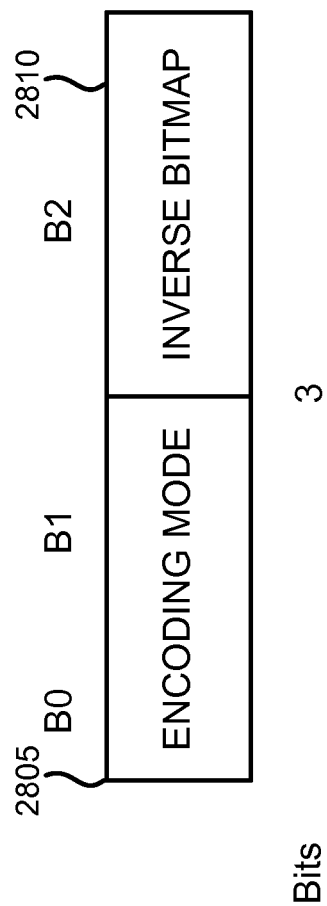
FIG. 28 illustrates an example of a Block Control Field, according to some implementations.

FIG. 28 illustrates an example of a Block Control Field, according to some implementations. The Block Control field as illustrated in FIG. 28 is 3 bits in length and indicates the encoding mode used in the Encoded Block field as shown in the Block Field Encoding table. An example of a format of the Block Control field is as shown in the Block Control Field figure. As illustrated in this example, the Block Control field includes the Encoding Mode subfield 2805 and the Inverse Bitmap subfield 2810.

In some implementations, the Inverse Bitmap subfield 2810 may be set to 1, if the Block is encoded based on the inversed version of the Block, which reverts each bit value of the Block. The Inverse Bitmap subfield may be set to 0, otherwise.

The Encoding Mode subfield 2805 indicates one of the four encoding modes: the Block Bitmap mode, the Single AID mode, the OLB (Offset, Length, Bitmap) mode, and the ADE (AID Differential Encode) mode. Block Control field encoding, according to some implementations, is illustrated in the table below, which shows various encoding modes for block control field encoding and bit values that can be used to identify the various encoding modes.

| Block Control field encoding | | | |
| --- | --- | --- | --- |
| Bit 2 | Bit 1 | Bit 0 | Encoding mode |
| 0 | 0 | 0 | Block Bitmap |
| 0 | 0 | 1 | Single AID |
| 0 | 1 | 0 | OLB |
| 0 | 1 | 1 | ADE |
| 1 | 0 | 0 | Inverse Bitmap + Block Bitmap |
| 1 | 0 | 1 | Inverse Bitmap + Single AID |
| 1 | 1 | 0 | Inverse Bitmap + OLB |
| 1 | 1 | 1 | Inverse Bitmap + ADE |

In some implementations, more than one of the encoding modes may be used. This can be done, for example, to increase the length of the TIM element. For example, two encoding modes may be used. In various embodiments, inverse bitmap and block bitmap may be used, or inverse bitmap and single AID may be used, or inverse bitmap and OLB may be used, or inverse bitmap and ADE may be used, as illustrated in the block field encoding table (above). In some implementations, OLB encoding may be used with other encoding modes other than inverse bitmap (not illustrated in table), for example, with one or more of the other encoding modes disclosed herein.

Figure 29:
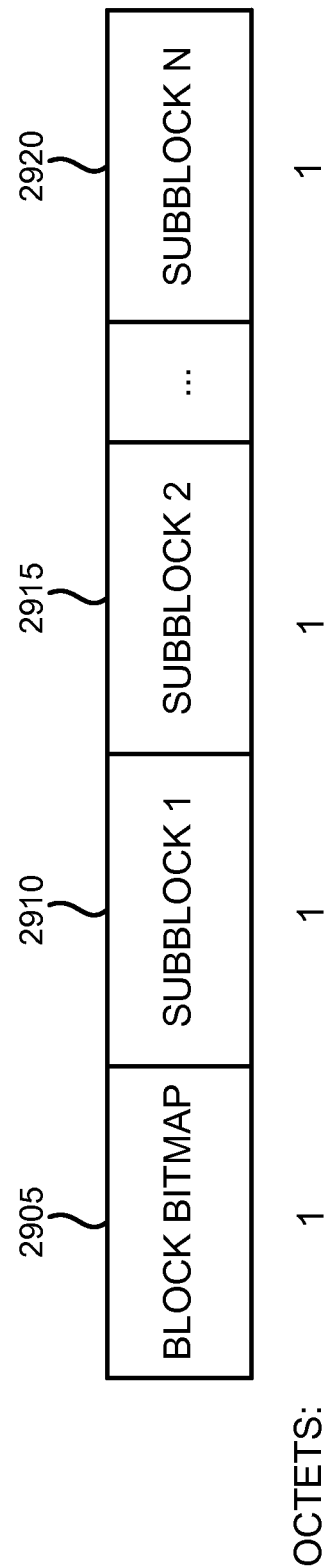
FIG. 29 illustrates an example of a format of the Encoded Block Information field (Block Bitmap mode).

FIG. 29 illustrates an example of a format of the Encoded Block Information field (Block Bitmap mode). As illustrated in this example, for Block Bitmap mode, the Encoded Block Information field includes the Block Bitmap subfield 2905 and n Subblock subfields 2910, 2915 and 2920, where n is the number of bits equal to 1 in the Block Bitmap field.

The Block Bitmap subfield 2905 is 1 octet in length. The bit in position m of the Block Bitmap subfield 2905, if equal to 1, indicates that the Subblock in position m of the Block is present in the Encoded Block Information field. The bit in position m of the Block Bitmap subfield 2905, if equal to 0, indicates that the Subblock in position m of the Block is not present in the Encoded Block Information field. When n bits in the Block Bitmap subfield 2905 are equal to 1, n Subblock subfields follow the Block Bitmap subfield 2905 in ascending order of the Subblock positions in the Block.

Each Subblock subfield 2910, 2915 and 2920 is 1 octet in length and contains a Subblock of the Block, which has at least one bit position equal to 1. The bit in position q of the Subblock subfield, which contains the Subblock in position m of the Block, indicates traffic buffered for the STA whose AID is N, where N is constructed by concatenating the Page Index field (N[12:11]), the Block Offset field (N[10:6]), m (N[5:3]), and q (N[2:0]) in sequence from MSB to LSB.

Figure 30:
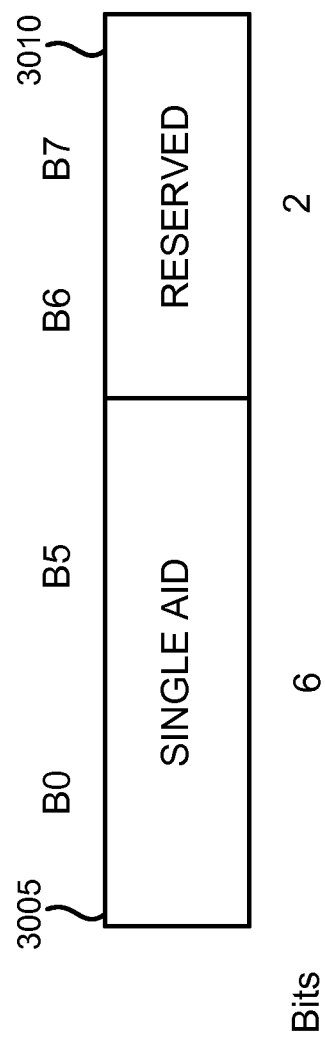
FIG. 30 illustrates an example of encoded block information for Single Aid mode, according to some implementations.

FIG. 30 illustrates an example of encoded block information for Single Aid mode, according to some implementations. For Single AID mode, the Encoded Block Information field consists of the Single AID field 3005 as illustrated in FIG. 30. The Single AID subfield 3005 is 6 bits in length and contains the 6 LSBs of the single AID in the Block. The rest of the bits of the Encoded Block Information field are reserved 3010. The value in the Single AID subfield indicates traffic buffered for the STA whose AID is N, where N is constructed by concatenating the Page Index field (N[12:11]), the Block Offset field (N[10:6]), and the Single AID subfield (N[5:0]) in sequence from MSB to LSB.

Figure 31:
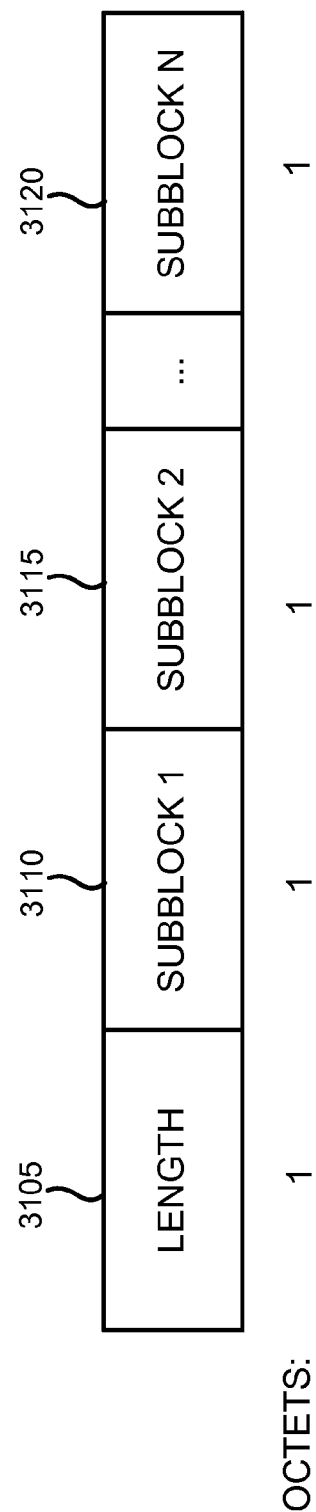
FIG. 31 illustrates an example of an Encoded Block Information field (OLB mode), according to some implementations.

FIG. 31 illustrates an example of an Encoded Block Information field (OLB mode), according to some implementations. As illustrated in FIG. 31, the Encoded Block Information field consists of the Length subfield 3105 and n Subblock subfields 3110, 3115 and 3120. The format of the Encoded Block Information field is shown in the Encoded Block Information (OLB mode) figure.

The Length subfield 3105 is 1 octet. A value of the Length subfield 3105 equal to n indicates that the Encoded Block Information field contains n contiguous Subblocks in ascending order from multiple blocks starting from the first Subblock of the Block in position Block Offset.

Each Subblock subfield 3110, 3115 and 3120 is 1 octet in length and contains a Subblock of the Partial Virtual Map. A Subblock m of the Encoded Block Information field is located in Block k where k is obtained as Block Offset+[m/8]. The bit in position q of the Subblock m which is located in Block k indicates that there is traffic buffered for the STA whose AID is N, where N is constructed by concatenating the Page Index field (N[12:11]), k (N[10:6]), mod(m, 8) (N[5:3]), q (N[2:0]) and in sequence from MSB to LSB.

In the above description, reference numbers may have been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor or any commercially available processor, controller, microcontroller or state machine. A processor may also be implemented as a combination of computing devices (e.g., a combination of a DSP and a microprocessor, a plurality of microprocessors, one or more microprocessors in conjunction with a DSP core, or any other such configuration).

In one or more aspects, the functions described may be implemented in hardware, software, firmware, or any combination thereof. If implemented in software, the functions may be stored on or transmitted over as one or more instructions or code on a computer-readable medium.

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. An access point for reduced overhead paging, comprising:
    a processor;
    a memory component in electronic communication with the processor; and
    instructions stored in the memory, the instructions being executable by the processor to:
        generate a compressed traffic indication map (TIM) element, the compressed TIM element comprising a partial virtual bitmap field constructed from at least one encoded block field that includes an encoded block information field identifying at least one encoding mode for encoded block information, wherein the at least one encoding mode comprises an offset, length, bitmap (OLB) mode, wherein a subblock m of the encoded block information field is located in block k where k is obtained as block offset+m/8; and
        send the compressed TIM element to an at least one station (STA) associated with the access point that supports at least one multiple basic service set identifier (BSSID).

2. The access point of claim 1, wherein the instructions are further executable to determine whether the at least one STA is associated with the access point.

3. The access point of claim 1, wherein the instructions are further executable to, in response to the at least one encoding mode comprising an offset, length, bitmap (OLB) mode, encode the encoded block information field to include a length subfield followed by a plurality of contiguous subblock subfields, each subblock subfield including a corresponding subblock of a partial virtual map.

4. The access point of claim 3, wherein the OLB mode is used jointly with at least one other encoding mode to further compress the TIM element.

5. The access point of claim 3, wherein:
    the length subfield equal to n indicates that the encoded block information field contains n contiguous subblocks in ascending order from multiple blocks starting from a first subblock in position block offset.

6. The access point of claim 4, wherein:
    a bit in position q of the subblock m which is located in block k indicates that there is traffic buffered for the STA whose association identifier (AID) is N; and N is constructed by concatenating a page index field (N[12:11]), k (N[10:6]), mod(m, 8) (N[5:3]), q (N[2:0]) and in sequence from least significant bit to most significant bit.

7. The access point of claim 4, wherein:
a bit in position q of the subblock m which is located in block k indicates that there is traffic buffered for the STA whose association identifier (AID) is N; and
N is constructed by concatenating a page index field (N[12:11]), k (N[10:6]), mod(m, 8) (N[5:3]), q (N[2:0]) and in sequence from most significant bit to least significant bit.

8. The access point of claim 1, wherein:
the TIM element further comprises a delivery traffic information map (DTIM) Count field, a DTIM period field, and a bitmap control field;
the DTIM count field indicates how many beacon frames, including a current frame, appear before a next DTIM;
the DTIM period field indicates a number of beacon intervals between successive DTIMs; and
the bitmap control field contains a group addressed traffic indicator bit associated with association identifier zero (0).

9. The access point of claim 1, wherein the at least one encoded block field comprises a block offset field that indicates an index of a block that is encoded in the at least one encoded block field.

10. A station for reduced overhead paging, comprising:
a processor;
memory in electronic communication with the processor;
instructions stored in the memory, the instructions being executable to:
receive the paging from an access point (AP), the paging comprising a compressed traffic indication map (TIM) element; and
determine from the compressed TIM element, a partial virtual bitmap field constructed from at least one encoded block field that includes an encoded block Information field regarding at least one encoding mode for encoded block information, wherein the at least one encoding mode comprises an offset, length, bitmap (OLB) mode, wherein a subblock m of the encoded block information field is located in block k where k is obtained as block offset+m/8.

11. The station of claim 10, wherein the instructions are further executable to, in response to the at least one encoding mode comprising an offset, length, bitmap (OLB) mode, decode the encoded block information field to generate a length subfield followed by contiguous subblock subfields, each subblock subfield including a corresponding subblock of a partial virtual map.

12. The station of claim 11, wherein the OLB mode is used jointly with at least one other encoding mode to further compress the TIM element.

13. The station of claim 11, wherein:
the length subfield equal to n indicates that the encoded block information field contains n contiguous subblocks in ascending order from multiple blocks starting from a first subblock in position block offset.

14. The station of claim 13, wherein:
a bit in position q of the subblock m which is located in block k indicates that there is traffic buffered for the STA whose association identifier is N; and
N is constructed by concatenating a page index field (N[12:11]), k (N[10:6]), mod(m, 8) (N[5:3]), q (N[2:0]) and in sequence from least significant bit to most significant bit.

15. The station of claim 13, wherein:
a bit in position q of the subblock m which is located in block k indicates that there is traffic buffered for the STA whose association identifier is N; and
N is constructed by concatenating a page index field (N[12:11]), k (N[10:6]), mod(m, 8) (N[5:3]), q (N[2:0]) and in sequence from most significant bit to least significant bit.

16. The station of claim 10, wherein:
the TIM element further comprises a delivery traffic information map (DTIM) Count field, a DTIM period field, and a bitmap control field;
the DTIM count field indicates how many beacon frames, including a current frame, appear before a next DTIM;
the DTIM period field indicates a number of beacon intervals between successive DTIMs; and
the bitmap control field contains a group addressed traffic indicator bit associated with association identifier zero (0).

17. The station of claim 10, wherein the at least one encoded block field comprises a block offset field that indicates an index of a block that is encoded in the at least one encoded block field.

18. A method for reduced overhead paging by an access point, comprising:
generating a compressed traffic indication map (TIM) element, the compressed TIM element comprising a partial virtual bitmap field constructed from at least one encoded block field that includes an encoded block information field identifying at least one encoding mode for encoded block information, wherein the at least one encoding mode comprises an offset, length, bitmap (OLB) mode, wherein a subblock m of the encoded block information field is located in block k where k is obtained as block offset+m/8; and
sending the compressed TIM element to an at least one station (STA) associated with the access point that supports at least one multiple basic service set identifier (BSSID).

19. The method of claim 18, further comprising, in response to the at least one encoding mode comprising an offset, length, bitmap (OLB) mode, encoding the encoded block information field to include a length subfield followed by contiguous subblock subfields, each subblock subfield including a corresponding subblock of a partial virtual map.

20. The method of claim 19, wherein the OLB mode is used jointly with at least one other encoding mode to further compress the TIM element.

21. The method of claim 19, wherein:
the length subfield equal to n indicates that the encoded block information field contains n contiguous subblocks in ascending order from multiple blocks starting from a first subblock in position block offset.

22. The method of claim 21, wherein:
a bit in position q of the subblock m which is located in block k indicates that there is traffic buffered for the STA whose association identifier is N; and
N is constructed by concatenating a page index field (N[12:11]), k (N[10:6]), mod(m, 8) (N[5:3]), q (N[2:0]) and in sequence from least significant bit to most significant bit.

23. The method of claim 21, wherein:
a bit in position q of the subblock m which is located in block k indicates that there is traffic buffered for the STA whose association identifier is N; and N is constructed by concatenating a page index field (N[12:11]), k (N[10:6]), mod(m, 8) (N[5:3]), q (N[2:0]) and in sequence from most significant bit to least significant bit.

24. A method operable by a station for reduced overhead paging, comprising:
receiving the paging from an access point (AP), the paging comprising a compressed traffic indication map (TIM) element; and
determining from the compressed TIM element, a partial virtual bitmap field constructed from at least one encoded block field that includes an encoded block information field regarding at least one encoding mode for encoded block information wherein the at least one encoding mode comprises an offset, length, bitmap (OLB) mode, wherein a subblock m of the encoded block information field is located in block k where k is obtained as block offset+m/8.

25. The method of claim 24, further comprising, in response to the at least one encoding mode comprising an offset, length, bitmap (OLB) mode, decoding the encoded block information field to generate a length subfield followed by contiguous subblock subfields, each subblock subfield including a corresponding subblock of a partial virtual map.

26. The method of claim 25, wherein the OLB mode is used jointly with at least one other encoding mode to further compress the TIM element.

27. The method of claim 25, wherein:
the length subfield equal to n indicates that the encoded block information field contains n contiguous subblocks in ascending order from multiple blocks starting from a first subblock in position block offset.

28. The method of claim 27, wherein:
a bit in position q of the subblock m which is located in block k indicates that there is traffic buffered for the STA whose association identifier is N; and
N is constructed by concatenating a Page Index field (N[12:11]), k (N[10:6]), mod(m, 8) (N[5:3]), q (N[2:0]) and in sequence from least significant bit to most significant bit.

29. The method of claim 27, wherein:
a bit in position q of the subblock m which is located in block k indicates that there is traffic buffered for the STA whose association identifier is N; and
N is constructed by concatenating a Page Index field (N[12:11]), k (N[10:6]), mod(m, 8) (N[5:3]), q (N[2:0]) and in sequence from most significant bit to least significant bit.

30. An access point configured for wireless communication, comprising:
means for generating a compressed traffic indication map (TIM) element, the compressed TIM element comprising a partial virtual bitmap field constructed from at least one encoded block field that includes an encoded block information field identifying at least one encoding mode for encoded block information, wherein the at least one encoding mode comprises an offset, length, bitmap (OLB) mode, wherein a subblock m of the encoded block information field is located in block k where k is obtained as block offset+m/8; and
means for sending the compressed TIM element to an at least one station (STA) associated with the access point that supports at least one multiple basic service set identifier (BSSID).

31. The apparatus of claim 30, further comprising, in response to the at least one encoding mode comprising an offset, length, bitmap (OLB) mode, means for encoding the encoded block information field to include a length subfield followed by contiguous subblock subfields, each subblock subfield including a corresponding subblock of a partial virtual map.

32. The apparatus of claim 31, wherein the OLB mode is used jointly with at least one other encoding mode to further compress the TIM element.

33. An apparatus configured for wireless communication, comprising:
means for receiving a paging from an access point (AP), the paging comprising a compressed traffic indication map (TIM) element; and
means for determining from the compressed TIM element, a partial virtual bitmap field constructed from at least one encoded block field that includes an encoded block information field regarding at least one encoding mode for encoded block information, wherein the at least one encoding mode comprises an offset, length, bitmap (OLB) mode, wherein a subblock m of the encoded block information field is located in block k where k is obtained as block offset+m/8.

34. The apparatus of claim 33, further comprising, in response to the at least one encoding mode comprising an offset, length, bitmap (OLB) mode, means for decoding the encoded block information field to generate a length subfield followed by contiguous subblock subfields, each subblock subfield including a corresponding subblock of a partial virtual map.

35. The apparatus of claim 34, wherein the OLB mode is used jointly with at least one other encoding mode to further compress the TIM element.

36. A computer-program product for reduced overhead paging, the computer-program product comprising a non-transitory computer-readable medium having instructions thereon, the instructions comprising:
code for causing an access point (AP) to generate a compressed traffic indication map (TIM) element, the compressed TIM element comprising a partial virtual bitmap field constructed from at least one encoded block field that includes an encoded block information field identifying at least one encoding mode for encoded block information, wherein the at least one encoding mode comprises an offset, length, bitmap (OLB) mode, wherein a subblock m of the encoded block information field is located in block k where k is obtained as block offset+m/8; and
code for causing the AP to send the compressed TIM element to an at least one station (STA) associated with the access point that supports at least one multiple basic service set identifier (BSSID).

37. The computer-program product of claim 36, further comprising, in response to the at least one encoding mode comprising an offset, length, bitmap (OLB) mode, code for causing the AP to encode the encoded block information field to include a length subfield followed by contiguous subblock subfields, each subblock subfield including a corresponding subblock of a partial virtual map.

38. The computer-program product of claim 37, wherein the OLB mode is used jointly with at least one other encoding mode to further compress the TIM element.

39. A computer-program product for reduced overhead paging, the computer-program product comprising a non-transitory computer-readable medium having instructions thereon, the instructions comprising:

code for causing a station to receive a paging from an access point (AP), the paging comprising a compressed traffic indication map (TIM) element; and code for causing the station to construct from the compressed TIM element, a partial virtual bitmap field constructed from at least one encoded block field that includes an encoded block information field regarding at least one encoding mode for encoded block information, wherein the at least one encoding mode comprises an offset, length, bitmap (OLB) mode, wherein a subblock m of the encoded block information field is located in block k where k is obtained as block offset+ m/8.

40. The computer-program product of claim 39, further comprising, in response to the at least one encoding mode comprising an offset, length, bitmap (OLB) mode, code for causing the station to decode the encoded block information field to generate a length subfield followed by contiguous subblock subfields, each subblock subfield including a corresponding subblock of a partial virtual map.

41. The computer-program product of claim 40, wherein the OLB mode is used jointly with at least one other encoding mode to further compress the TIM element.

* * * * *